United States Patent [19]
Farwell et al.

[11] Patent Number: 5,195,091
[45] Date of Patent: Mar. 16, 1993

[54] ADAPTIVE SYNCHRONIZATION ARRANGEMENT

[75] Inventors: Charles Y. Farwell, Denver; Michel L. Hearn, Broomfield; Richard M. Heidebrecht, Boulder, all of Colo.; Kelvin K. Ho, Somerset, N.J.; Douglas A. Spencer, Boulder, Colo.

[73] Assignee: AT&T Bell Laboratories, Murray Hill, N.J.

[21] Appl. No.: 727,492

[22] Filed: Jul. 9, 1991

[51] Int. Cl.[5] ............................................. H04L 7/00
[52] U.S. Cl. .................................. 370/94.1; 370/95.1; 370/103; 375/107; 379/60; 455/33.1; 455/51.1
[58] Field of Search ...................... 370/93, 94.1, 100.1, 370/103, 18, 95.3, 95.1; 375/38, 40, 106, 107; 455/33.1, 33.2, 33.4, 51.1, 51.2, 54.1, 56.1, 69; 379/60, 63

[56] References Cited

U.S. PATENT DOCUMENTS

| | | | |
|---|---|---|---|
| 4,314,367 | 2/1982 | Bakka et al. | 370/60 |
| 4,494,230 | 1/1985 | Turner | 370/60 |
| 4,535,448 | 8/1985 | Baxter et al. | 370/85 |
| 4,617,674 | 10/1985 | Mangulis et al. | 375/1 |
| 4,672,658 | 6/1987 | Kavehrad et al. | 379/63 |
| 4,696,052 | 9/1987 | Breeden | 455/51.2 |
| 4,742,514 | 5/1988 | Goode et al. | 370/109 |
| 4,765,753 | 8/1988 | Schmidt | 379/60 |
| 4,797,947 | 1/1989 | Labedz | 455/33 |
| 4,894,822 | 1/1990 | Buhrke et al. | 370/60 |
| 4,901,307 | 2/1990 | Gilhousen et al. | 370/18 |
| 4,972,410 | 11/1990 | Cohen et al. | 455/33.4 |
| 4,975,939 | 12/1990 | Sasaki | 379/60 |
| 4,977,577 | 12/1990 | Arthur et al. | 375/1 |
| 4,984,247 | 1/1991 | Kaufmann et al. | 375/1 |
| 4,989,204 | 1/1991 | Shimizu et al. | 370/94.1 |
| 5,005,171 | 4/1991 | Modisette, Jr. et al. | 370/110.1 |
| 5,018,187 | 5/1991 | Marinho et al. | 379/60 |

FOREIGN PATENT DOCUMENTS

| | | |
|---|---|---|
| 9115061 | 10/1991 | PCT Int'l Appl. |
| 9100658 | 1/1991 | World Int. Prop. O. |
| 9100660 | 1/1991 | World Int. Prop. O. |
| 9107020 | 5/1991 | World Int. Prop. O. |
| 9107030 | 5/1991 | World Int. Prop. O. |
| 9107036 | 5/1991 | World Int. Prop. O. |
| 9107037 | 5/1991 | World Int. Prop. O. |

OTHER PUBLICATIONS

T. H. Murray "The Evolution of DDS Networks: Part I", *Telecommunications*, Feb. 1989, pp. 39-47.

(List continued on next page.)

*Primary Examiner*—Benedict V. Safourek
*Attorney, Agent, or Firm*—David Volejnicek

[57] ABSTRACT

A CDMA cellular radio-telephone system (FIG. 2) has switching systems (201) synchronized to public telephone network (100) timing signals (600), and radio telephones (203) and cell base stations (202) synchronized to a different clock (1000). Transmission delays between the cell base stations and the telephone network are variable. Switching systems include digital communications interfaces (264) to the telephone system, whose connections to the telephone system are synchronized to the telephone system, and whose connections to the cells are nominally also synchronized to the telephone system but whose processor (602) operates for each call within predefined windows (1302, 1402) of phase relationships to the operation of the cell that is handling the call, and occasionally adjusts (FIGS. 13-16) its phase relationships to the operation of the telephone system to achieve and maintain its operation within the predefined windows. Packet-switched communications (350) between the cells and the switching systems absorb the phase relationship fluctuations and the timing adjustments in inter-packet intervals. Circuit-switched signal communications between the switching systems and the telephone system absorb the timing adjustments by means of vocoder (604)-implemented slips—bit insertions or deletions—in the communications traffic bit stream.

42 Claims, 32 Drawing Sheets

OTHER PUBLICATIONS

*Bell Labs News*, Feb. 19, 1991, pp. 1, 4–7.

N. S. Jayant et al., "Coding of Speech and Wideband Audio", *AT&T Technical Journal*, vol. 69, No. 5 (Sep.-/Oct. 1990), pp. 25–41.

P. Binney, "Signal-Processing Chip Boasts Design Breakthroughs", *Bell Labs News*, Apr. 15, 1991, p. 5.

"TDMA and FDMA: The Different Technologies Explained", *Cordless Times*, 1990 Issue O (Ericsson Radio Systems BV), pp. 10–11.

"New Capabilities of the Definity Generic 2 Switch," *Definity TM 75/85 Communications System*, Generic 2, Issue 1, (Feb., 1989), AT&T Information Systems, Doc. #555-104-401, pp. 2-6 to 2-15.

K. W. Strom, "On the Road with Autoplex System 1000", *AT&T Technology*, vol. 3, No. 3 (1988), pp. 42–51.

W. J. Hardy et al., "New Autoplex Cell Site Paves the Way for Digital Cellular Communications", *AT&T Technology*, vol. 5, No. 4 (1990), pp. 20–25.

ADAPTIVE SYNCHRONIZATION ARRANGEMENT

CROSS-REFERENCE TO RELATED APPLICATIONS

B. D. Bolliger, T. P. Bursh, Jr., M. K. Dennison, M. J. English, C. Y. Farwell, M. L. Hearn, R. M. Heidebrecht, K. K. Ho, K. Y. Ho, D. M. Kissel, P. E. Miller, R. D. Miller, A. S. Mulberg, L. N. Roberts, M. A. Smith, K. F. Smolik, D. A. Spencer, K. W. Strom, and J. S. Thompson, and R. A. Windhausen, "Wireless Access Telephone-to-Telephone Network Interface Arrangement", Ser. No. 07/727,498 filed on even date herewith and assigned to the same assignee;

C. Y. Farwell, M. L. Hearn, R. M. Heidebrecht, K. K. Ho, and D. A. Spencer, "Adaptive Synchronization Arrangement", Ser. No. 07/727,491, filed on even date herewith and assigned to the same assignee; and B. D. Bolliger, T. P. Bursh, Jr., K. K. Ho, A. S. Mulberg, L. N. Roberts, K. F. Smolik, D. A. Spencer, K. W. Strom, and J. S. Thompson, "Mobile Telephone System Call Processing Arrangement", Ser. No. 07/727,520 filed on even date herewith and assigned to the same assignee.

TECHNICAL FIELD

This invention relates generally to telecommunications arrangements wherein transmission delays between communicating units are not predetermined.

BACKGROUND OF THE INVENTION

It sometimes occurs in digital telecommunications systems that customer-premises communications equipment is timed independently of the network communications equipment (e.g., the public switched telephony network) that interconnects the customer-premises equipment. A particularly significant example thereof is the code-division multiplexed-access (CDMA) radio-telephone system, which is an important type of digital cellular mobile-telephone system. In the CDMA system, nodes that contain radios, i.e., the mobile radio-telephones and cell-site base stations (cells for short), are synchronized to clock signals received by the cells from a global-positioning system (GPS) satellite, whereas the radio-telephone switching systems which interconnect the base stations with each other and with the public telephone network by means of digital communications are synchronized to clock signals which may also be received from the GPS satellite but are distributed by the telephone network.

For purposes of this discussion, two series of events, signals, or operations are considered to be synchronized with each other, or synchronous, if (a) they either occur at the same nominal frequency or one occurs at a frequency that is an integral multiple of the frequency of the other, and (b) they occur in a fixed phase relationship with one another. Operations that are not synchronous are considered to be asynchronous for purposes of this discussion.

The independent timing of the operation of different units of a communication system destroys the assumption that the units provide call traffic to each other at a predetermined steady and unvarying frequency at steady and unvarying points in time i.e. a fixed phase. Rather, independent timing results in the units providing call traffic to each other at a rate and at points in time that fluctuate about a fixed frequency and phase. This asynchrony must be compensated for somehow.

Independent timing is but one cause of this asynchrony. Another cause that may be present in communication systems, such as the CDMA radio-telephone system mentioned above, is the lack of a predetermined and fixed transmission delay between the communicating units. Assuming that both the originating and the destination units are timed either by a common clock or by different clocks that are synchronized with each other, if the transmission delay between the units is fixed and pre-determinable, it can be compensated for in the communication system design such as to allow the units to operate synchronously with each other. But if the delay cannot be predetermined but is variable and fluctuates, the net effect is the same as if the units were independently timed. The fluctuation in the delay may be a result of, for example, occasional changes in the transmission paths that are followed by communications moving between communicating units, or variances in the communication traffic load that flows between——and that must be handled by——the communicating units. This asynchrony must likewise be compensated for.

A partial though inadequate solution to the problems caused by independent timing is to conduct communications between the communicating units in analog instead of digital form. Analog communications can be received asynchronously with their transmission. And while the asynchrony may introduce errors or "glitches" into the communications, the problem is often tolerable for voice-only communications. Thus, in the CDMA radio-telephone system, the radio-telephone switching systems may also be synchronized to the GPS satellite clock signals and hence operate synchronously with the radio-telephones and base stations, if the switching systems are interfaced to the telephone network via analog voice-only communications. Of course, such an arrangement suffers all of the disadvantages that are associated with analog communications, such as low quality and capacity and susceptibility to interference, plus the problem of asynchrony-induced glitches that make the arrangement unsuitable for data communications.

Likewise, a partial though inadequate solution to the problems caused by fluctuating transmission delays is to circuit-switch communication traffic, whereby the dependency of transmission delay on communication traffic load is avoided. However, circuit-switching is inefficient or undesirable for other reasons in many applications. Furthermore, circuit switching does not eliminate fluctuation of transmission delay that is caused by changes in the transmission path, such as will typically arise during CDMA call "soft handoff".

SUMMARY OF THE INVENTION

This invention is directed to solving these and other disadvantages of the prior art. Broadly according to the invention, in a telecommunications system that interconnects communicating units via a transmission medium that experiences fluctuating transmission delay (such as a packet-switched communications medium, for example) there is provided an interface between the communicating units which is nominally synchronized with ones of the units but which operates within a predefined window, i.e., a range, of phase relationships to the operation of the others of the units and occasionally adjusts its otherwise-fixed phase relationship with the operation of the ones of the units to achieve and maintain its operation within the predefined window. The operations of the various units thereby effectively become synchronized with the operations of the interface arrangement, and thus are able to proceed substantially as if they were synchronized with each other and interconnected by a transmission medium having a fixed transmission delay.

More specifically, in a communications system that comprises a first unit for either receiving incoming communication traffic or transmitting outgoing communication traffic at times dictated by first clock signals having a nominal frequency and a first phase, a second unit for either transmitting incoming communication traffic to the first unit or transmitting outgoing communication traffic received from the first unit at times dictated by clock signals having the nominal frequency, a third unit for interfacing communications between the first and the second units, and a communications medium that connects the second unit with the third unit to convey communication traffic therebetween and that has a fluctuating transmission delay, the interfacing operations are conducted as follows. The third unit either transmits to the first unit incoming communication traffic received from the second unit or transmits to the second unit outgoing communication traffic received from the first unit at times dictated by clock signals having the nominal frequency and having a second phase that is offset by an adjustably fixed amount from the first phase. A determination is made of either whether the second unit receives outgoing communication traffic from the third unit within predetermined windows of time prior to the times of transmission by the second unit of the received outgoing communication traffic, or whether the third unit receives incoming communication traffic from the second unit within predetermined windows of time prior to the times of transmission by the third unit of the received incoming communication traffic. Then, in response to a determination that receptions of either communication traffic type fall outside of the respective predetermined windows, the amount of the offset of the second phase from the first phase is either increased or decreased, as necessary, in order to move the subject receptions into the respective windows.

Specifically according to an illustrative embodiment of the invention, in a CDMA radio-telephone system having radio-telephone switching systems and base station (cells) interconnected by a packet transmission medium, each radio-telephone switching system includes a digital communications interface arrangement whose connections to the telephone network are synchronized to the operation of the telephone network, and whose connections to the base stations (cells) are nominally also synchronized to the operation of the telephone system but which operates for each individual call within a predefined window of phase relationships to the operation of a base station that is handling the call and occasionally adjusts its phase relationship with the operation of the telephone system to compensate for transmission delay fluctuations experienced by the medium so as to achieve and to maintain its operation within the predefined window. Since the interface arrangement utilizes packet-switched communications between the base stations and the switching system, the phase relationship fluctuations and the timing adjustments are absorbed and hidden by variations in interpacket intervals. Further according to the illustrative embodiment, however, the interface arrangement utilizes circuit-switched communications between the switching system and the telephone network, wherein the timing adjustments are absorbed by slips—bit insertions or deletions—in the communications bit stream.

The perceived asynchrony between the operations of the switching systems and telephone network and the base stations (cells) which results from transmission delay fluctuations, that are caused by variations in the communications traffic load carried by the medium or by changes in the transmission paths taken by the communication traffic during soft handoff, are compensated for and accommodated by the interface arrangement, as required for proper digital communications system operation.

While the discussion of an illustrative embodiment that follows makes a distinction between level-3 "packets" and level-2 "frames", for purposes of clarity, the use of the term "packet" herein and in the claims is intended to encompass either or both "packets" and "frames".

These and other advantages and features of the invention will become apparent from the following description of an illustrative embodiment of the invention considered together with the drawing.

DETAILED DESCRIPTION

Figure 1:
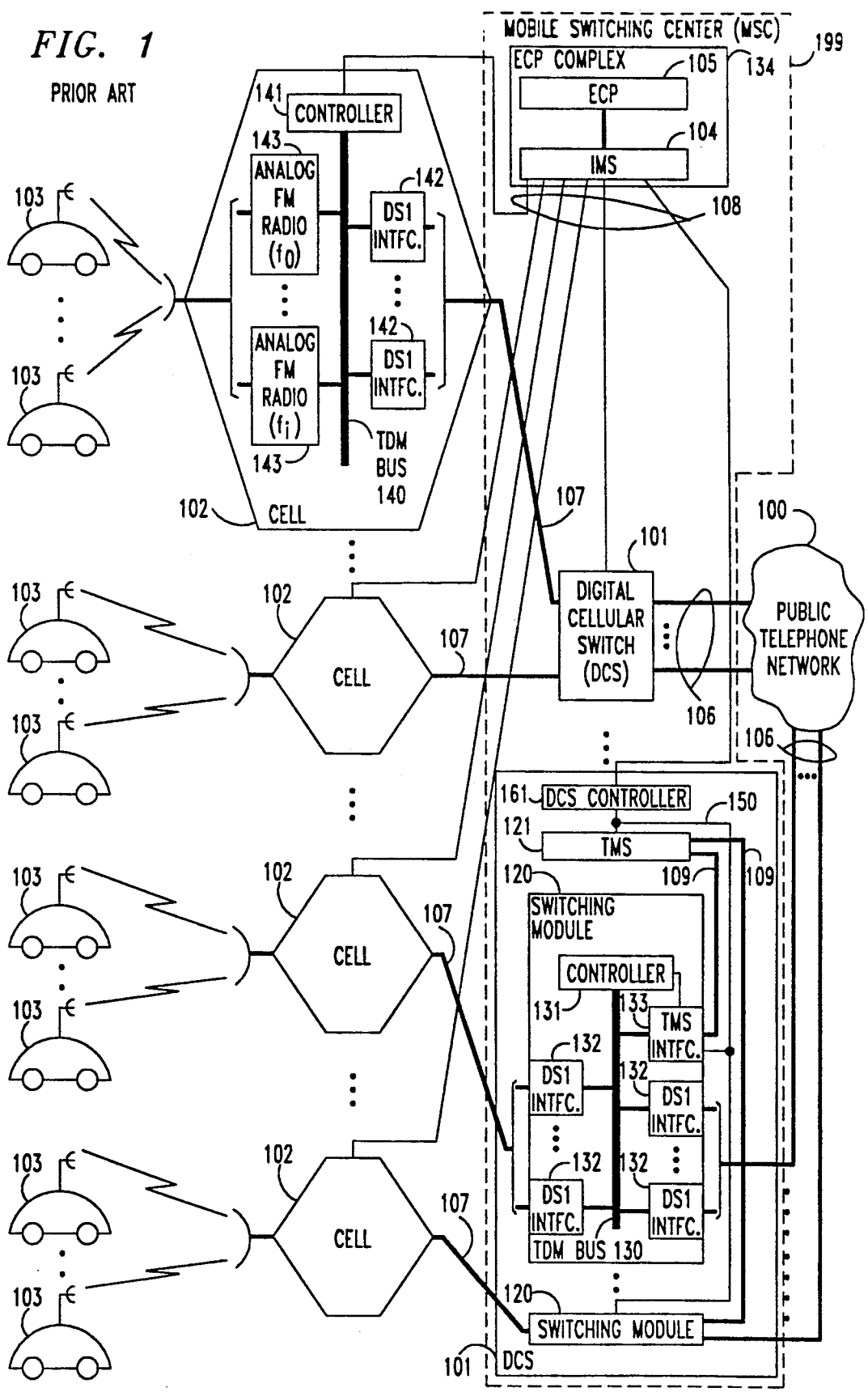
FIG. 1 is a block diagram of a conventional cellular radio-telephone system.

Before commencing a discussion of an illustrative implementation of the invention, it may be helpful to consider an existing cellular mobile radio-telephone system to serve as a basis for comparison. Such a system is shown in FIG. 1. A description of such a system may be found in K. W. Strom, "On the Road with AUTOPLEX System 1000", *AT&T Technology*, Vol. 3, No. 3, 1988, pp. 42–51, and W. J. Hardy and R. A. Lemp, "New AUTOPLEX Cell Site Paves The Way For Digital Cellular Communications", *AT&T Technology*, Vol. 5, No. 4, 1990, pp. 20–25.

The system of FIG. 1 includes a plurality of geographically-dispersed service nodes known as cell sites, or cells 102 for short, each one of which provides radio-telephone services to wireless user terminals, known as mobile radio-telephones 103, in its vicinity. To provide radio-telephone service between mobile radio-telephones 103 served by different cells 102, and between mobile radio-telephones 103 and the public telephone network 100, cells 102 are interfaced to each other and to network 100 through mobile radio-telephone switching nodes referred to herein as digital cellular switches (DCSs) 101. Each switch 101 is illustratively the AT&T Autoplex ® cellular telecommunications system digital cellular switch. Each digital cellular switch 101 is connected to a plurality of different cells 102 by communication trunks 107, and is connected to network 100 by communication trunks 106. Each trunk 106 and 107 is illustratively a DS0 (64 Kbps time-division multiplexed) channel, a plurality of which are implemented by a DS1 facility which may be transported via land line (T1 line), optical transmission, microwave, etc., facilities. Control over the system of FIG. 1 and coordination of the activities of the various cells 102 and DCSs 101 is exercised by an Executive Cellular Processor (ECP) 105, which is connected to each cell 102 and cellular switch 101 through an Interprocess-Message Switch (IMS) 104 by control links 108. ECP 105 and IMS 104 together make up an ECP complex 134. ECP complex 134 and DCS 101 make up a mobile switching center (MSC) 199. ECP 105 and IMS 104 are illustratively the AT&T Autoplex ECP and the AT&T Autoplex IMS (which includes a plurality of cell site node processors, digital switch node processors, and database node processors, interconnected by an IMS ring), and links 108 are illustratively RS-449 data links within MSC 199. Alternatively, control links 108 may be implemented as 64 Kbps DS0 channels on DS1 facilities between cells 102 and mobile switching center 199.

Each mobile radio-telephone 103 typically comprises an analog FM radio-telephone capable of operating at any one of a plurality of radio frequency pairs. Each cell 102 comprises a plurality of analog FM radios 143 each operating at one of the radio frequency pairs of the mobile radio-telephones 103. Radios 143 of adjacent cells 102 operate at different frequency pairs, to avoid interfering with each other. However, each mobile radio-telephone 103 is typically capable of operating at any of the frequency pairs of all of the cells 102.

In an alternative embodiment, digital radios and radio-telephones operating in time-division multiple-access (TDMA) mode are substituted for the analog FM radios and radio-telephones. Vocoding functions can be a part of the radio units in this embodiment, or can be located at switches 101.

While in a cellular system, a mobile radio-telephone's receiver scans a set of predetermined paging channels. After locking onto the strongest paging channel, the mobile radio-telephone 103 gets instructions from the system and receives incoming calls. A mobile radio-telephone 103 also transmits on a channel to originate a call. When a call is established (incoming or outgoing) the receiver is assigned to a particular voice channel and instructed to tune to that transmit and receive frequency pair. At the same time, a connection is established between the cell 102 and the telephone network 100 through a digital cellular switch 101, which completes the voice path for the telephone conversation.

Once this voice connection is established, the radio signal levels are monitored by the cell's radio 143. As the mobile radio-telephone 103 moves from one cell into another, the serving cell 102 detects the reduction in signal strength and requests that measurements be made by surrounding cells 102. If these measurements indicate that another cell 102 can provide better service, then the voice connection is switched to that cell 102 through a process known as "hard handoff". The process of hard handoff is under control of ECP 105 and requires that a DCS 101 first form a 3-way connection which extends the voice circuit from the serving trunk 106 to radio channels in both the serving cell 102 and the target cell 102. When this connection has been confirmed, the radio-telephone 103 is instructed to retune to the frequency of the assigned radio 143 in the target cell 102. Upon confirmation of the radio-telephone's communication with the target cell 102, the DCS 101 is then instructed to remove the voice connection to the original serving cell 102, leaving the connection between the new serving (target) cell 102 and the serving trunk 106. The telephone conversation continues largely uninterrupted through this handoff process. Meanwhile, the original voice channel is made available for use by another subscriber.

Hard handoffs performed in this way use processor capacity in both the ECP complex 134 and the digital cellular switch 101. For the duration of the 3-way connection, the hard handoff also uses additional switch fabric (TDM bus 130) capacity. If the target cell 102 containing the selected radio 143 is connected to a switching module 120 other than the one containing the serving trunk 106, then the connection must be extended through a time-multiplexed switch (TMS) 121, using additional switching fabric in that switch element. As the number of cells 102 in a system grows larger, the number of handoffs increases and uses and increasing proportion of the system processor and switch fabric resources, thus reducing the system's overall capacity.

Each cell 102 is configured around a high-speed time-division multiplexed (TDM) bus 140. TDM bus 140 is illustratively the 2.048 MHz TDM bus of an AT&T Definity ® communications system Universal Module, and physically comprises one or more TDM buses each having 256 time-slots per frame. Illustratively, multiple TDM buses are used simultaneously by units connected thereto and logically operate as a single TDM bus having a multiple of 256 time-slots per frame. Each time slot has a rate of 64 Kbps. Within a cell 102, radios 143 are connected to TDM bus 140. Radios 143 accept communications for radio transmission from, and supply received radio communications to, TDM bus 140 in DS0 channel format at a rate of 64 Kbps. The input to, and output from, each radio is full-rate pulse-code-modulation (PCM)-coded speech. Also connected to TDM bus 140 are one or more interfaces 142, each one of which couples TDM bus 140 to trunks 107. Illustratively, trunks 107 are carried by T1 facilities employing the DS1 communication format and operating at a rate of 1.544 Mbps, and so interfaces 142 are DS1 interfaces. The DS1 and the aforementioned DS0 format are described by T. H. Murray in "The Evolution of DDS Networks: Part 1", *Telecommunications*, February 1989, pp. 39–47. An interface 142 accepts from TDM bus 140 communications that have been supplied by a plurality of radios 143, multiplexes them into the DS1 format, and transmits them onto trunks 107. In the reverse direction, interface 142 receives from trunks 107 communications formatted in the DS1 format, demultiplexes them, and supplies them to TDM bus 140 for conveyance to radios 143. TDM bus 140 operates under control of a controller 141, which allocates time slots on bus 140 to individual ones of the radios 143 and interfaces 142. Illustratively, controller 141 makes these allocations on the basis of control information supplied thereto by ECP complex 134 over a control link 108; alternatively, controller 141 may have a database that allows it to make the allocations autonomously.

Each digital cellular switch 101 comprises one or more digital switching modules (DSMs) 120. A module 120 structurally resembles a cell 102 in that it comprises a TDM bus 130 which is similar to TDM bus 140, a controller 131 which provides the same TDM bus control functions as controller 141, and a plurality of interfaces 132 connected to bus 130 which provide the same functionality as interfaces 142. On the basis of control communications originating from ECP complex 134, controller 131 causes communications to be switched by TDM bus 130 between interfaces 132. Each trunk 107 extending from a cell 102 is terminated at a switching module 120 by an interface 132. Other interfaces 132 at a module 120 terminate trunks 106, which are duplicates of trunks 107 but extend to public telephone network 100.

If switch 101 includes more than one module 120, it also includes a time-multiplexed switch (TMS) 121. Then a TMS interface 133 is connected to TDM bus 130 in each module 120 and terminates a link 109 which extends to TMS 121. Interface 133 is illustratively the Module Control Complex (MCC) of an AT&T Definity communications system Universal Module. TMS 121 provides direct switched interconnection between modules 120 of one mobile radio-telephone switch 101. Interconnection between modules 120 of different mobile radio-telephone switches 101 is provided by public telephone network 100 or by trunks that interconnect switches 101 directly.

Overall control of a digital cellular switch 101 and coordination of activities between its modules 120 and 121 is exercised by a DCS controller 161. DCS controller 161 is in direct communication with ECP complex 134 over a control link 108. Controller 161 has its own control connection to TMS 121 through link 150, and to controllers 131 of switching modules 120 through link 150 and TMS interfaces 133. Controller 161 is illustratively the 501 CC processor of an AT&T Definity communications system.

Figure 2:
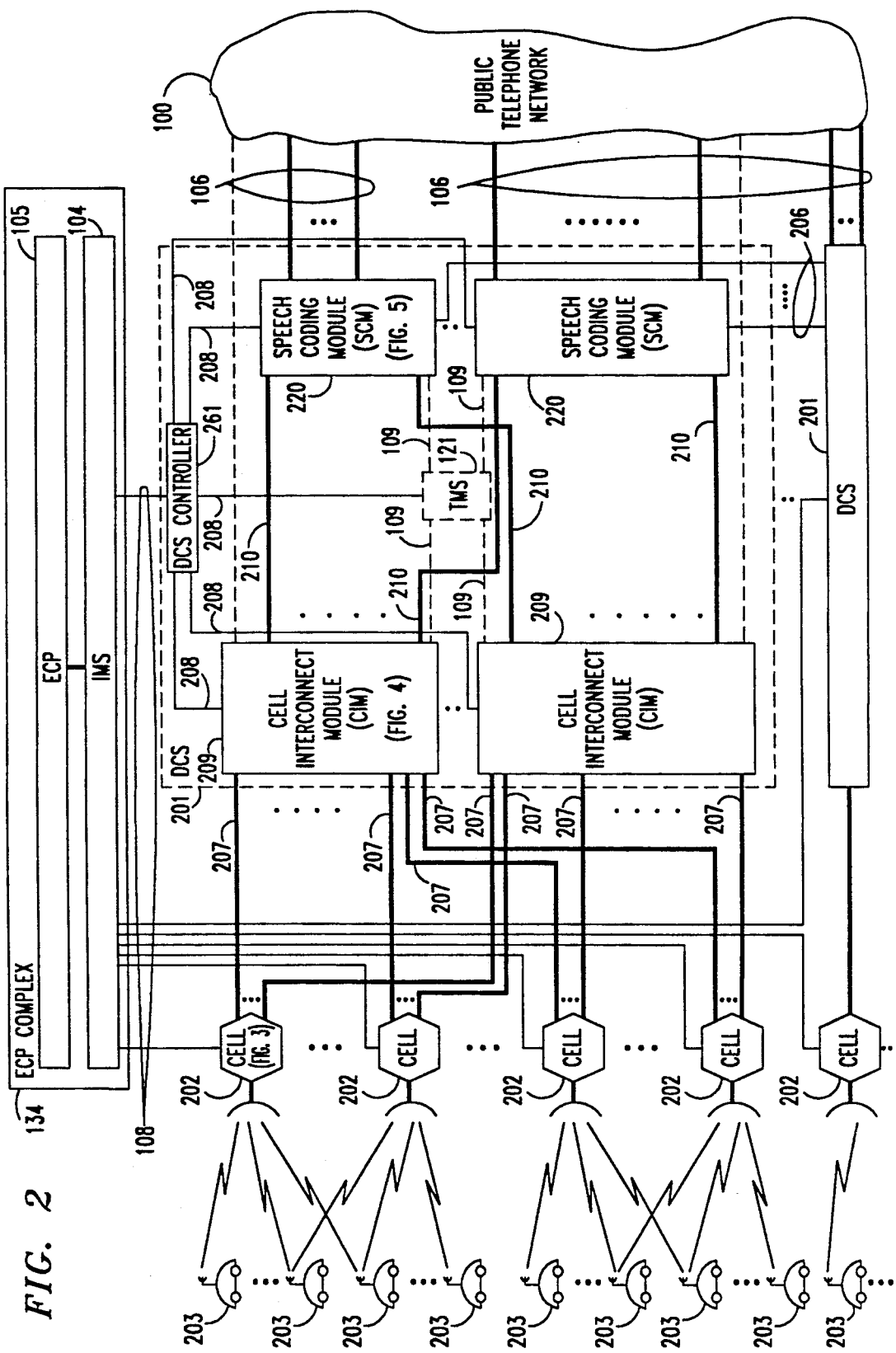
FIG. 2 is a block diagram of a cellular radio-telephone system that incorporates an illustrative embodiment of the invention.

Turning now to FIG. 2, it shows an illustrative example of a cellular mobile radio-telephone system constructed according to the invention. Same numerical designations as were used in FIG. 1 are used in FIG. 2 to designate elements that are common to both systems.

FIG. 2 shows a system topology that resembles the one of FIG. 1 in many respects, though it is not identical. The system of FIG. 2 includes a plurality of geographically-dispersed cells 202, each one of which provides radio-telephony services to mobile radio-telephones 203 in its vicinity. As used herein, cell 202 refers either to a geographically separate cell site or to one of a plurality of "faces" on a given cell site, where a "face" is a cell sector as is typically implemented by using directional transmit antennas at a cell site. The operation of all mobile radio-telephones 203 and cells 202 is synchronized to a common master clock, such as to timing signals generated and broadcast by a global positioning system satellite. Interconnection between cells 202, and between cells 202 and public telephone network 100, is accomplished by digital cellular switches 201, in two stages. First, individual cells 202 are connected to one or more cell interconnect modules (CIMs) 209 of a DCS 201 by trunks 207. Cell interconnect modules 209 of individual DCSs 201 are each in turn connected to each speech coding module (SCM) 220 of that DCS 201 by fiber-optic packet-switched trunks 210. Digital cellular switches 201 are each connected to public network 100 by a plurality of trunks 106, analogously to FIG. 1, and directly to each other by trunks 206 that functionally duplicate trunks 106. The operation of switches 201 is synchronized to master timing signals (not shown) of public telephone network 100. Further analogously to FIG. 1, cells 202 and digital cellular switches 201 operate under control of ECP complex 134, to which they are connected by control links 108. Likewise, the various modules 209 and 220 of a DCS 201 are connected by control links 208 to a common DCS controller 261 and operate under its control. Physically, DCS controller 261 is illustratively again the 501 CC processor.

In the system of FIG. 2, some, but not necessarily all, mobile radio-telephones 203 are digital radio-telephones. While illustratively shown as mounted in a vehicle, a mobile radio-telephone 203 may be any portable radio-telephone, and may even be a stationary radio-telephone. The digital radio-telephones use voice-compression techniques to reduce the required digital transmission rate over the radio channel. Each digital radio-telephone includes voice-compression circuitry in its transmitter and voice-decompression circuitry in its receiver. Each radio-telephone is capable of operating at any one of a plurality of wideband radio frequency pairs.

For handling non-packetized traffic analogous to that handled by the system of FIG. 1, side-by-side with packetized traffic, a DCS 201 of the system of FIG. 2 includes the elements shown in dashed lines: a TMS 121 connected by trunks 109 to modules 209 and 220, and trunks 106 connecting CIMs 209 directly to public telephone network 100. Their use is enlightened further below.

Digital radio-telephones 203 may operate in one or more of time-division multiple-access (TDMA) mode or code-division multiple-access (CDMA) mode or some other digital or analog radio mode. TDMA is a technique, known in the art, that provides multiple users access to a radio channel (frequency) by dividing that channel into multiple time slots. A single user can be assigned to one or more of these time slots. A TDMA radio 203 is illustratively the TIA IS54 digital cellular radio. TDMA employs different frequencies in adjacent cells and therefore requires the "hard handoff" procedure described previously.

In the present illustrative example, digital radio-telephones 203 are assumed to operate in CDMA mode, or as a fallback in the FDMA (analog) mode. CDMA is a direct-sequence spread-spectrum technique which allows reuse of the frequencies in the territories served by adjacent cells 202. Consequently, adjacent cells 202 need not, and do not, operate at different radio frequencies, but re-use the same frequencies. When moving from the vicinity of one cell 202 to the vicinity of another cell 202, a mobile radio-telephone 203 may undergo a "hard handoff" procedure, described previously. However, a CDMA mobile radio-telephone 203 in the system of FIG. 2 may alternatively and preferentially undergo a "soft handoff" procedure, during which it communicates with both of the cells 202 on the same frequency pair at the same time. The CDMA technique and its associated procedures and equipment are also known in the art. The basic principle of direct-sequence code-division multiple-access is the use of a plurality of individual and distinct high-speed digital signals which are absolutely or statistically orthogonal to each other, each to modulate one of a plurality of low-speed (i.e., baseband) user signals and to combine the plurality of modulated signals into common digital signals which then are used to control radio frequency modulation functions. Recovery and separation of the original baseband signals is accomplished using the corresponding digital modulation signals to demodulate within a time-synchronous manner. For a description of CDMA see, e.g., U.S. Pat. No. 4,901,307, and published international patent applications WO 91/07020, WO 91/07036, and WO 91/07037.

Figure 3:
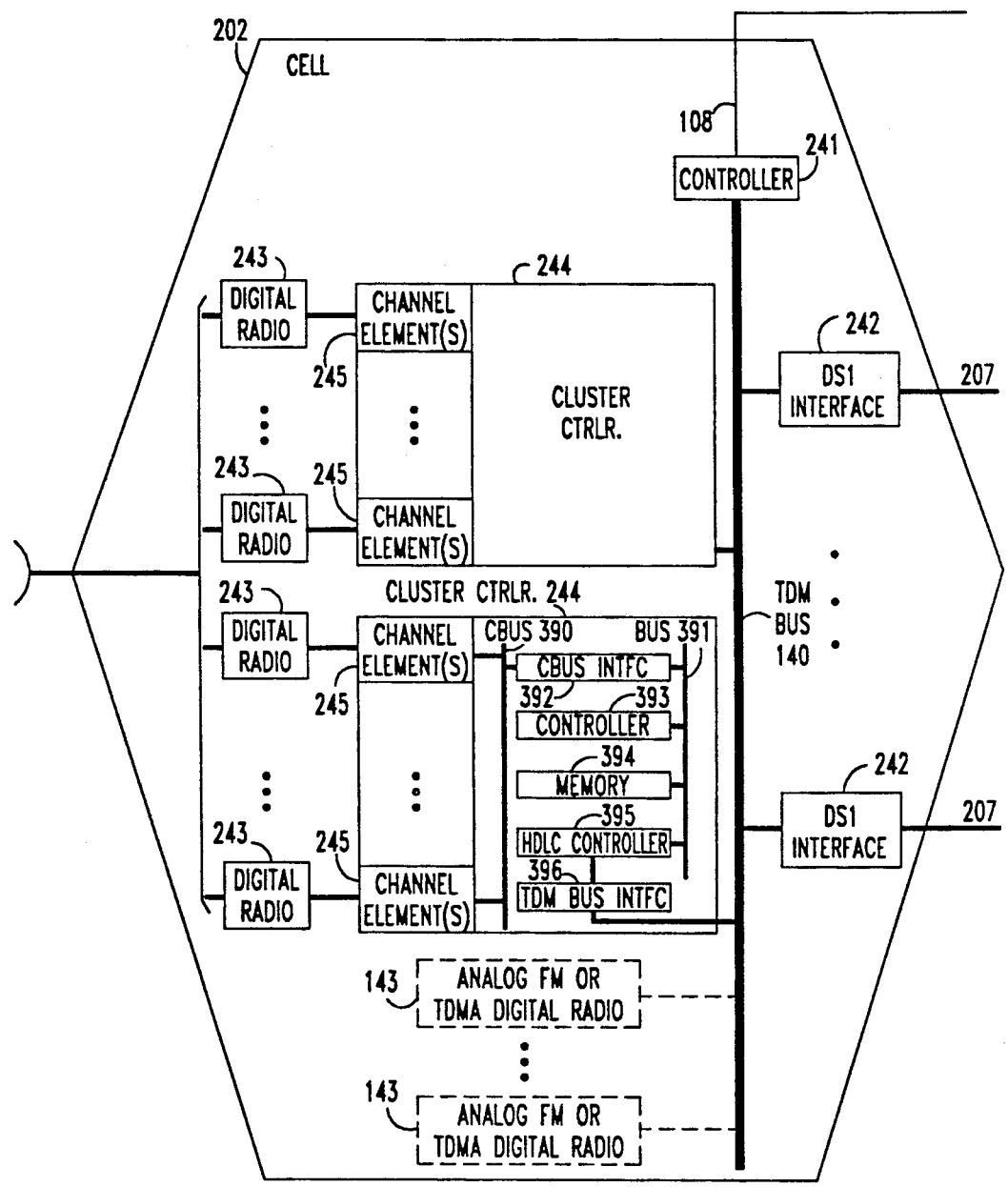
FIG. 3 is a block diagram of a cell of the system of FIG. 2.

A cell 202 is shown in FIG. 3. Similarly to a cell 102 of FIG. 1, cell 202 includes TDM bus 140 operating under control of controller 241, and DS1 interfaces 242 couple TDM bus 140 to trunks 207. Controller 241 is illustratively the control complex of an AT&T Autoplex Series II cell site. It functionally duplicates controller 141 of a cell 102, but now performs additional functions, described below, on account of the fact that cell 202 comprises a plurality of digital radios 243. Every digital radio's signal input and output are interfaced to TDM bus 140 by corresponding one or more channel elements 245 and a cluster controller 244. A channel element 245 is an interface to digital radios 243 serving an individual user. Channel elements 245 provide signal processing functions—baseband and spread-spectrum (CDMA) signal processing functions in this example—for individual calls being transmitted and received by their associated radios 243.

Each cluster controller 244 includes a C-bus 390. C-bus 390 is illustratively a conventional computer input and output (I/O) bus, and channel elements 245 are connected to C-bus 390 as computer I/O devices. C-bus 390 and channel elements 245 operate under control of a controller 393. Controller 393 is illustratively a general-purpose microprocessor, and it is served by a bus 391 which is illustratively a conventional microprocessor main bus. Bus 391 is connected to C-bus 390 by a C-bus interface 392 which functions as an I/O interface of conventional design. Controller 393 orchestrates data movement between channel elements 245 and cell 202 TDM bus 140 (illustratively, one transfer in each direction for each channel element 245 every 20 msecs.), performs operation, administration, and maintenance (OA and M) functions on cluster controller 244, handles cell-site signalling and other specialized functions, and performs level-2 and level-3 protocol formatting and deformatting functions on data (call traffic and signalling) passing between channel elements 245 and TDM bus 140. A memory 394 is connected to bus 391 and serves as a scratch-pad traffic-buffer memory and an instruction memory for controller 393. Also connected to bus 391 is an HDLC controller 395. It performs HDLC formatting and deformatting functions on traffic flowing between channel elements 245 and TDM bus 140, including traffic conversion between byte-oriented form used in cluster controller 244 and bit-oriented form used on TDM bus 140, including bit stuffing and LAPD flag insertion functions. HDLC controller 395 receives and transmits HDLC serial bit streams from/to TDM bus 140 through a TDM bus interface 396, of conventional design, which connects controller 395 to bus 140.

Compressed call traffic and signalling are transported between channel elements 245 and cluster controller 244 in the form of segments of byte-oriented information. Each channel element 245 transmits and receives a segment of byte-oriented information at regular intervals, illustratively every 20 msecs. Cluster controller 244 formats each segment of byte-oriented information in LAPD protocol format which includes a level-3 protocol, for transmission to DCSs 201. While any suitable level-3 protocol may be used, illustrative level-3 protocols 350 and 351 are shown in FIGS. 9 and 10.

Figure 8:
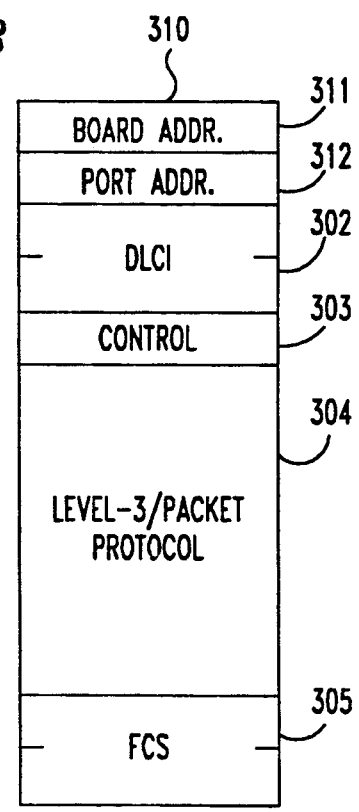
FIG. 8 is a block diagram of a modified LAPD frame of the system of FIG. 2.
Figure 9:
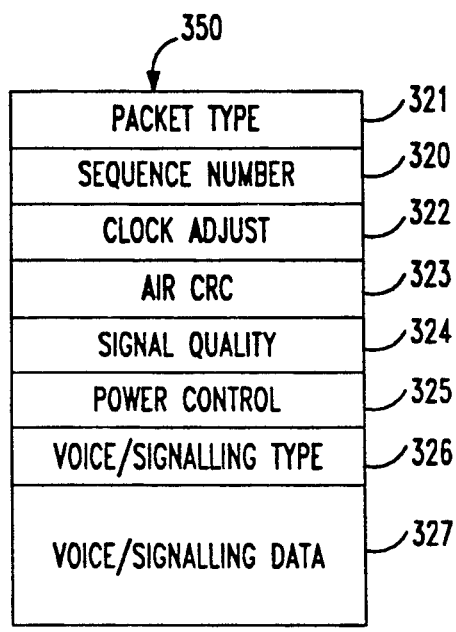
FIG. 9 is a block diagram of a level-3 protocol used for carrying voice and/or signalling information in the frames of FIGS. 7 and 8.
Figure 10:
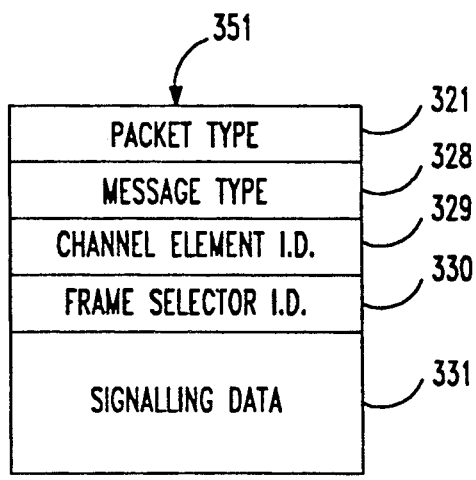
FIG. 10 is a block diagram of a level-3 protocol used for carrying signalling information in the frames of FIGS. 7 and 8.

FIG. 9 shows a protocol 350 that is used to convey either call traffic or signalling or both, while FIG. 10 shows a protocol 351 that is dedicated to conveying a particular type of signalling. Both protocols 350 and 351 are carried by frames of FIGS. 7 and 8. A level-3 protocol data unit carried over a level-2 protocol is commonly referred to as a packet, and a level-2 protocol data unit is commonly referred to as a frame. Protocol 350 of FIG. 9 comprises at least the information fields 320-327. Additional fields for other types of information may be included in packet 350, but these are not germane to the present discussion. Sequence number field 320 carries a sequential number of this packet 350 within the sequence of packets transmitted in a given direction. In the case of packet 350 outgoing to a channel element 245 from a DCS 201, the sequence numbers begin at 0 at the start of every new call. In the case of packets 350 incoming from a channel element 245 to a DCS 201, the sequence numbers are derived from the master timing signals to which all mobile telephones 203 and cells 202 are synchronized. Packet type field 321 identifies the packet type as either a traffic packet, corresponding to packet 350 of FIG. 9, or a signalling packet, corresponding to packet 351 of FIG. 10. Clock adjust field 322 carries information from cluster controllers 244 to DCSs 201 that is used to compensate for real and virtual drift between the master clock to which mobile telephones 203 and cells 202 are synchronized and a master clock to which public telephone network 100 and DCSs 201 are synchronized. field 322 is used only in the reverse direction, and is null in the forward direction. Air CRC field 323 is the result of a conventional check-sum, computed by a mobile telephone 203 over its transmitted traffic, and is sent by mobile telephone 203 along with that traffic. Signal quality field 324 carries reports computed by channel elements 245 on the quality of call-traffic signals that they are receiving from mobile telephone 203. Fields 323 and 324 are also used only in the reverse direction and are null in the forward direction. Power control field 325 carries information from a cell 202 concerning the trend of power control instructions sent by a channel element 245 to its corresponding mobile telephone 203. Normally, this field is also used only in the reverse direction, but is used in both directions during soft handoff, as will be explained further below. Voice/signalling type field 326 identifies the type of information that is carried by packet 350: voice traffic only, voice plus signalling, or signalling only. And voice/signalling data field 327 carries call voice traffic or signalling information, or a mix of both, to and from channel elements 245.

A signalling packet 351, shown in FIG. 10, is simpler than traffic packet 350 of FIG. 9: it has fields 321 and 328-331 that are relevant to this discussion. Packet type field 321, and already discussed in conjunction with FIG. 9, identifies packet 351 as a signalling packet. Message type field 328 identifies the type of signalling carried by packet 351. Channel element ID field 329 identifies the particular channel element 245 participating in this message exchange. Frame selector ID field 330 identifies a particular virtual port on a processor 602 (see FIG. 6) participating in this message exchange. These fields 329 and 330 may be used for security, maintenance, performance tracking, billing, routing, etc. Channel element 245 and frame selector IDs are assigned administratively at system configuration time, and remain fixed thereafter. And signalling data field 331 carries the signalling information that is being conveyed.

A cluster controller 244 couples a plurality of channel elements 245 to TDM bus 140. Each cluster controller 244 communicates on TDM bus 140 through an allocated input and an output "pipe". The allocation is administrable, and is typically done at system initialization. Each "pipe" illustratively constitutes a plurality of (e.g., four) time slots (i.e., four 64 Kbps channels) on TDM bus 140. In the reverse (inbound) direction, cluster controller 244 queues traffic segments received from channel elements 245, formats them into packets, wraps the packets into inverted-HDLC-format LAPD (level-2 protocol) frames, and transmits the LAPD frames one after another into its allocated output "pipe" on TDM bus 140. In the forward (outbound) direction, cluster controller 244 receives LAPD frames from its allocated input "pipe" on TDM bus 140, terminates the LAPD protocol, deformats the packets, and then distributes the contents of these packets to channel elements 245 according to an address field embedded in the received frames. As a consequence of the operations of cluster controllers 244, frames being conveyed to and from them are statistically multiplexed onto TDM bus 140, thereby greatly increasing the traffic-carrying capacity of the bandwidth of TDM bus 140 over alternative transmission techniques.

Figure 6:
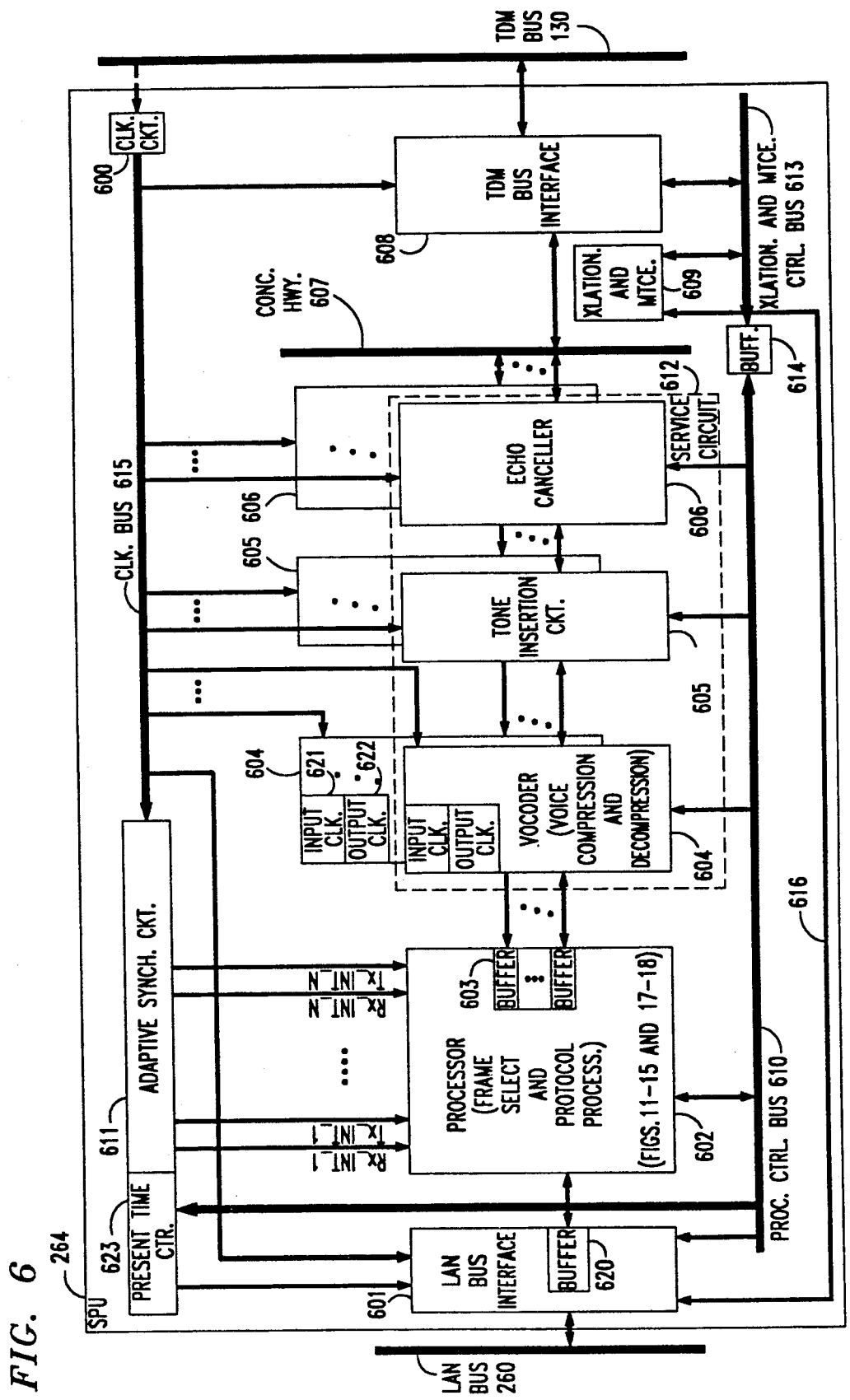
FIG. 6 is a block diagram of a speech processing unit of the module of FIG. 5.
Figure 7:
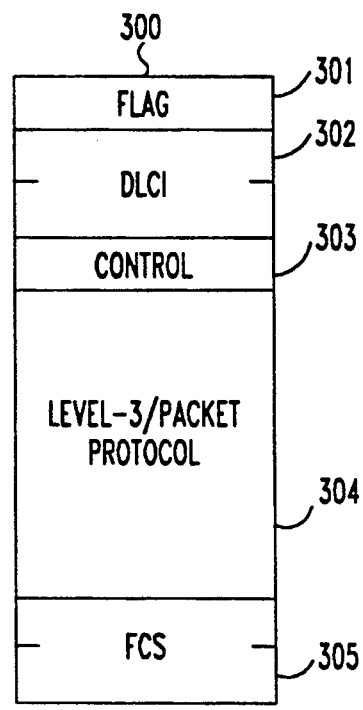
FIG. 7 is a block diagram of a LAPD frame of the system of FIG. 2.

An illustrative LAPD frame 300 is shown in FIG. 7. For purposes of this discussion, it comprises a plurality of fields 301-305: a flag field 301, used for delimiting frames; a Data Link Connection Identifier (DLCI) field 302; a control field 303 which specifies the type of LAPD frame this is; a user data field 304 which contains the level-3 protocol (packet) 350 or 351 referred to above; and a frame check sequence (FCS) field 305, used for error checking. The DLCI field 302 is the frame end-to-end address field. It contains a virtual link number or index (DLCI) that associates the frame with a particular call. In the forward direction, the DLCI identifies a particular channel element 245; in the reverse direction, the DLCI identifies a particular one of a plurality (illustratively two) of virtual ports of processor 602 which correspond to a particular speech processing unit 264 service circuit 612 (see FIG. 6). Within a cluster controller 244, the DLCI identifies the channel element 245 which is the source or destination of the frame. In this embodiment, DLCIs are assigned to ports and channel elements administratively at system configuration time, and remain fixed thereafter.

The transmission of frames to and from cluster controllers 244 is effected using the frame-relay technique of transmission, whereby protocol termination of the frames occurs only at the transmission endpoints, thereby greatly increasing the efficiency and speed of those frame transfers through the system of FIG. 2. The frame-relay technique is described in U.S. Pat. No. 4,894,822. It is hereby incorporated herein by reference.

Advantageously, in order to provide radio telephone services to conventional analog or digital TDMA mobile telephones 103 within the same system, analog FM or TDMA digital radios 143 may also be connected to TDM bus 140 in cells 202, in the manner described for cells 102, as suggested by the dashed blocks in FIG. 3. Alternatively, conventional cells 102 may be used side-by-side with cells 202 within the system of FIG. 2. TDMA traffic may be carried through the system of FIG. 2 either in circuit-switched form, like the analog radio traffic, or in packet-switched form, like the CDMA traffic.

In the cell 202 of FIG. 3, DS1 interfaces 242 perform their conventional functions of gathering 64 Kbps time slots from TDM bus 140 and multiplexing them into DS1 format for transmission on trunks 207, and vice versa. It is important for purposes of this application that each interface 242 ensure that the delay undergone by signals of every DS0 channel within interface 242 be constant; many commercial DS1 interfaces, such as the AT&T TN 464C, do in fact meet this condition. On account of the functions performed by cluster controllers 244, frames are statistically multiplexed onto trunks 207 and the format of facilities that implement trunks 207 is, from a logical perspective, no longer the purely conventional DS1 format of facilities that implement trunks 107 of FIG. 1: as opposed to comprising 24 independent DS0 channels, as it does on DS1 facilities, each facility now comprises multiple independent "pipes" each consisting of the bandwidth of one or more DS0 channels. Each of the "pipes" carries the LAPD frames created by or destined for a single cluster controller 244. The traffic-carrying capacity of the bandwidth provided by trunks 207 is thereby greatly increased over alternative transmission techniques, such as the conventional circuit-switching technique. Any remaining trunks 207 (i.e., DS0 channels) that are not bundled into "pipes" continue to be used on an independent individual circuit-switched basis, e.g., to carry communications to and from conventional radios 143.

Figure 4:
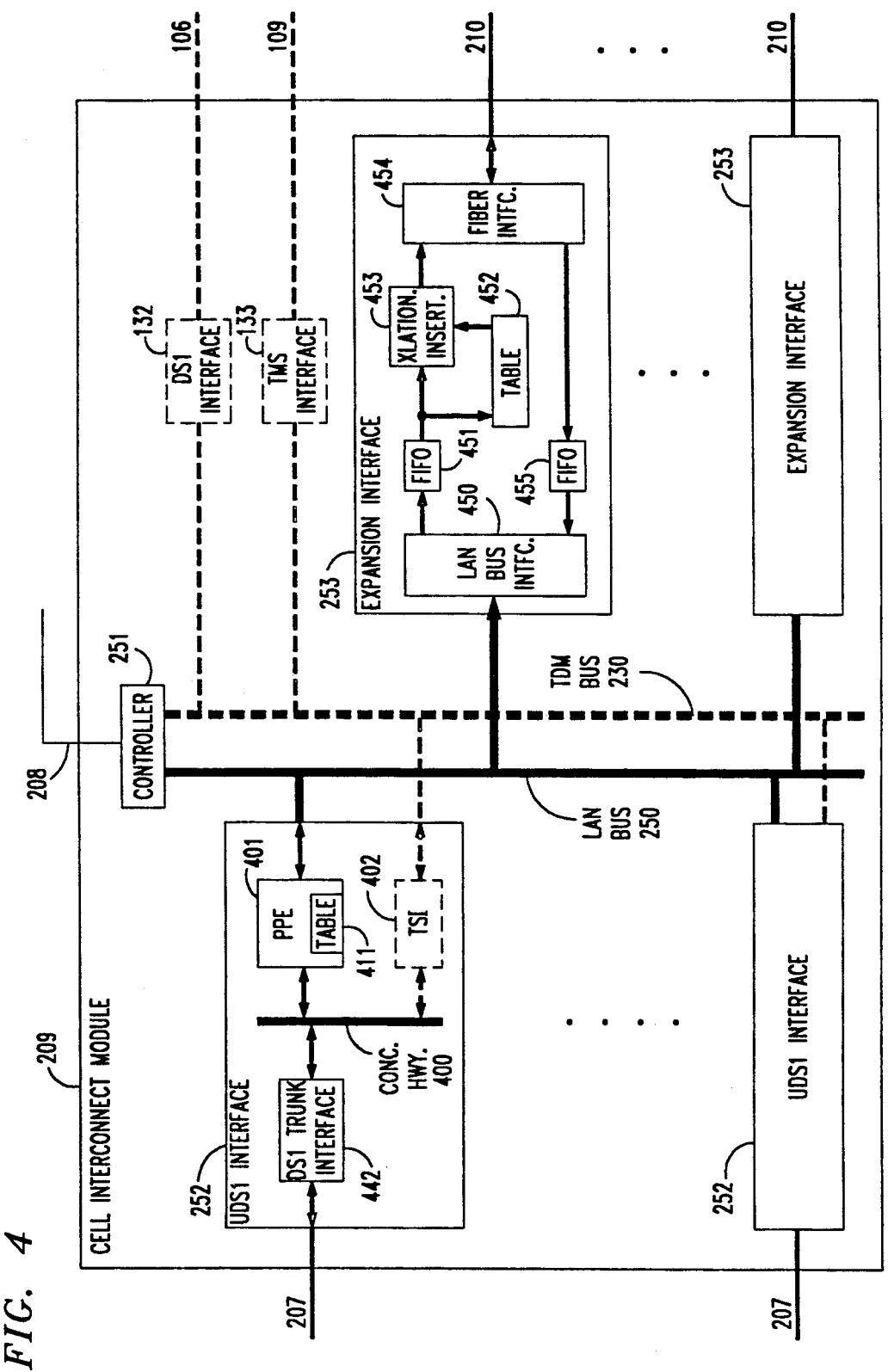
FIG. 4 is a block diagram of a cell interconnect module of the system of FIG. 2.

A cell interconnect module (CIM) 209 is shown in FIG. 4. Cell interconnect module 209 is illustratively founded on the Universal Module of the AT&T Definity communications system. It includes a local area network (LAN) bus 250 operating under control of a controller 251. Universal DS1 (UDS1) interfaces 252 connect trunks 207 to LAN bus 250. Each interface 252 includes a DS1 trunk interface 442 which duplicates the DS1 facility-interface circuitry of DS1 interface 242, and a packet processing element (PPE) 401, interconnected by a concentration highway 400. Concentration highway 400 is a time-division multiplexed bus of 64 time slots each having a 64 Kbps rate. The DS1 trunk interface 442 performs the functions of gathering 64 Kbps time slots from concentration highway 400, inverting the inverted HDLC format (discussed in conjunction with cell 202 of FIG. 3) back to normal, and multiplexing the data into DS1 format for transmission on trunks 207, and vice versa.

PPE 401 performs LAPD frame-relay functions between concentration highway 400 and LAN bus 250. PPE 401 includes a translation table 411 that contains a board and a port address for each DLCI 302. Translation table 411 is administered at initialization. PPE 401 is administered to receive LAPD frames 300 on designated time slots of concentration highway 400. For each LAPD frame 300 received on concentration highway 400, PPE 401 uses the contents of the frame's DLCI field 302 to find the corresponding board and port address in table 411. The board and port addresses identify the intended recipient of frame 300 on LAN bus 250. PPE 401 then strips flag field 301 from frame 300 and prepends the found board and port addresses to the frame to form a modified LAPD frame 310 shown in FIG. 8. A comparison with FIG. 7 shows flag field 301 to have been replaced by board address 311 and port address 312. PPE 401 then transmits modified LAPD frame 310 on LAN bus 250. In the other direction, PPE 401 examines modified LAPD frames 310 transmitted on LAN bus 250 for its board address 311. It receives any frame 310 having the looked-for address 311, strips the addresses 311 and 312 from frame 310, replaces them with flag field 301 to form a LAPD frame 300, and then transmits frame 300 on concentration highway 400. The stripped-off port address 312 identifies to PPE 401 the particular time slots on which that particular frame 300 is to be transmitted.

Also connected to LAN bus 250 of cell interconnect module 209 are expansion interfaces (EIs) 253. Each expansion interface 253 couples an optical fiber trunk 210 to LAN bus 250. Expansion interfaces 253 merely act as routing elements. Each expansion interface 253 includes a LAN bus interface 450 which monitors LAN bus for modified LAPD frames 310 having a pre-administered DLCI 302, board address 311, and port address 312. Interface 450 captures any frame 310 having the looked-for DLCI 302, board address 311, and port address 312, strips off the prepended board address 311, and stores the frame 310 in a FIFO buffer 451. FIFO buffer 451 outputs the prepended port address 312 and DLCI 302 of the frame 310 to a translation table 452, and outputs fields 302-305 of frame 310 to a translation inserter 453. Table 452 is a pre-administered table of board and port addresses of speech coder modules 220. Table 452 uses the port address 312 and DLCI 302 that it receives from FIFO buffer 451 as a pointer to find a new board address 311 and port address 312 for the frame 310, and sends the new addresses 311 and 312 to translation inserter 453. Inserter 453 prepends the new board and port addresses 311 and 312 received from table 452 to the frame 310 fields that it received from FIFO buffer 451, and sends the new frame 310 to fiber interface 454. If no corresponding addresses are found in and sent from table 452, inserter 453 merely discards the received frame 310. Fiber interface 454 transmits the frame 310 on optical fiber trunk 210. Any desired protocol and transmission format may be used on trunks 210. In the reverse direction, fiber interface 454 receives frames 310 on trunk 210 and stores them in a FIFO buffer 455. LAN bus interface 450 extracts the stored frames 310 from FIFO buffer 455 and transmits them on LAN bus 250. Consequently, expansion interface 253 merely transmits on LAN bus 250 those frames 310 that it receives on the attached fiber trunk 210. These frames 310 have board addresses 311 that identify the destination interfaces 252 on LAN bus 250, and port addresses 312 that are not looked for by any expansion interfaces 253 on LAN bus 250.

For purposes of handling conventional, circuit-switched, cellular radio telephone communications, cell interconnect module 209 includes elements shown in dashed lines in FIG. 4. Specifically, CIM 209 includes a TDM bus 230 which duplicates TDM bus 130, and each UDS1 interface 252 includes a time-slot interchanger (TSI) 402 which couples concentration highway 400 to TDM bus 230. TSI 402 performs conventional time-slot interchange functions. It receives designated 64 Kbps channels (time slots) on concentration highway 400 and TDM bus 230 and transmits them on designated time slots of TDM bus 230 and concentration highway 400, respectively. TSI 402 is programmed on a per-call basis. For the purpose of switching these conventional communications, TDM bus 230 is coupled by a TMS interface 133 and trunk 109 to a TMS 121 (see FIG. 2), in the manner described for FIG. 1. For the purpose of connecting these conventional communications to public telephone network 100, TDM bus 230 is also coupled by a DS1 interface 132 and a trunk 106 to network 100.

Figure 5:
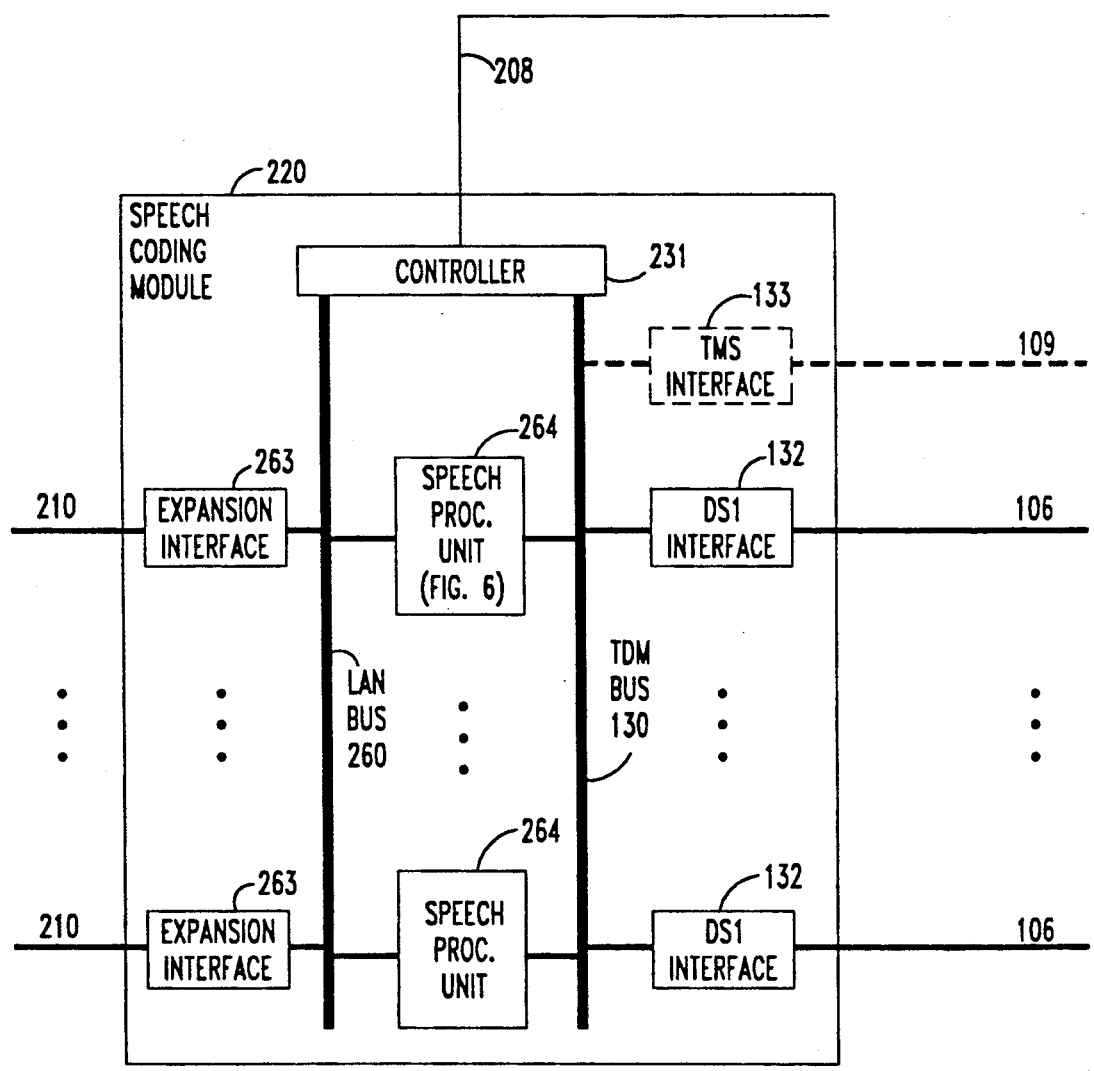
FIG. 5 is a block diagram of a speech coding module of the system of FIG. 2.

A speech coder module 220 of a digital cellular switch 201 is shown in FIG. 5. Each DCS 201 comprises one or more identical modules 220. Module 220 is illustratively the Universal Module of AT&T Definity communications system. Module 220 includes TDM bus 130 and a LAN bus 260 which is a duplicate of LAN bus 250, both operating under control of a controller 231. As in FIG. 1, TDM bus 130 is connected by DS1 interfaces 132 and trunks 106 to public telephone network 100. Fiber trunks 210 from cell interconnect modules 209 are connected to LAN bus 260 by expansion interfaces 263 which duplicate expansion interfaces 253. Each cell interface module 209 of a DCS 201 is connected to each speech coder module 220 of that DCS 201. Interconnection between DCSs 201 is provided by network 100 through trunks 106.

Buses 260 and 130 are interconnected through a plurality of call-processing nodes referred to herein as speech processing units (SPUs) 264. Based on the board address 311 prepended to each frame 310 by expansion interfaces 253 of cell interconnect modules 209, each speech processing unit 264 receives frames 310 that are addressed to it, depacketizes their contents (i.e., terminates their protocol), performs various processing functions—including speech decompression—on the contents of each received frame, and outputs the processed frame contents on TDM bus 130 in time slots which are assigned to calls on a call-by-call basis. In the reverse direction, a speech processing unit 264 receives communications over TDM bus 130 in time slots which are assigned to calls on a call-by-call basis, performs various processing functions—including speech compression—thereon, packetizes the processed communications, includes in each frame a DLCI 302 identifying a particular channel element 245 of a particular cell 202, prepends to each frame board and port addresses 311 and 312 that identify the frame's destination on LAN bus 260, and transmits the frames 310 on LAN bus 260.

As a consequence of the operations of cell interconnect modules 209 and speech coder modules 220, frames 310 being conveyed between them are statistically multiplexed onto, and frame-relayed over, trunks 210, thereby greatly increasing the traffic-carrying capacity of the bandwidth provided by trunks 210 over alternative transmission techniques such as circuit-switching.

As was mentioned in conjunction with FIG. 3, DCS 201 optionally includes a TMS 121 for servicing conventional radio telephone communications. Speech coder module 220 is connected to TMS 121 by a trunk 109 and a TMS interface 133, in the manner described for switching modules 120 of FIG. 1.

An illustrative speech processing unit 264 is shown in FIG. 6. Each SPU 264 includes a LAN bus interface 601. It monitors frames 310 traversing LAN bus 260 for pre-administered board addresses 311, and captures those having the sought-for addresses 311. LAN bus interface 601 includes a buffer 620. Upon capturing a frame 310, LAN bus interface 601 appends to it a time stamp, stores it in the buffer 620, and issues an interrupt to a processor 602. The time stamp is the present count of a counter 623, discussed further below.

The port address 312 of a frame 310 identifies one of a plurality of service circuits 612 implemented by SPU 264. A service circuit 612 is assigned to a call either for the duration of the call or until a hard handoff occurs. Each service circuit 612 has its own audio-processing circuitry. But all service circuits 612 are served on a time-shared basis by processor 602, which performs frame-selection and protocol-processing functions for all service circuits 612 of an SPU 264. The functions performed by processor 602 on frames 310 received from LAN bus interface 601 are shown in FIGS. 11-14, and 17-18, and functions performed by processor 602 on traffic segments (hereinafter also referred to as traffic frames) received from service circuits 612 are shown in FIG. 15. Processor 602 performs each of these functions for each service circuit 612 every 20 msecs. The performance of the functions is interrupt-driven, by interrupt signals provided by an adaptive synchronization circuit 611 and interface 601.

The exchange of traffic frames of incoming and outgoing call traffic is carried on between processor 602 and service circuits 612 through buffers 603 of processor 602. Each service circuit 612 has its own corresponding buffer 603. A buffer 603 buffers traffic frames passing between processor 602 and a vocoder 604 of a service circuit 612 to compensate for minor differences and fluctuations in the timing of input and output operations of processor 602 and vocoder 604.

Each service circuit 612 has its own vocoder 604. Vocoders 604 provide voice compression and decompression functions. Each is a digital signal processor that receives a traffic frame of compressed speech from processor 602 via buffer 603 at regular intervals (e.g., every 20 msecs.) and decompresses the traffic frame into a predetermined number (e.g., 160 bytes) of pulse-code-modulated (PCM) speech samples. Each byte has a duration of 125 usecs. in this example, referred to as a "tick". In the opposite direction, a vocoder 604 receives 160 bytes of PCM speech samples, performs speech compression functions thereon, and outputs a traffic frame of the compressed speech to processor 602 via buffer 603 at regular intervals (every 20 msecs.). Exchanges of traffic frames between vocoder 604 and processor 602 are timed by clock signals generated by vocoder 604 internal input and output clocks 621 and 622, while receipt and transmission of PCM samples by vocoder 604 are timed by clock signals generated by a clock circuit 600. Clocks 621 and 622 are edge-synchronized with circuit 600 clock signals at system initialization and service circuit 612 reset. Vocoders are well known in the art. Each vocoder 604 is illustratively implemented using the AT&T 16A digital signal processor (DSP) which embodies the Qualcomm, Inc. QCELP low-bit-rate variable-rate speech encoding/decoding algorithm. The QCELP algorithm provides for sending minimal information during periods of low or no speech activity. The frame transport mechanism of this embodiment ideally adapts to time-varying traffic loads.

In the case of a system handling both CDMA and TDMA traffic wherein the TDMA traffic is also frame-relayed, some of the service circuits 612 are dedicated to handling the TDMA traffic, and their vocoders 604 are illustratively the AT&T 16A digital signal processor programmed according to the TIA IS-54 standard for TDMA communications.

PCM samples on their way from vocoders 604 pass through tone-insertion circuits 605. Each service circuit 612 has its own tone-insertion circuit 605. Upon command from processor 602, a tone-insertion circuit 605 momentarily blocks and discards PCM samples output by vocoder 604, and in their place substitutes PCM samples of whatever Touch-Tone signals were specified by the command. Tone-insertion circuit 605 has no effect on PCM samples being input to vocoder 604.

Operation of tone-insertion circuit 605 is synchronized with the output of vocoder 604 by clock signals generated by clock circuit 600.

Tone-insertion circuits 605 are followed in the sequence of service circuit 612 circuitry by echo cancellers 606. Each service circuit 612 has its own echo canceller 606. Each cancels echoes of telephone network 100-bound call traffic from telephone network 100-originated call traffic, by keeping an attenuated copy of the vocoder-generated network-bound traffic and subtracting an appropriately-delayed copy from received network-bound traffic. Echo cancellers are well known in the art. Timing of echo canceller 606 operations is controlled by clock signals generated by clock circuit 600.

Echo cancellers 606 receive network-originated traffic from, and transmit network-bound traffic to, a concentration highway 607. Concentration highway 607 is a passive serial TDM bus that carries 64 Kbps time slots. Each echo canceller 606 is statically assigned its own input time slot and its own output time slot on concentration highway 607.

Concentration highway 607 is coupled to TDM bus 130 by a TDM bus interface 608. Interface 608 performs time-slot interchange (TSI) functions between highway 607 and bus 130. Its operation is timed by clock signals generated by circuit 600, and is controlled by a translation and maintenance (XLATION. AND MTCE.) unit 609. Unit 609 performs highway 607-to-bus 130 time-slot assignment functions on a per-call basis, under the direction of controller 231 of that speech coder module 220. Unit 609 communicates with controller 231 via a control channel implemented by bus 130. This control channel is interfaced to unit 609 through interface 608 and bus 613. Unit 609 provides maintenance functions to LAN bus interface 601 via control link 616.

Unit 609 exerts control over interface 608 via a translation and maintenance control bus 613, to which both are connected. Similarly, processor 602 controls circuits 601, 603-606, and 611 via a processor control bus 610. Communications between processor 602 and unit 609 are facilitated by a buffer 614 which couples bus 610 with bus 613.

Clock circuit 600 is connected to TDM bus 130 and derives timing information therefrom, in a conventional manner. Clock circuit 600 distributes this information, in the form of clock signals of various rates, including 2.048 MHz, 8 KHz, and 50 Hz (corresponding to intervals of 500 nsec., 125 usec., and 20 msec. intervals, respectively), all of which are synchronized with each other, via a clock bus 615 to circuits 604-606, 608, and 611, in order to synchronize their operation with TDM bus 130. Clock circuit 600 also distributes this information to LAN bus interface 601 for bit-time synchronization of LAN bus 260. Operation of TDM bus 130 is synchronized to network 100—hence, clock circuit 600 synchronizes operations of the various elements with the master clock of network 100.

Adaptive synchronization circuit 611 uses the clock signals obtained from clock circuit 600 to generate clock signals which are synchronized in frequency with, but are offset in phase—in amounts controlled by processor 602—from, the 20 msec. clock signals generated by clock circuit 600. These offset clock signals are used to time the operations of processor 602. The generation and use of these offset clock signals is explained further below. Physically, circuits 611 and 600 may be implemented as a single device.

Circuit 611 also includes a present-time counter 623. Counter 623 increments its count once every PCM sample tick, e.g., once very 125 usecs. This count is reset by every 50 Hz clock pulse from clock circuit 600, e.g., every 20 msecs. Counter 623 thus indicates present time relative to signals generated by clock circuit 600. A second portion of counter 623 keeps a modulo-8 count that is incremented by the 20 msec. clock pulses that reset the 125 usec. count. Counter 623 provides its counts to LAN bus interface 601 for use as a time stamp of received frames 310.

Discussion now returns to processor 602 and its packet-and frame-processing functions. (Level-2 protocol processing is commonly referred to as frame processing, while level-3 protocol processing is commonly referred to as packet processing.) The functions performed by processor 602 on frames 310 received from LAN bus 260 are shown in FIGS. 11–14. Processor 602 performs these functions for each service circuit every 20 msecs. Performance of different ones of these functions for a particular service circuit 612 is triggered by receipt of corresponding receive interrupt signals from LAN bus interface 601 and adaptive synchronization circuit 611.

As was mentioned above, upon receiving a frame addressed to the corresponding SPU 264, LAN bus interface 601 appends a time stamp to the received frame, stores the received frame in buffer 620, and issues an interrupt to processor 602. Upon being invoked by the receive interrupt signal from LAN bus interface 601, at step 900, processor 602 retrieves the received frame from buffer 620 of LAN bus interface 601, at step 902. Processor 604 then performs conventional level-2, i.e., LAPD protocol, processing on the frame, at step 904. This processing may include acknowledging receipt of the frame. Upon completing level-2 processing, processor 604 checks control field 303 to see if this is a level-2 only frame (e.g., a loop-around test frame), at step 906. If so, processing of the frame is completed, and processor 602 merely returns to the point of its invocation, at step 908. But if this is not a level-2 only frame, i.e., its user data field 304 carries a level-3 protocol, processor 602 uses the frame's DLCI 302 to select from its memory the stored call state of the call to which the frame pertains, at step 910. Next, processor 602 checks, at step 911, packet type field 321 of the received level-3 protocol to determine the packet type: traffic or signalling. If field 321 identifies the packet as a signalling packet, it means that the packet carries cell-to-switch signalling information, i.e., signalling intended for DCS 201. Processor 602 therefore performs the signalled function, at step 970. This may be any one of 3 functions: to update call state by either setting up or tearing down a call or adding or removing a second cell in soft handoff, to insert tones into the telephone network-bound portion of the call, or to perform initial clock synchronization (discussed in conjunction with FIG. 17). Processor 602 then returns to the point of its invocation, at step 946. Voice/signalling packets 350 are sent and received at 20 msec. intervals, while signalling-only packets 351 may be sent at any time as required to send signalling information.

If field 321 identifies the packet as a traffic packet, processor 602 performs clock adjustment and synchronization functions, at step 912, to shift the offset of clock signals generated by circuit 611 from clock signals generated by circuit 600 by an amount determined by processor 602 or dictated by clock adjust field 322 of the received packet. These are described in conjunction with FIG. 18. Processor 602 then checks voice/signalling type field 326 of the received level-3 packet, at step 914, to identify the type of information carried by the packet: voice only, voice plus signalling, or signalling only. If the traffic packet is a voice-only packet, processor 602 checks the retrieved call state to determine if the call is in soft handoff, at step 916. If not, processor 602 checks air CRC field 323 of the frame (containing the result of a check-sum computed over the CDMA transmission between cell 202 and mobile telephone 203), at step 918. If the air CRC does not check out, it means that the packet carries defective information, and so processor 602 discards the packet, at step 923, and then returns, at step 946. Vocoder 604 will mask the loss of that traffic. If the air CRC checks out at step 918, processor 602 checks signal quality field 324 of the packet to determine whether the voice quality meets a predetermined threshold value, at step 919. If the voice quality does meet the threshold value, processor 602 marks the packet as "good" by appending a command thereto, at step 920, stores the packet of voice information in buffer 603 which is allocated to the appropriate service circuit 612, at step 922, and then returns to the point of its invocation, at step 926. If the voice quality does not meet the minimum threshold value, processor 602 marks the packet as "bad", at step 921, stores the packet in buffer 603 of the appropriate service circuit 612, at step 922, and then returns, at step 946.

During the procedures just described, processor 602 uses contents of sequence number field 320 of the received packet to detect and handle lost or out-of-sequence packets, in a conventional manner.

Returning to step 916, if the call is in "soft handoff", processor 602 should be receiving two packets for the call every 20 msecs., each from a different cell 202 but generally carrying identical information. So processor 602 checks whether it has yet received both duplicate packets, at step 932. The duplicate packets are identified by having the same sequence number in field 320. If not, meaning that processor 602 has received either only one of the expected duplicate packets, or has received packets from both cells but bearing different sequence numbers, processor 602 checks the sequence number of the just-received packet, at step 933, to determine whether its sequence number is greater than, equal to, or less than the expected sequence number. If the sequence number of the received packet is greater than the expected sequence number, processor 602 stores the received packet, at step 934, updates the associated call's state to indicate that one of the packets that will be expected in the future has been received, at step 935, and returns, at step 946. Updating of the call state at step 935 includes storing the contents of power control field 325 of the received packet. If the sequence number of the received packet is equal to the expected sequence number, processor 602 proceeds to steps 918 et seq. to process the packet as described previously. And if the sequence number of the received packet is less than the expected sequence number, processor 602 discards the received packet, at step 936, and then returns, at step 946. Again, vocoder 604 will mask the loss of that traffic.

Returning to step 932, if processor 602 finds that it has received both expected packets, processor 602 updates the call state to so indicate, at step 938. This includes storing the contents of power control field 325 of the received packet. It then retrieves the first-received expected packet (now stored in a buffer 603) and compares the air CRC and the signal quality indicia of both packets to determine which packet is better, at step 940. Processor 602 then checks the voice quality field of the better packet to determine whether the voice quality meets a predetermined threshold value, at step 941. If not, processor 602 marks the better packet as "good" by appending a command thereto, at step 943; if so, processor 602 marks the better packet as "bad", at step 942. Processor 602 then discards the worse packet and stores the better packet in buffer 603 of the corresponding call channel, at step 944. Processor 602 then returns, at step 946.

Figure 12:
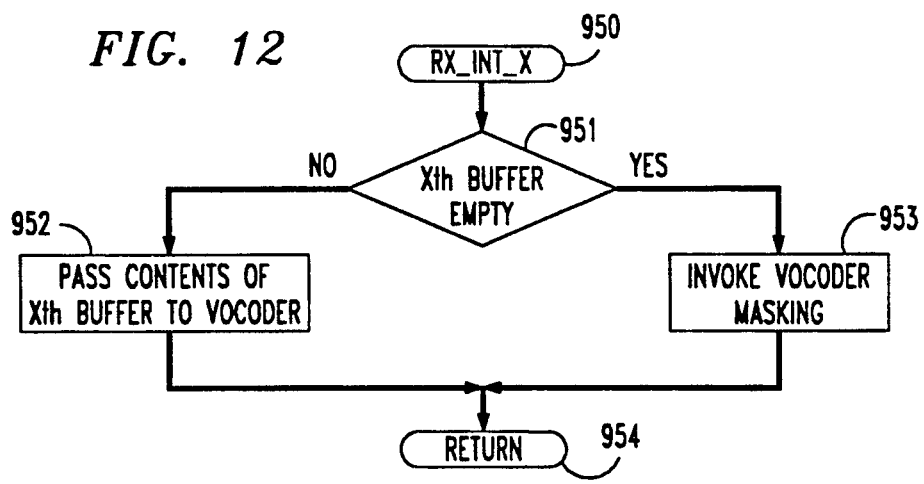

Turning to FIG. 12, following step 946, when processor 602 is invoked at step 950 by a receive interrupt signal RX_INT_X for a particular (Xth) service circuit 612, processor 602 checks buffer 603 corresponding to that service circuit 612 to determine if buffer 603 is empty, at step 951. If not, processor 602 retrieves the contents of that buffer 603 and passes the retrieved contents to vocoder 604 of that service circuit 612, at step 952. If buffer 603 is empty, processor 602 invokes a function in vocoder 604 of the appropriate service circuit 612 to mask the loss of the voice segment carried by the discarded packet, at step 953. Vocoder 604 masks the loss by generating at its output to circuit 605 PCM samples that it generates as a function of previously-received packets. Processor 602 then returns to the point of its invocation, at step 954.

Returning to step 914, a traffic packet that carries signalling information is encountered by processor 602 only during "soft handoff", as under normal circumstances signalling is sent directly to mobile telephone 203 from cell 202 involved in a given call. If the traffic packet carries only signalling information, processor 602 proceeds to step 955 of FIG. 13. There, processor 602 checks further contents of voice/signalling type field 326, to determine the signalling direction: forward and/or reverse. If the direction is forward, identifying the signalling as being originated by a cell 202 and destined for a mobile telephone 203, processor 602 merely stores the packet, at step 956, and then returns, at step 970. If both signalling directions are indicated, processor 602 stores the forward signalling, at step 957, and then proceeds to step 958. If the direction is reverse, identifying the signalling as being originated by a mobile telephone 203 and destined for cells 202, processor 602 checks, at step 958, whether it has received signalling packets from both sides (i.e., from both of the cells 202 involved in the "soft handoff"). If not, processor 602 stores the packet, at step 960, and then updates the corresponding call's state to indicate that a signalling packet from one side has been received, at step 962. Processor 602 then returns, at step 970. If the check at step 958 reveals that signalling packets from both sides have been received, processor 602 updates the corresponding call's state to so indicate, at step 964, and then compares the air CRC and signal quality fields 323 and 324 of the two packets to determine which packet carries the better quality signals, at step 966. Processor 602 then discards the worse packet and stores the better one, at step 968, and then returns, at step 970.

Figure 11:
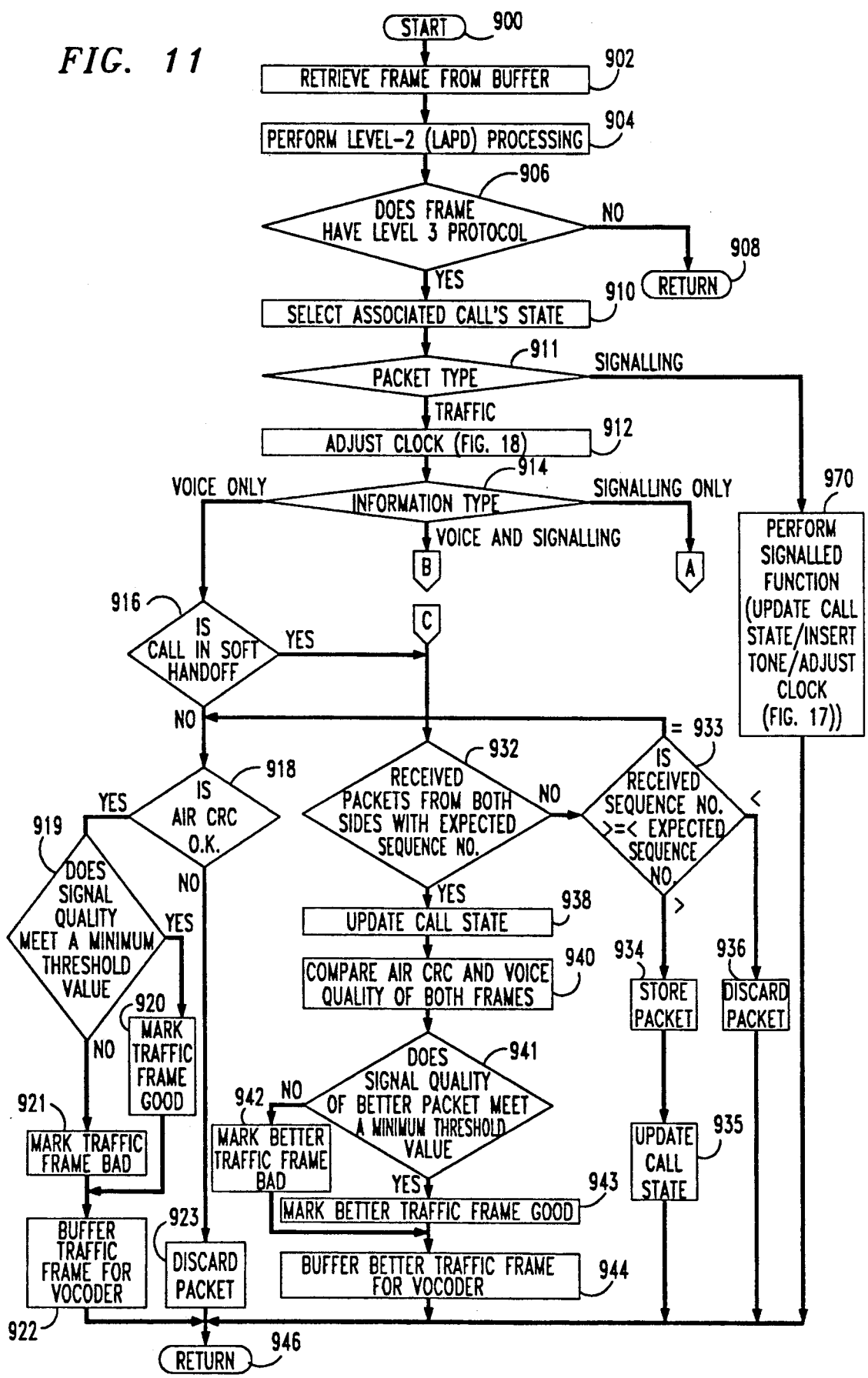
FIGS. 11-14 are a flow diagram of received-packet processing functions of the processor of the unit of FIG. 6.
Figure 13:
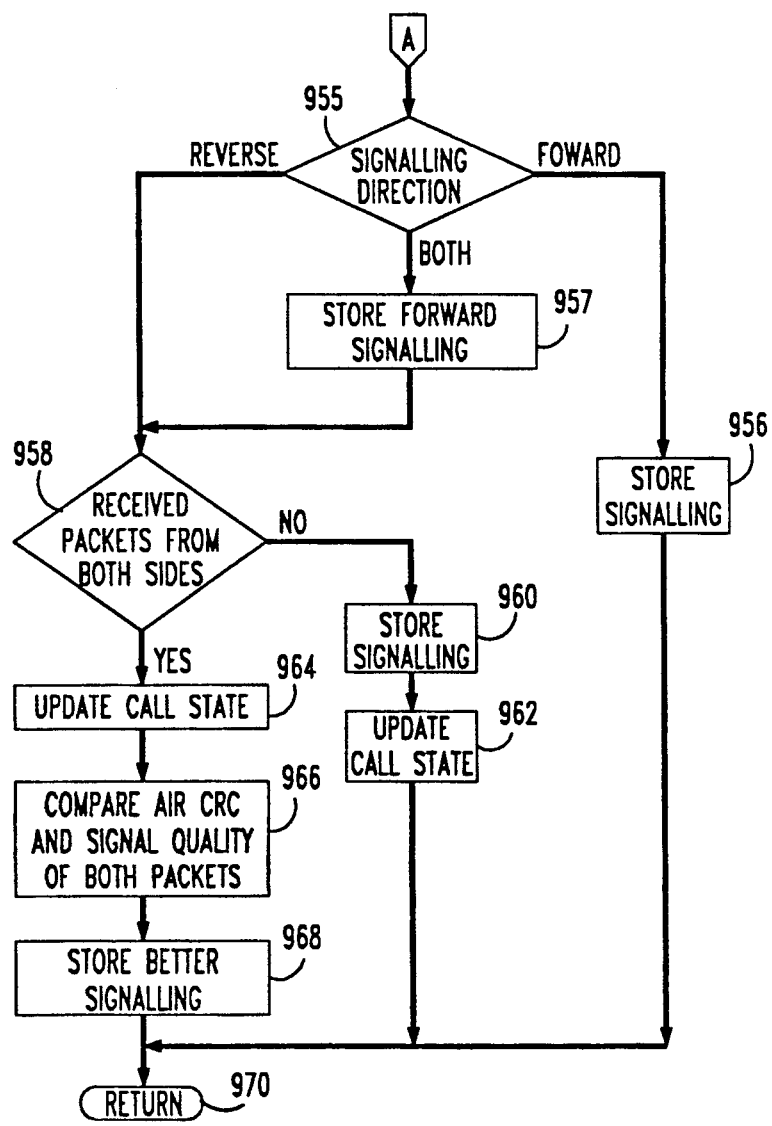
Figure 14:
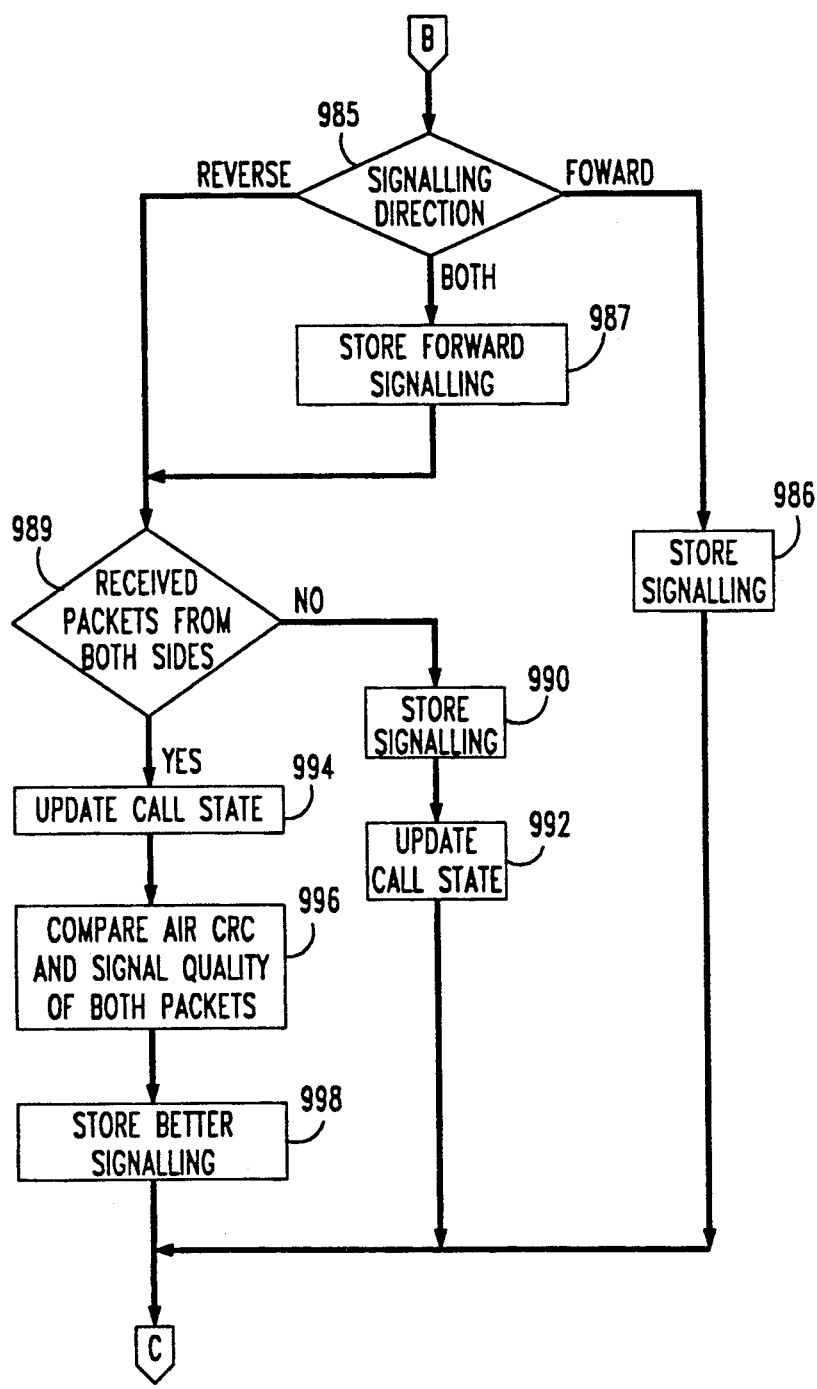
Figure 15:
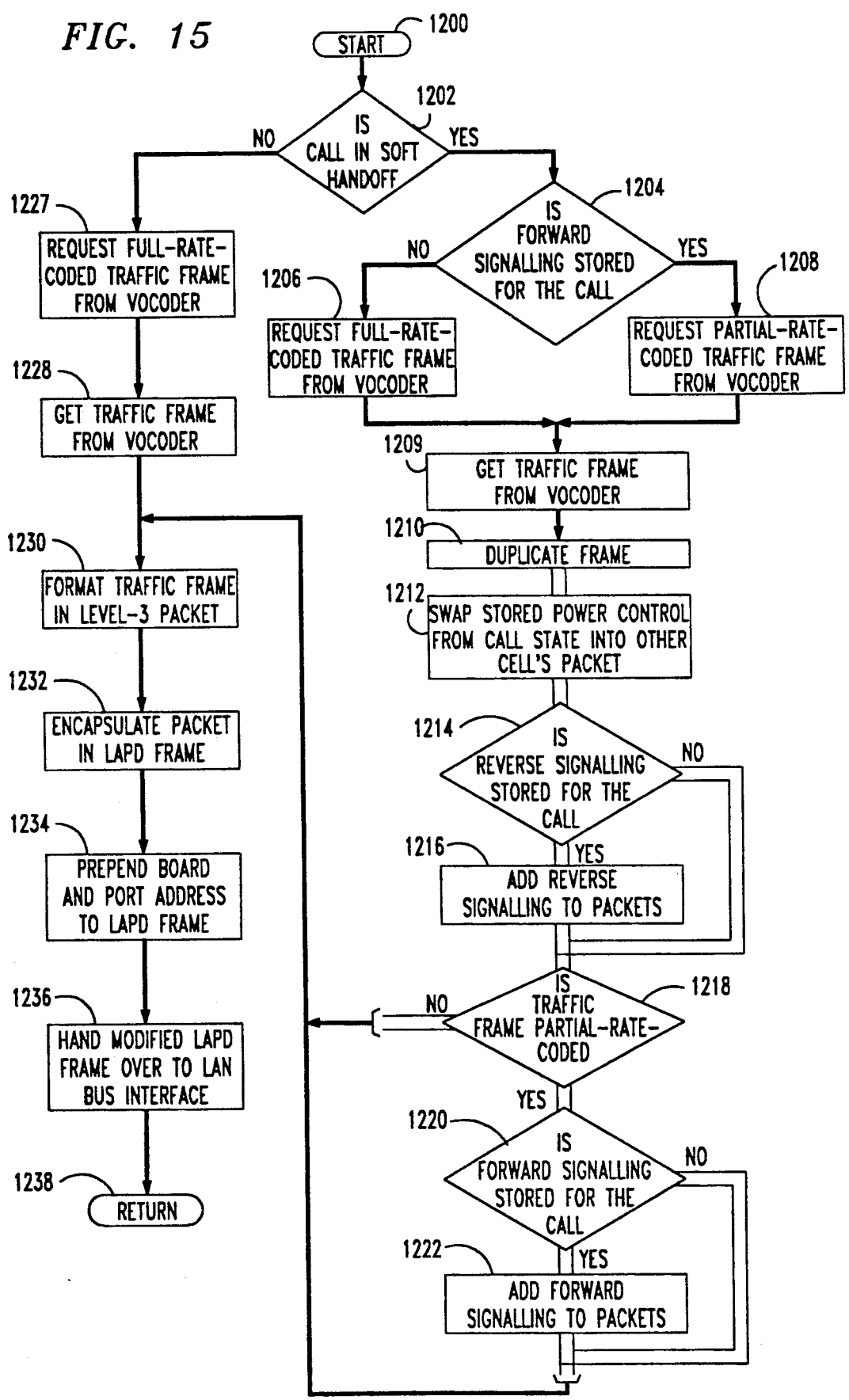
FIG. 15 is a flow diagram of transmit-packet processing functions of the processor of the unit of FIG. 6.

Returning to step 914, if processor 602 determines that the packet carries both voice and signalling information, processor 602 proceeds to step 985 of FIG. 14, and performs signalling-processing steps 985-998 of FIG. 14 which duplicate steps 955-968 of FIG. 13, and then proceeds to step 932 of FIG. 11 to perform the voice-processing steps.

The functions performed by processor 602 on traffic frames (segments of voice information) received from vocoders 604 are shown in FIG. 15. Processor 602 performs these functions for each service circuit 612 every 20 msecs. The performance of the functions for a particular service circuit 612 is also interrupt-driven, by receipt of a corresponding transmit interrupt signal provided by adaptive synchronization circuit 611.

Upon being invoked by a transmit interrupt signal TX_INT_X to start processing for a particular (Xth) service circuit 612, at step 1200, processor 602 checks the stored call state of the call that is being served by this service circuit 612 to determine whether the call is in soft handoff, at step 1202. If not, processor 602 accesses vocoder 604 of the service circuit 612 that is being served and requests therefrom a traffic frame of full-rate-coded call information, at step 1227. Upon receiving a traffic frame from that vocoder 604, at step 1228, processor 602 formats the traffic frame in the level-3 protocol, at step 1230. This includes prepending a sequence number and a traffic type to the call traffic. Processor 602 then conventionally encapsulates the formatted traffic frame in LAPD frame format, at step 1232, to form a LAPD frame 300 (see FIG. 7). This includes retrieving the DLCI which is associated with the mobile-bound direction of the call and which identifies a particular channel element 245 of a particular cell 202 (see FIG. 3) that is serving the cell, and including it in LAPD frame 300. Processor 602 then uses this DLCI to find in a table the board and port addresses 311 and 312 that correspond to this DLCI, and prepends the found addresses 311 and 312 to LAPD frame 300 to form a modified LAPD frame 310 (see FIG. 8), at step 1234. Processor 602 hands frame 310 over to LAN bus interface 601 for transmission onto LAN bus 260, at step 1236. Processor 602 then returns to the point of its invocation, at step 1238.

Returning to step 1202, if processor 602 determines that the call is in soft handoff, it checks the stored call state of the call to determine whether any forward signalling is stored for this circuit, at step 1204. Forward signalling would have been received only from the cell 202 that has been handling the call (referred to as the master cell 202) and stored at step 956 or 957 of FIG. 13, or step 986 or 987 of FIG. 14. If forward signalling is not stored, processor 602 accesses vocoder 604 of the service 612 circuit that is being served and requests therefrom a traffic frame of full-rate-coded communication information, at step 1206. But if forward signalling is stored, processor 602 must reserve room in a packet for the forward signalling information, and so it accesses vocoder 604 and requests therefrom a traffic frame of only partial-rate-coded communication information, at step 1208.

Vocoder 604 typically supplies traffic frames of full-rate-coded information, and it may not be able to respond to the request for a traffic frame of partial-rate-coded information instantly. Further, given a pause in speech activity, a partial-rate coded traffic frame may be supplied even if a full-rate-coded traffic frame has been requested. Processor 602 will check for this condition, at step 1218.

When it has received a traffic frame from vocoder 604, at step 1209, processor 602 duplicates the traffic frame, at step 1210, so as to have duplicate copies to send to both cells 202 that are involved in the soft handoff. At step 1212, processor 602 then retrieves power control information that will have been stored at steps 935 and 938 of FIG. 11 from both cells 202 that are involved in the soft handoff, swaps it so that each of the two cells 202 will be sent the power control information that was received from the other of the two cells 202, and inserts the swapped information into the duplicate packets as power control field 325, at step 1212. Processor 602 then checks the call's state to determine whether reverse signalling for the call has been received and stored at step 968 of FIG. 13 or step 998 of FIG. 14, at step 1214. If reverse signalling is available, processor 602 appends it to both of the duplicate packets, at step 1216. Following step 1216, or if no reverse signalling is available, processor 602 checks whether it had been supplied by vocoder 604 with a frame of full-rate-coded or partial-rate-coded information, at step 1218. If the traffic frame is full-rate-coded, it has no room for forward signalling information, and so processor 602 proceeds to steps 1230 et seq. to format, packetize, and transmit both of the duplicate packets. Packetization at step 1234 involves including in each duplicate packet's frame protocol 300 a different DLCI, so that the two packets will each travel to a different cell 202 involved in the soft handoff. Returning to step 1218, if the traffic frame is partial-rate-coded, processor 602 checks the call's state to determine whether forward signalling for the call had been received and stored at step 956 of FIG. 13 or step 986 of FIG. 14, at step 1220. If forward signalling is available, processor 602 appends it to both of the duplicate packets, at step 1222. Following step 1222, or if no forward signalling is available, processor 602 proceeds to steps 1230 et seq.

The synchronization of cell 202 and SPU 264 operations will now be explained in greater detail in conjunction with FIGS. 16–22.

Figure 19:
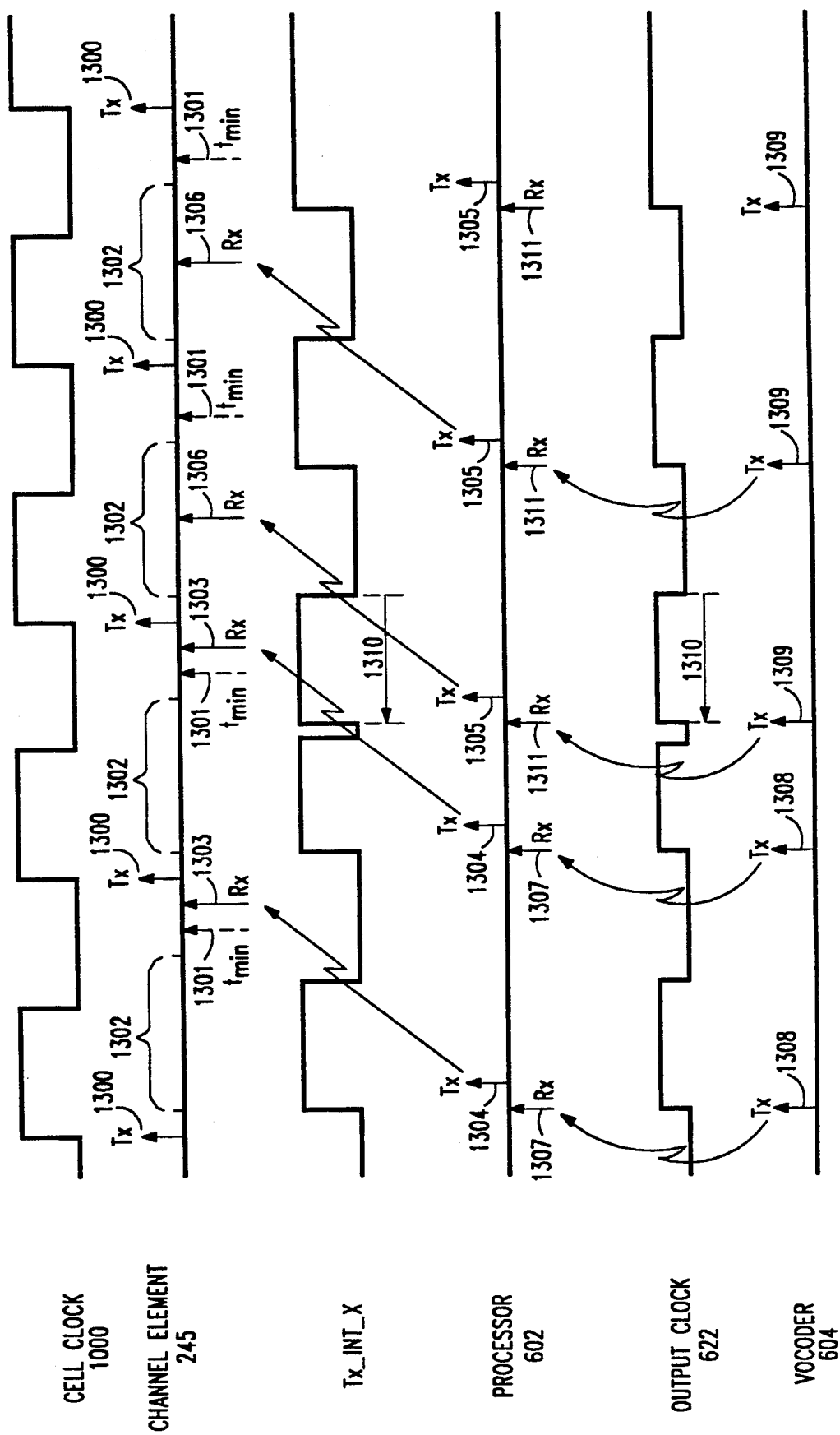
FIG. 19 is a timing diagram of packet-transmission clock-adjustments performed at call setup for a service circuit of the unit of FIG. 6.

FIG. 19 represents the scenario for initial timing adjustments for traffic flow from network 100 to mobile radio-telephones 203. As was mentioned above, the operations of all mobile-radio-telephones 203 and all channel elements 245 of all cells 202 are driven and synchronized to a common timing signal, which may be a signal broadcast by a global positioning satellite. Each cell 202 derives therefrom a 20 msec. cell clock 1000 signal, which triggers each channel element 245 involved in a call to make a transmission to the corresponding mobile telephone 203 every 20 msecs. at time 1300. A programmed, constant, offset (which may be zero) may exist for a given call (i.e., an offset between the rising edge of cell clock 1000 and time Tx 1300). This constant offset affects the relative positions of signals 1304, 1307, 1308, and 1309 by the amount of said offset.

In order to be able to transmit call traffic at time 1300, a channel element 245 must receive that call traffic at least some minimum period of time prior to time 1300, at a time $t_{min}$ 1301. Channel element 245 preferably receives the information for transmission within a time window 1302, which exists a little after time 1300 of the prior transmission and a little before time 1301 of the present transmission. Window 1302 thus provides some leeway for minor time fluctuations. However, when a call is being established, it is uncertain when channel element 245 that is handling the call will receive a packet of call traffic for transmission from SPU 264. This is because, as was mentioned previously, the operations of mobile telephone switches 201 are controlled by a different clock than that of cells 202, which clock is not synchronized with, but is independent of, cell clock 1000. Furthermore, other factors, such as differences in distances between mobile telephone switches 201 and different cells 202 and different traffic loads being conveyed between them—and consequent different transmission delays between them—also make the time of receipt uncertain. Therefore, when a call path is first established between a channel element 245 and an SPU 264 and null traffic begins to flow between them, packets from SPU 264 may be received by channel element 245 at times 1303 that are outside of windows 1302 and—in the worst case—are after times $t_{min}$ 1301. If that is the case, the channel element's corresponding channel controller 244 sends a signalling packet to SPU 264 indicating a need to adjust the time of transmission of packets from SPU 264 and also indicating the amount of time by which that transmission time must be adjusted to position the time of receipt of the packets at channel element 245 safely within windows 1302.

Figure 16:
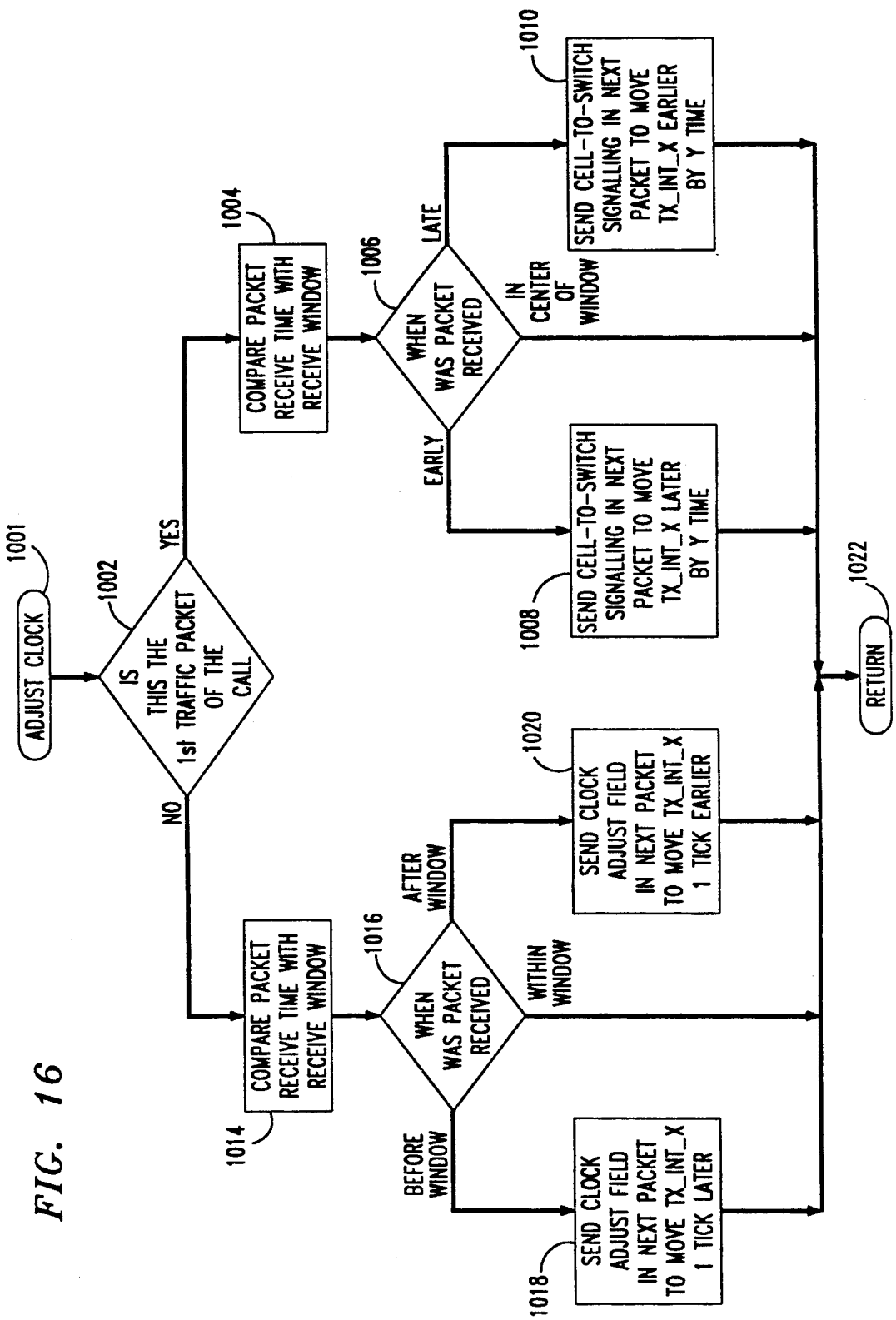
FIG. 16 is a flow diagram of clock adjustment functions of a cluster controller of the cell of FIG. 3.

The clock adjustment functions performed at cell 202 are shown in FIG. 16. They constitute a processor-performed routine invoked upon receipt of a packet at cluster controller 244. When the routine is invoked, at step 1001, it checks whether the received packet is the first traffic packet received for the call, at step 1002. If so, the routine compares the time at which the packet was received with a window 1302 (the definition of which is stored in cluster controller 244), at step 1004, to determine, at step 1006, when in relation to window 1302 the packet was received. If the packet was received substantially in the center of window 1302, no clock adjustment is necessary and the routine merely returns to the point of its invocation, at step 1022. If the packet was received too early, the routine causes a cell-to-switch type of signalling packet to be sent to processor 602 of SPU 264 that is handling the call, at step 1008, requesting processor 602 to delay the time of the TX_INT_X interrupts for this call by a time, also specified in the packet, such as will move the time of receipt substantially to the center of window 1302. Conversely, if the packet was received too late, the routine causes a cell-to-switch type of signalling packet to be sent to processor 602, at step 1010, requesting that the time of the TX_INT_X interrupts for this call be advanced by a specified time. The routine then returns to the point of its invocation, at step 1022.

Alternatively, the routine need not respond merely to the first traffic packet received, but may calculate an average time of required clock adjustment based on the receipt of a plurality of received traffic packets.

Packet receive times 1303 at channel element 245 correspond to packet transmit times 1304 at SPU 264. As was mentioned previously, transmission of packets to channel element 245 from SPU 264 is triggered by transmit interrupt signals TX_INT_X issued to processor 602 by adaptive synchronization circuit 611. Consequently, adjustment of the packet receive times at channel element 245 by a certain amount requires an adjustment of TX_INT_X signals at circuit 611 by the same amount. Therefore, when processor 602 receives the abovementioned signalling packet from channel element 245, it responds thereto at step 970 of FIG. 11 by commanding adaptive synchronization circuit 611 to adjust the TX_INT signal for the corresponding service circuit 612 by the specified amount. Circuit 611 obliges and shifts that transmit interrupt signal by the specified time period, designated as 1310 in FIG. 19. Packet transmission time is thus shifted from times 1304 to times 1305 at SPU 264, which corresponds to packet receive times 1306 at channel element 245. Packet receive times 1306 lie within windows 1302.

However, in order to be able to transmit a packet at a given time, processor 602 must receive the traffic frame (segment of call traffic) which is included in that packet from vocoder 604 at some time prior to the transmit time. Packet transmit times 1304 correspond to frame receipt times 1307, which in turn correspond to vocoder 604 traffic frame transmit times 1308, whereas shifted packet transmit times 1305 correspond to shifted traffic frame receipt times 1311, which in turn correspond to vocoder 604 traffic frame transmit times 1309. Consequently, processor 602 must cause vocoder 604 to shift its traffic frame transmit times from times 1308 to times 1309.

Vocoder 604 uses the output of an internal output clock 622 to time its traffic frame transmissions. Clock 622 of an Xth service circuit 612 is initially synchronized to clock input signals received from clock circuit 600. Processor 602 sends a command to vocoder 604 to adjust the offset of its output clock 622 signals from the circuit 600 clock input signals by the abovementioned time period 1310 that was specified in the signalling packet which processor 602 received from channel element 245. Vocoder 604 does so, thereby shifting its traffic frame transmit times from times 1308 to times 1309. The net result is that the asynchronous operations of channel element 245 and service circuit 612 and processor 602 have been synchronized with each other.

Figure 17:
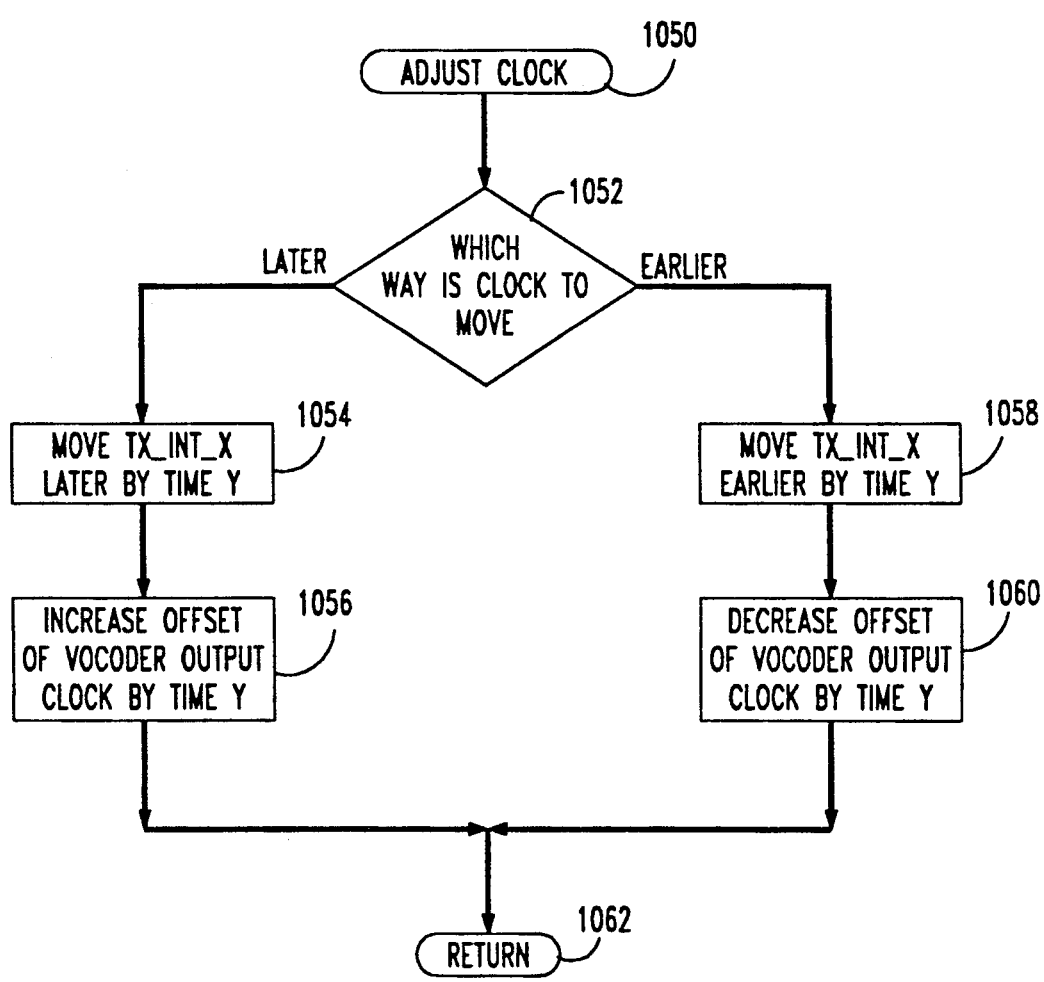
FIG. 17 is a flow diagram of clock adjustment functions of the processor of the unit of FIG. 6 performed at step 970 of FIG. 11.

The response scenario of processor 602 to receipt of the clock-adjust signalling packet from cell 202 is charted in FIG. 17. Upon determining that the received signalling packet requests clock adjustment to be performed, at step 1050, processor 602 checks contents of the packet to determine the direction in which the timing signals are to be moved, at step 1052. If they are to be delayed, processor 602 sends a command to adaptive synchronization circuit 611 to retard subsequent TX_INT_X interrupt signals by the amount of time specified in the packet, at step 1054. Processor 602 also sends a command to vocoder 604 to increase the offset of its output clock 622 from clock 600 signals by the same amount of specified time, at step 1056, and then returns, at step 1062. If the timing signals are to be moved forward in time, processor 602 sends a command to adaptive synchronization circuit 611 to advance subsequent TX_INT_X interrupt signals by the amount of time specified in the received signalling packet, at step 1058. Processor 602 also sends a command to vocoder 604 to decrease the offset of its output clock 622 from clock 600 signals by the same amount of specified time, at step 1060, and then returns, at step 1062.

Figure 20:
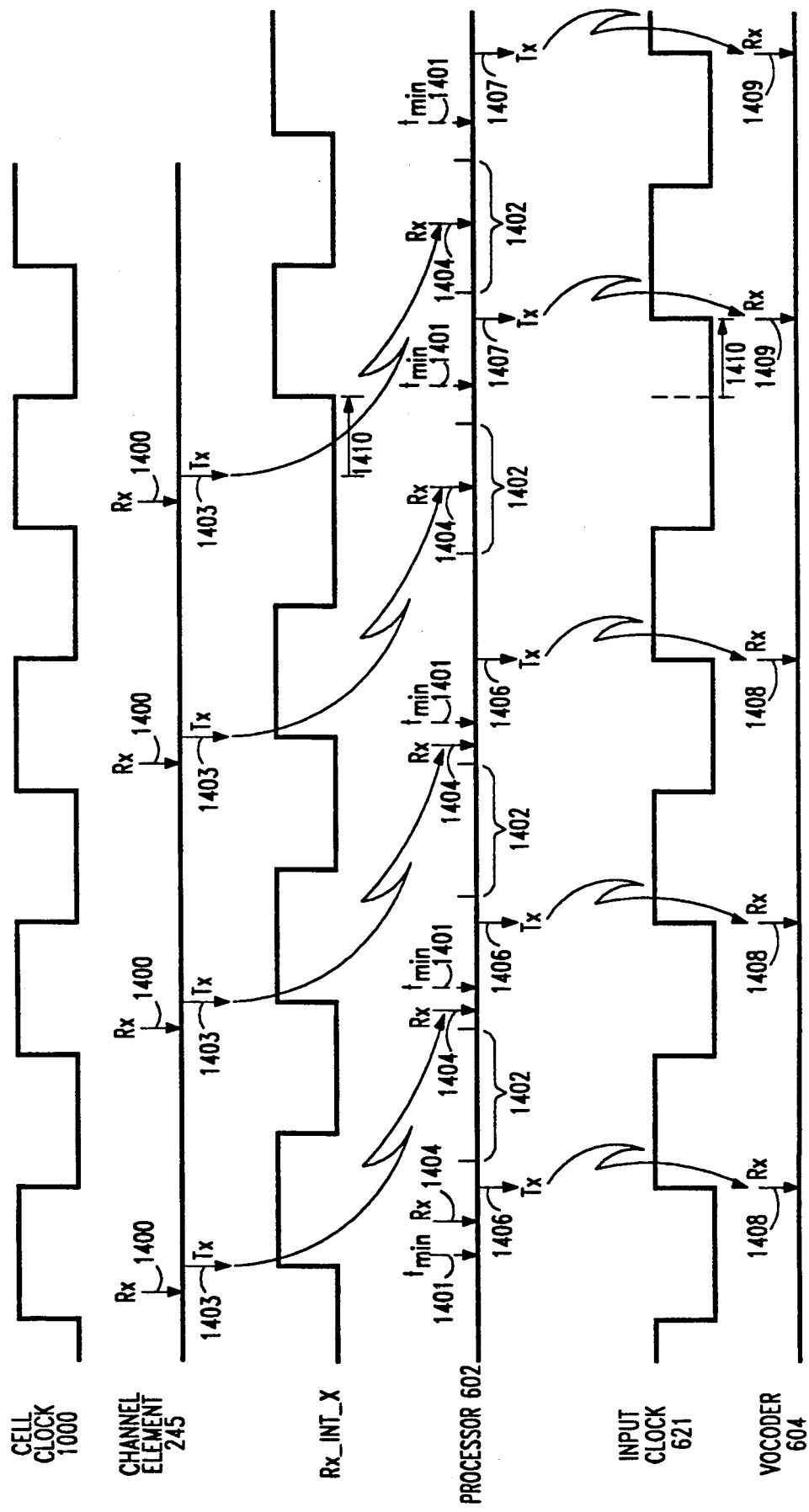
FIG. 20 is a timing diagram of packet-reception clock-adjustments performed at call setup for a service circuit of the unit of FIG. 6.

FIG. 20 represents the scenario for initial timing adjustments for traffic flow from mobile radio-telephones 203 to network 100. As was mentioned above, mobile radio-telephones 203 and cells 202 are synchronized with each other. A clock corresponding to cell clock 1000 (derived by mobile telephone 203 from traffic received by it from cell 202) causes a mobile-radio-telephone 203 to make a transmission every 20 msecs. to channel element 245 that is handling the call, causing channel element 245 to receive those transmissions at times 1400 and to convey them in packets to SPU 264 at times 1403. Packet transmit times 1403 at channel element 245 correspond to packet receive times 1404 at processor 602 of SPU 264. Receive times 1400 are relatively offset from cell clock 1000 by the amount of a programmed, constant, offset at cell 202 with respect to transmit times 1300. Thus, an offset in transmit times 1300 results in a like offset in receive times 1400. This offset is compensated for by the mechanisms described herein.

Reception of packets from channel element 245 for a particular (Xth) service channel 612 is triggered at processor 602 by a receive interrupt signal RX_INT_X for that service channel 612, generated by adaptive synchronization circuit 611. Reception of the packets must precede by some minimum time the transmission of the call traffic frames contained in the packets to vocoder 604, to give processor 602 sufficient time for processing of the packets. Initially, vocoder 604 expects to receive traffic frames at times 1408, which correspond to traffic frame transmission times 1406 from processor 602. Consequently, in order to be able to transmit traffic frames to vocoder 604 at times 1406, processor 602 must receive corresponding packets from channel element 245 no later than at times $t_{min}$ 1401. Processor 602 preferably receives each packet within a time window 1402, which exists a little after transmit time 1406 of the prior frame transmission to vocoder 604 and a little before time $t_{min}$ 1401 of the present frame transmission. Window 1402 thus provides some leeway for minor time fluctuations.

However when a call is being established, it is uncertain when processor 602 will receive a packet of information from channel element 245, for the same reasons as it is uncertain when channel element 245 will receive a packet from processor 602, discussed above. Therefore, when a call path is first established between a channel element 245 and an SPU 264 and null traffic begins to flow between them, packets from channel element 245 may be received by processor 602 at times 1404 that are outside of windows 1402 and—in the worst case—are after times $t_{min}$ 1401. Processor 602 cannot change the times 1403 at which channel element 245 transmits packets, and therefore it cannot change the times 1404 at which it receives those packets; processor 602 can only change the times 1406 when it transmit frames to vocoder 604. Hence, if times 1404 lie outside of windows 1402, processor 602 determines a time period 1410 by which it needs to adjust its time of transmission of frames to vocoder 604 in order to position the times 1404 of its receipt of packets safely within windows 1402. Processor 602 then commands adaptive synchronization circuit 611 to adjust the receive interrupt signal RX_INT_X for the corresponding service circuit 612 by the specified amount. Circuit 611 obliges and shifts that receive interrupt signal by the specified time period 1410. Frame transmission times from processor 602 is vocoder 604 are thus shifted from times 1406 to times 1407, which shifts packet receive times 1404 at processor 602 inside windows 1402.

However, in order to be able to shift its frame transmit times from times 1406 to times 1407, processor 602 must cause vocoder 604 to shift its frame receive times from times 1408 to times 1409. Vocoder 604 uses the output of an internal input clock 621 to time its frame receptions. Like output clock 622, input clock 621 is synchronized to clock 600 input signals. Processor 602 therefore sends a command to vocoder 604 to adjust the offset of its input clock 621 signals from the clock 600 input signals by the abovementioned time period 1410. Vocoder 604 does so, thereby shifting its frame receive times from times 1408 to times 1409. Again, the net result is that the asynchronous operations of channel element 245 and service circuit 612 and processor 602 have been synchronized with each other.

Figure 18:
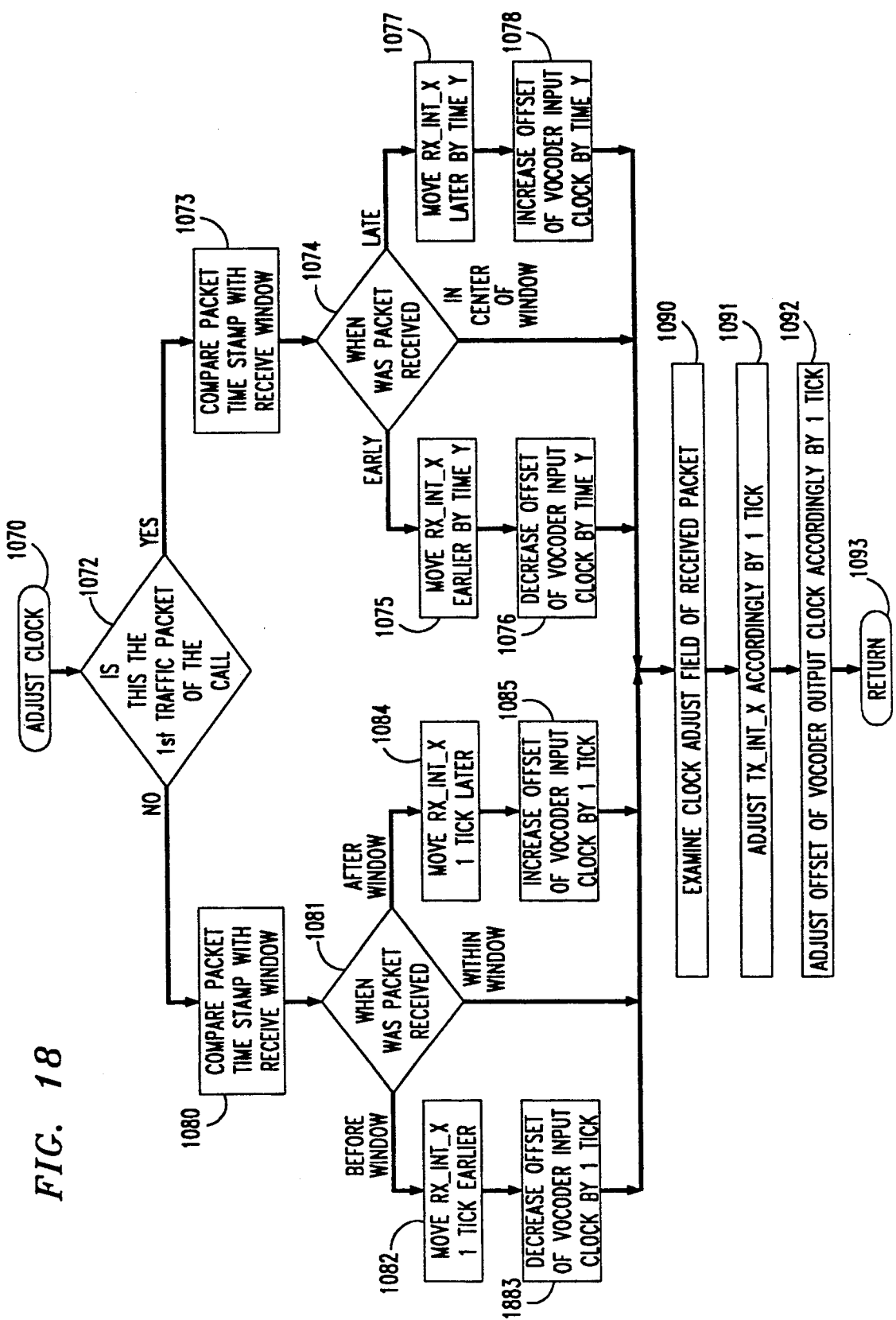
FIG. 18 is a flow diagram of clock adjustment functions of the processor of the unit of FIG. 6 performed at step 912 of FIG. 11.

The just-described clock adjustment functions are performed by processor 602 at step 912 of FIG. 11, and are shown in FIG. 18. Upon commencing to perform the clock adjustment function, at step 1070, processor 602 determines from the retrieved call state and the received packet type whether the received packet is the first traffic packet for the call, at step 1072. If so, processor 602 compares the packet's receive time stamp (appended to the packet by LAN interface 601) with a window 1402 (the definition of which is computed and stored by processor 602 for each call that it is handling), at step 1073, to determine, at step 1074, when in relation to window 1402 the packet was received. If the packet was received substantially in the center of window 1302, no clock adjustment is necessary, and processor 602 proceeds to step 1090. If the packet was received too early, processor 602 commands adaptive synchronization circuit 611 to advance subsequent RX_INT_X interrupt signals by the amount of time determined by processor 602 to be necessary to move the time of receipt substantially to the center of window 1402, at step 1075. Processor 602 also sends a command to vocoder 604 to increase the offset of its input clock 621 from clock 600 signals by the same amount of specified time, at step 1076. Conversely, if the packet was received too late, processor 602 commands adaptive synchronization circuit 611 to retard subsequent RX_INT_X interrupt signals by the amount of time determined by processor 602 to be necessary to move the time of receipt substantially to the center of window 1402, at step 1077. Processor 602 also sends a command to vocoder 604 to decrease the offset of its input clock 621 from clock 600 signals by the same amount of specified time, at step 1078. Following step 1076 or 1078, processor 602 proceeds to step 1090 (described further below).

Figure 21:
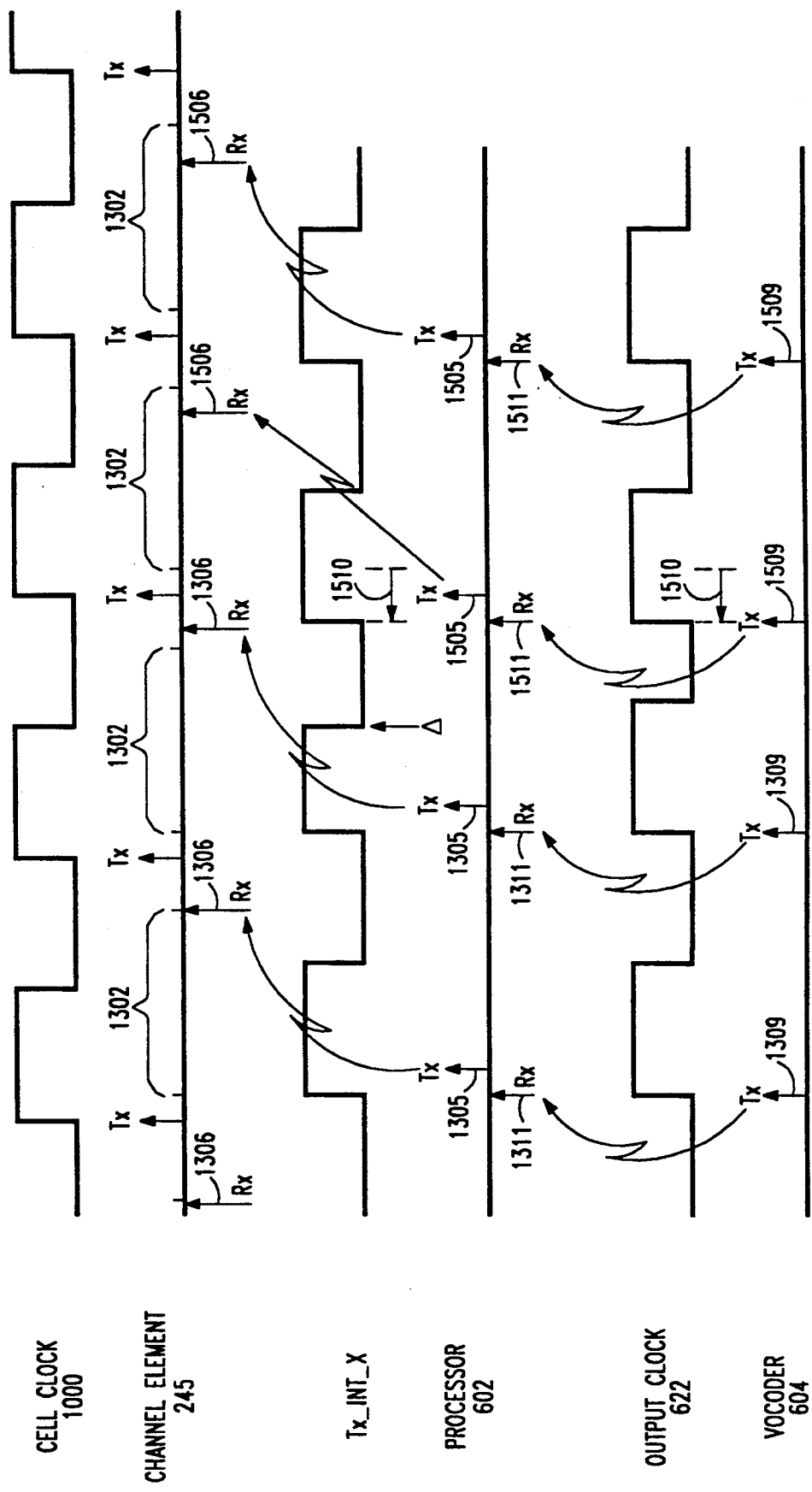
FIG. 21 is a timing diagram of packet-transmission clock-adjustments performed during an established call for a service circuit of the unit of FIG. 6.
Figure 22:
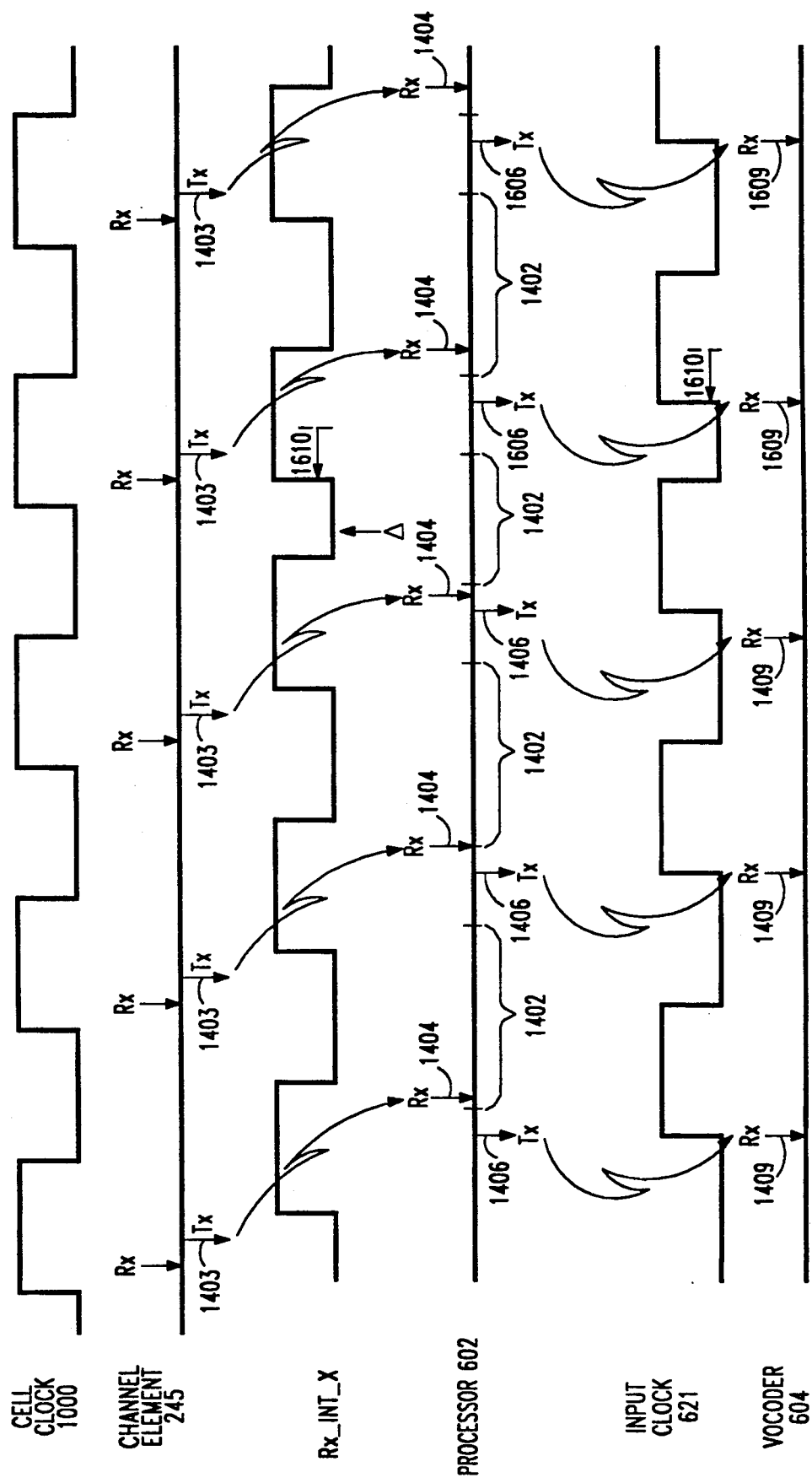
FIG. 22 is a timing diagram of packet-reception clock-adjustments performed during an established call for a service circuit of the unit of FIG. 6.

As the call progresses, changes in system traffic load, or drift between the master clock to which cells 202 are synchronized and the master clock to which mobile telephone switches 201 are synchronized, may cause packet receive times 1306 at channel elements 245 to drift out of windows 1302, as illustratively shown in FIG. 21, and may cause packet receive times 1404 at processor 602 of SPU 264 to drift out of windows 1402, as illustratively shown in FIG. 22. The drift due to changes in system traffic load will tend to be in the same direction with respect to times 1306 and 1404: drift that advances time 1306 with respect to window 1302 (shown in FIG. 21) will typically also advance time 1404 with respect to window 1402 (not shown), whereas drift that retards time 1404 with respect to window 1402 (shown in FIG. 22) will typically also retard time 1306 with respect to window 1302 (not shown). Conversely, the drift due to asynchrony between the master clocks will tend to be in opposite directions.

Drifting of times 1306 out of windows 1302 is detected by the channel element's corresponding cluster controller 244. Its response thereto is shown in FIG. 16. Upon receipt of a packet at cluster controller 244, the routine of FIG. 16 is invoked, at step 1001, and it checks whether the received packet is the first traffic packet received for the call, at step 1002. Since the call is in progress, this will not be the first received traffic packet, and the routine continues at step 1014. There, the routine compares the time at which the packet was received with window 1302, the same as at step 1004, to determine, at step 1016, when in relation to window 1302 the packet was received. If the packet was received within window 1302, no clock adjustment is necessary, and the routine merely returns, at step 1022. If the packet was received prior to occurrence of window 1302, the routine causes the next traffic packet for this call that is sent to processor 602 of the SPU 264 that is handling the call to convey in its clock adjust field 322 a request to retard the time of the TX_INT_X interrupts for this call by one tick (e.g., one PCM speech sample time), at step 1018. Conversely, if the packet was received after occurrence of window 1302, the routine causes the next traffic packet for this call to convey in its clock adjust field 322 a request to processor 602 to advance the time of the TX_INT_X interrupts for this call by one tick, at step 1020. Following step 1018 or 1020, the routine returns to the point of its invocation, at step 1022.

Upon receipt of the traffic packet, processor 602 proceeds to make the requisite adjustment, at step 912 of FIG. 11. Drifting of times 1404 out of windows 1402 is detected by processor 602 itself. Processor 602 notes the need for adjustment and the direction of adjustment, and proceeds to make the requisite adjustment, tick-by-tick, also at step 912 of FIG. 11.

When change in timing of processor 602 activity advances packet transmit times 1305 from times 1305 to times 1505, and hence advances packet receive times 1306 with respect to windows 1302, the result is new packet receive times 1506 which are positioned back inside windows 1302, as shown in FIG. 21. When change in timing of processor 602 activity advances windows 1402 and frame transmit times 1406 with respect to times 1404, the result is new frame transmit times 1606 and packet receive times 1404 which are positioned back inside windows 1402, as shown in FIG. 22.

The shift in the TX_INT_X and RX_INT_X signals output by circuit 611 requires a corresponding shift to be made in the signal outputs of clocks 621 and 622 of vocoder 604, thereby changing vocoder 604 traffic frame transmit times from times 1309 to times 1509 and changes vocoder 604 traffic frame receive times from times 1409 to times 1609 in the example of FIGS. 21 and 22, and thus realigning operations of vocoder 604 with the time-shifted operations of processor 602. At the instant of realignment, however, vocoder 604 must present a traffic frame of call traffic to processor 602 after vocoder 604 has had time to collect either 159 or 161 PCM samples from circuit 605 instead of the normal 160 samples corresponding to a 20 msec. time interval, and must output a frame of call traffic to circuit 605 within a time interval of either 159 or 161 PCM samples instead of the normal 160, depending upon whether the adjustment is, respectively, to advance or to delay the interrupt signals. To compensate for this condition, when processor 602 commands circuit 611 to effect the shifts in its TX_INT_X and RX_INT_X signals for this service circuit 612 that are shown in FIGS. 21 and 22, respectively, at the same time processor 602 commands vocoder 604 of this same service circuit 612 to drop one PCM sample byte from its PCM output and to create an additional one PCM sample byte at its PCM input. Vocoder 604 does so, and the effect is to again align vocoder 604 traffic frame input and output activities with PCM sample output and input activities, respectively.

In the case of drift opposite to that shown in FIGS. 21 and 22, the steps taken to compensate for the drift are the inverse of those described for FIGS. 21 and 22. Specifically, processor 602 commands circuit 601 to retard its TX_INT_X and RX_INT_X interrupt signal outputs for this service circuit 612 by one PCM sample interval, and commands vocoder 604 to create an additional one PCM sample byte at its PCM output and to drop one PCM sample byte from its PCM input.

These activities of processor 602 are diagramed in FIG. 18 at steps 1080 et seq. As was stated previously, when processor 602 commences the clock adjustment activities of step 912 of FIG. 11, at step 1070, it checks whether the just-received packet is the first traffic packet of the call. While the call is in progress, a received packet will not be the first received packet, and so processor 602 proceeds to step 1080. There, processor 602 again compares the received packet's time stamp with receive window 1404 in order to determine, at step 1081, when the packet was received in relation to the window. If the packet was received within window 1404, no timing adjustment is necessary, and so processor 602 proceeds to step 1090. If the packet was received prior to window 1404, processor 602 commands adaptive synchronization circuit 611 to advance RX_INT_X signal for the corresponding service circuit 612 by one tick, at step 1082, and commands vocoder 604 to decrease the offset of its input clock 621 by one tick, at step 1083. Vocoder 604 does so by causing clock 621 to reset after a count of 159 instead of the usual count of 160. But vocoder 604 still receives a full traffic frame of incoming call traffic holding the equivalent of 160 PCM sample bytes of information. So vocoder 604 discards one of those sample bytes to mask the timing realignment at its PCM output.

Returning to step 1081, if the packet is found to have been received after window 1404, processor 602 commands adaptive synchronization circuit 611 to retard RX_INT_X signal for the corresponding service circuit 612 by one tick, at step 1084, and commands vocoder 604 to increase the offset of its input clock 621 by one tick, at step 1085. Vocoder 604 does so by causing clock 621 to reset after a count of 161 instead of the usual count of 160. But vocoder 604 still receives a traffic frame of incoming traffic holding the equivalent of 160 PCM sample bytes of information. So vocoder 604 generates an additional sample byte to mask the timing realignment at its PCM output.

Following steps 1083 or 1085, processor 602 to proceeds to step 1090. There, processor 602 examines clock adjust field 322 of the received traffic frame to determine what clock adjustment, if any, has been requested by cell 202 that is handling the call. If an adjustment has been requested, processor 602 commands adaptive synchronization circuit 611 to adjust the time of occurrence of the TX_INT_X interrupts for the call's corresponding service circuit 612 by one tick in the requested direction, at step 1091, and commands vocoder 604 to adjust the offset of its output clock 621 by one tick in the same direction, at step 1092. Vocoder 604 does so by causing clock 621 to reset after a count of 159 or 161 instead of the usual count of 160. Consequently, vocoder 604 accumulates either 159 or 161 PCM bytes of outgoing traffic samples to supply to processor 602 in a frame holding 160 PCM sample bytes. To mask the timing realignment at its output to processor 602, vocoder 602 creates an additional PCM sample in the first instance and discards one of the PCM samples in the second instance. Following step 1092, clock adjustment activities are completed, and processor 602 returns, at step 1093, to the call processing activities of FIG. 11.

Alternatively, clocking adjustments may be made in multiples of one 125 usec. ticks in order to achieve synchronization at a faster rate. Also, a combination of multiple-tick and single-tick adjustments (in different 20 msec. cycles) could be used in order to control the speed with which synchronization may be achieved. Further, coarse adjustments (i.e., involving multiple 125 usec. ticks) may be made in order to make major synchronization changes during a call. Said large adjustments are advantageously made during the periods when speech activity is low.

At the start of a soft handoff, a channel element 245 of a second cell 202 commences to handle the call in parallel with channel element 245 of a cell 202 that has been handling the call alone until now. It is not known a priori whether packet receive times 1306 at the second channel element 245 will fall inside or outside of windows 1302 (see FIG. 19) or whether packet receive times 1404 of packets sent by second channel element 245 will fall inside or outside of windows 1402 (see FIG. 20) at processor 602, just as when the call is initially established. If receive times 1306 and 1404 do fall outside of windows 1302 and 1402, respectively, for the second channel element 245, however, the clock adjustment technique of FIGS. 19 and 20 which was used when the call was initially established, cannot now be used. This is because the call is now an established and ongoing call, and the use of that technique would result in noticeable disruption—an audible "glitch"—in the call. Consequently, the more gradual but effectively "glitch-less" clock adjustment technique of FIGS. 21 and 22 is used to try and move receive times 1306 and 1404 within windows 1302 and 1402, respectively, for the second channel element 245. Multiple iterations of this adjustment may need to be performed in order to achieve the desired effect.

It is important to note, however, that the adjustment of FIGS. 21 and 22 affects the receive times 1306 and 1404 for both of the channel elements 245 that are handling the call. Consequently, it is possible that an adjustment which attempts to move times 1306 and 1404 into windows 1302 and 1402 for the second channel element 245 will result in moving times 1306 and 1404 out of windows 1302 and 1402 for the first channel element 245.

It is imperative that times 1306 and 1404 of neither of the two channel elements 245 lag (i.e. occur after) their respective windows 1302 and 1402. In contrast, times 1306 and 1404 that lead (i.e. occur before) their respective windows 1302 and 1402 can be compensated for by buffering of the prematurely-received packets at channel element 245 and SPU 264. Consequently, if during soft handoff one channel element 245 is reporting a leading time 1306 while the other channel element 245 is reporting a lagging time 1306, the clock adjustment requests of the channel element 245 which is reporting leading times 1306 are ignored and only the requests of the other channel element 245 which is reporting lagging times 1306 are responded to by processor 602.

It is conceivable that differences in propagation delays between processor 602 and the two channel elements 245 that are involved in the soft handoff are so great that packets sent by both channel elements 245 during the same clock cycle of cell clock 1000 are received at processor 602 during different clock cycles of processor 602 receive interrupt clock RX_INT_X for that channel element 612, and that duplicate packets sent by processor 602 during the same clock cycle of transmit interrupt clock TX_INT_X to both channel elements 245 involved in the soft handoff are received by those channel elements 245 during different clock cycles of cell clock 1000. To associate the received packets with the proper clock cycles is the purpose of the sequence numbers carried by sequence number field 320 of traffic frames 350 (see FIG. 9). The association is done at steps 932–936 of FIG. 11.

As was alluded to previously, sequence numbers used by channel elements 245 are calculated from, and hence bear a defined relationship to, clock cycles of cell clock 1000. Hence, during any clock cycle of cell clock 1000, all channel elements 245 transmit packets having the same sequence number. Consequently, by comparing the sequence numbers of two received packets, processor 602 can immediately determine whether both packets correspond to the same clock cycle of clock 1000, and if they do not, what their relative sequence is.

In the opposite direction of packet flow, from processor 602 to channel elements 245, no defined relationship exists between sequence number and clock cycle of cell clock 1000. However, at the beginning of the soft handoff, the channel element 245 that has been handling the call until now causes a message (HANDOFF_REQ; see discussion of FIG. 27, below) to be sent to the channel element 245 that is now commencing to handle the call, which message reports the number of a recent cell clock 1000 clock cycle and the sequence number of a packet which the first channel element 245 has received during that clock cycle. Since sequence numbers are sequential, the second channel element 245 can easily compute from this received information which sequence numbers are associated with which subsequent clock cycles of cell clock 1000. The second channel element 245 thus determines the cell clock 1000 clock cycle to which a received packet corresponds.

It will now be explained in conjunction with FIGS. 23–35 how calls are set up, handed off, and torn down in the system of FIG. 2. The illustrated activities take place as a result of exchanges of level-3 packetized signalling messages, illustratively between pairs of elements, e.g., SPU 264 to cells 202, cell 202 to ECP complex 134, or ECP complex 134 to DCS controller 261. The Figures imply timing relationships for message exchanges between the element pairs only, and not across element pairs. All messages to and from ECP complex 134 are assumed to flow through control links 108; all packets between channel elements 245 and service circuits 612 are assumed to be frame-relayed through trunks 207 and 210.

Figure 23:
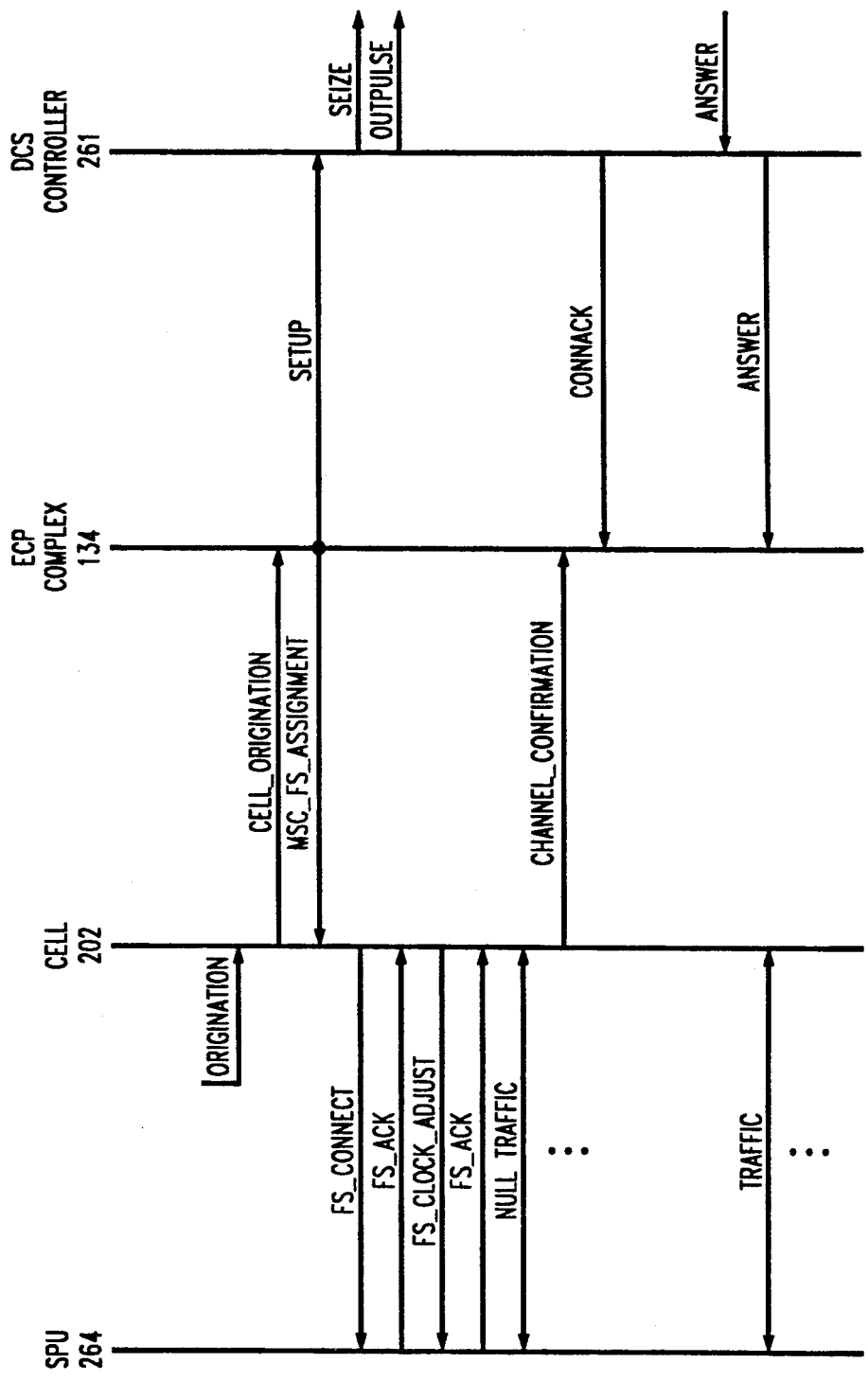
FIG. 23 is a signalling diagram of setup of a mobile-originated call in the system of FIG. 2.

FIG. 23 shows control signalling for setting up a packet-switched call path for a call originating at a mobile telephone 203. Mobile telephone 203 initiates the call by transmitting an ORIGINATION signal (illustratively one or more digital messages) conveying the called telephone number on an access channel. Over-the-air transmission or reception of signals is indicated in the Figures by a vertical segment of a signal arrow. The ORIGINATION signal is received by channel element 245 designated as a CDMA access channel in one of the cells 202, which passes it on in a message to its cluster controller 244, which forwards it to controller 241 of its cell 202. Each controller 241 assigns a free CDMA air channel to carry the call, and then passes the message along with identity of the assigned channel's corresponding channel elements 245 on to ECP complex 134, in a conventional manner.

ECP complex 134 receives the CELL_ORIGINATION message and selects a DCS 201, a CIM 209, an SCM 220, and a service circuit 612 and a group of trunks 106 of the selected speech coder module 220, to handle the call. ECP complex 134 then sends an MSC_FS_ASSIGNMENT message to controller 241 of the call-originating cell 202, conveying a DLCI of the selected service circuit 612. ECP complex 134 also sends a SETUP message conveying the called telephone number and identifying selected module 220, groups of trunks 106, and service circuit 612, to DCS controller 261 that controls the selected module 220.

Controller 241 that receives the MSC_FS_ASSIGNMENT message forwards the message to cluster controller 244 of selected channel element 245. Cluster controller 244 conveys the information included in the message to channel element 245 that has been selected to handle the call. Selected channel element 245 sets itself up to handle the call and then sends an FS_CONNECT packet 351 to the selected service circuit 612, using the frame-relay technique to transport the packet through the interconnecting facilities' channels. Packet 351 uses the received DLCI of the selected service circuit 612 as the packet address in field 302, and conveys the DLCI of the selected channel element 245 in its data field 304.

When processor 602 serving the selected service circuit 612 receives the FS_CONNECT packet, it returns an FS_ACK packet 351 to selected channel element 245 in acknowledgment of receipt of the FS_CONNECT packet, using the DLCI contained in field 304 of the FS_CONNECT packet as the packet address in field 302 of the FS_ACK packet. Illustratively at this time processor 602 also sends to cell 202 all DLCIs that correspond to selected service circuit 612. Processor 602 performs these tasks as part of LAPD processing at step 904 of FIG. 11. Processor 602 then stores the conveyed DLCI of selected channel element 245 as part of the call state that is associated with selected service circuit 612, and marks the call state as corresponding to an active call. A connection is now established between selected channel element 245 and service circuit 612. Cluster controller 244 of the selected channel elements 245 next responds with an FS_CLOCK_ADJUST packet in which it conveys to processor 602 serving the selected serving circuit the initial clock-adjustment information. This packet was discussed in conjunction with FIG. 16, steps 1001-1010. Processor 602 responds, by returning and FS_ACK packets to cluster controller 244 and processing the received packet in the manner discussed in conjunction with FIG. 17. A call path is now established between channel element 245 and service circuit 612, and they begin to exchange null traffic packets every 20 msecs. until call traffic becomes available. Selected channel element 245 responds to receipt of the second FS_ACK packet by causing a CHANNEL_CONFIRMATION message to be sent by its cell's controller 241 to ECP complex 134 to advise it of completion of this end of the connection.

DCS controller 261 that receives the SETUP message responds by causing controller 231 of the selected SCM 220 to seize a trunk 106 (DS0 channel) of the identified groups of trunks 106 and to outpulse the called telephone number on the seized trunk 106. The selected trunk 106 corresponds to a particular time slot on TDM bus 130. Controller 261 also causes translation and maintenance processor 609 of speech processing unit 264 which contains the selected service circuit 612 to connect the abovementioned DS0 channel from TDM bus 130 via TDM bus interface 608 to that time slot of concentration highway 607 which is assigned to selected service circuit 612, thereby assigning that service circuit 612 to handle the subject call. Controller 261 then sends a CONNACK message to ECP complex 134 to advise it of successful completion of this end of the connection. When answer supervision is received from telecommunications facilities of network 100 over the selected trunk 106 by controller 231, it notifies DCS controller 261, which in turn sends an ANSWER message to ECP complex 134 to notify it of call completion. The call is now established fully through the system of FIG. 2, and call traffic can flow between selected channel elements 245 through service circuit 612 and trunk 106 to and from the telecommunications facilities of network 100 and the call's destination.

Figure 24:
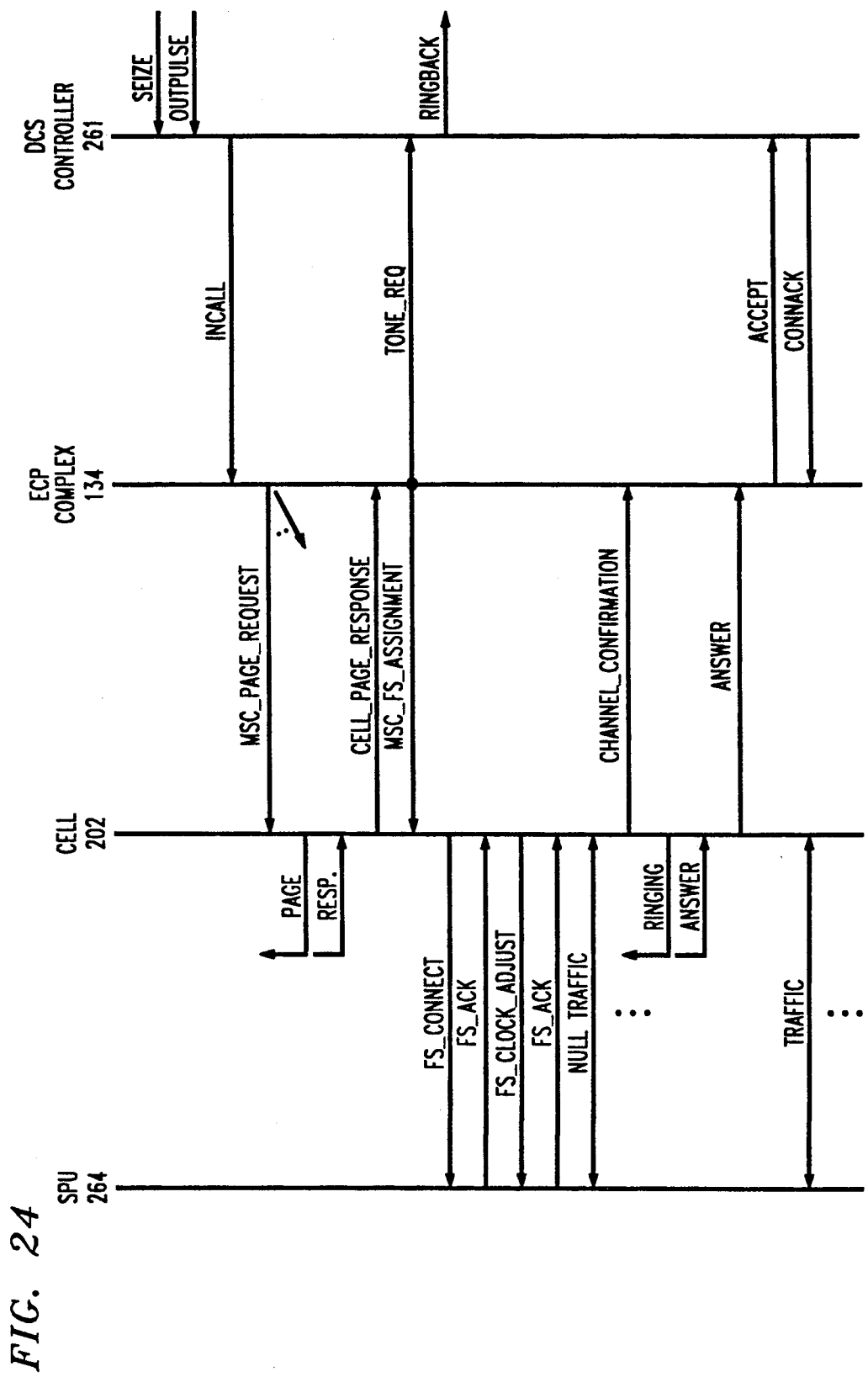
FIG. 24 is a signalling diagram of setup of a network-originated call in the system of FIG. 2.

FIG. 24 shows control signalling for setup of a call path for a call originating at public telephone network 100. Network 100 initiates the call by seizing a trunk 106 and outpulsing thereon the digits of the called telephone number, in a conventional manner. Controller 231 of a speech coder module 220 serving that trunk 106 detects the seizure on the trunk's corresponding time slot of TDM bus 130 and collects the dialed digits, again conventionally, and then notifies DCS controller 261. Controller 261 in turn notifies ECP complex 134 by sending it an INCALL message. The INCALL message conveys the called telephone number, and module 220 and trunk 106 I.D.s.

ECP complex 134 responds to the INCALL message by broadcasting to all cells 202 in the system of FIG. 2 an MSC_PAGE_REQUEST message. The MSC_PAGE_REQUEST message identifies the called mobile 203 (e.g., conveys the called phone number).

Controller 142 of each cell 202 responds to the MSC_PAGE_REQUEST message by conveying the MSC_PAGE_REQUEST message to a CDMA access-channel element 245 via cluster controller 244. The access-channel element 245 responds by paging the called mobile 203, in the manner specified for the CDMA arrangement.

When the called mobile 203 responds by transmitting a RESPONSE signal, one or more of the paging channel elements 245 receive the signal, and each passes it on to its respective cluster controller 244. Cluster controllers 244 forward the messages to controllers 241 of their respective cells 202. Controllers 241 of all cells 202 are continually exchanging messages (not shown) to update each other's databases of their respective status for existing and pending calls. Controllers 241 of the respective cells 202 determine from these messages which cell 202 is best suited to handle the call. Controller 241 of the selected cell 202 then sends a CELL_PAGE_RESPONSE message on to ECP complex 134 to notify complex 134 of that cell's selection to handle the cell.

ECP complex 134 receives the CELL_PAGE_RESPONSE message and selects a service circuit 612 of module 220 to which the call is connected to handle the call at the other end of the call path. ECP complex 134 then sends an MSC_FS_ASSIGNMENT message to controller 241 of the selected cell 202. The message is the same as described for the mobile call-origination, and elicits the same response—to wit, an FS_CON- NECT, FS_ACK, FS_CLOCK_ADJUST, and FS_ACK packet exchange sequence between cell 202 and SPU 264, followed by a CHANNEL_CONFIRMATION message from cell 202 to ECP complex 134, as described for FIG. 23. ECP complex 134 also sends a TONE_REQ message to DCS controller 261 that controls the module 220 to which the call is connected. Controller 261 responds by causing controller 231 of module 220 to apply ringback to the trunk 106 that carries the call to and from telecommunications facilities of network 100.

Following sending of CHANNEL_CONFIRMATION message to ECP complex 134, selected channel element 245 transmits RINGING signals to called mobile 203. When called mobile 203 responds with an ANSWER signal, selected channel element 245 causes an ANSWER message to be conveyed from its cell's controller 241 to ECP complex 134. ECP complex 134 responds by sending an ACCEPT message to DCS controller 261 of module 220 to which the call is connected. The message conveys the I.D. of service circuit 612 that had been selected to handle the call. Controller 261 responds by causing controller 231 to remove ringback tones from the call, and then causing a connection to be made between the DS0 channel carrying the call on TDM bus 130 and selected service circuit 612, in the manner described for a mobile-originated call. Controller 261 then sends a CONNACK message to ECP complex 134 to advise it of successful completion of this end of the connection. The call path is now established fully through the system of FIG. 2, and packets bearing call traffic can flow between selected channel element 245 and the call's source, through service circuit 612.

Figure 25:
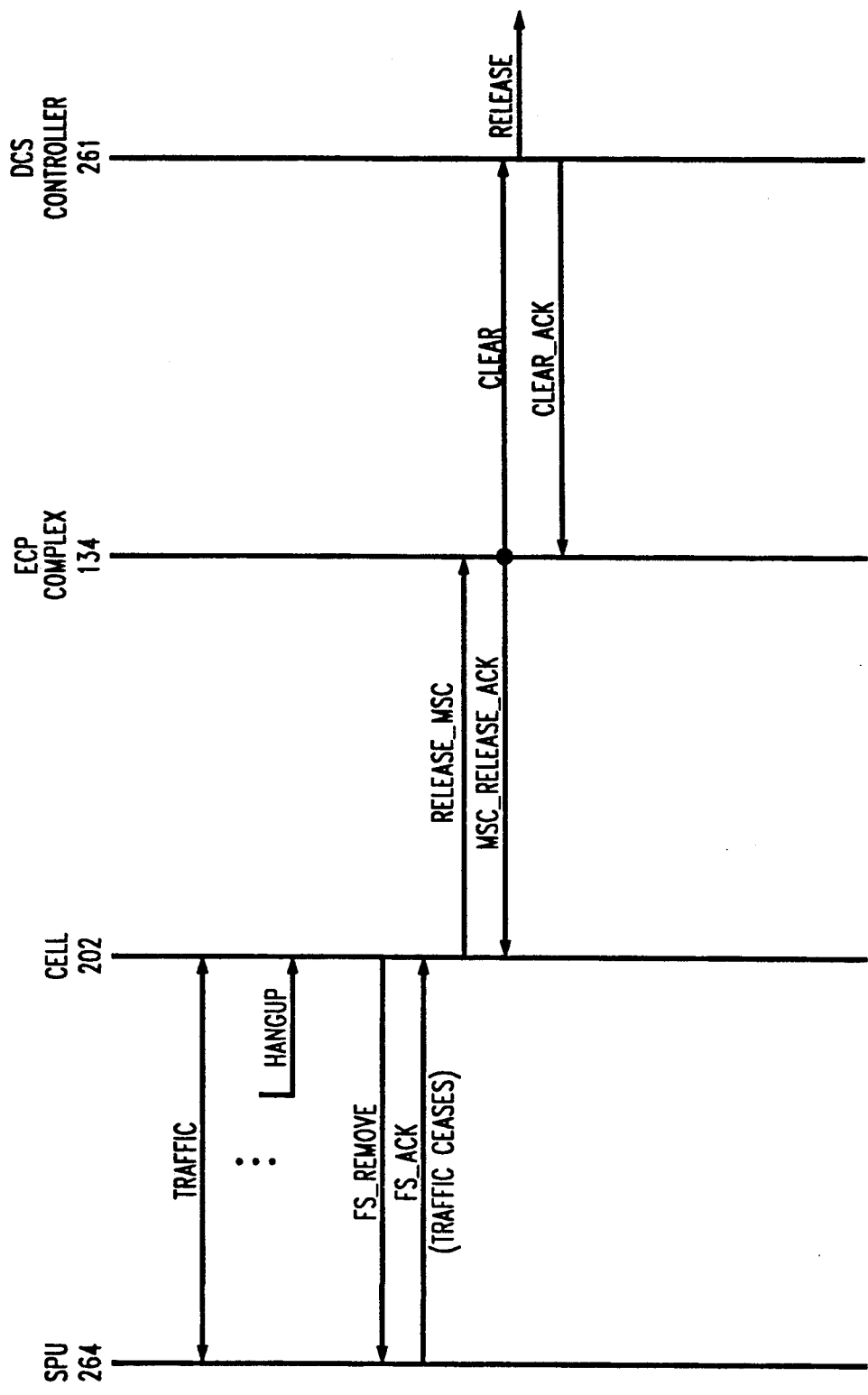
FIG. 25 is a signalling diagram of a mobile-originated disconnection of a call in the system of FIG. 2.

FIG. 25 shows control signalling for call disconnection initiated by mobile telephone 203. Mobile telephone 203 initiates disconnection of an established call in which it is participating by transmitting a HANGUP signal. This signal is received by channel element 245 which is handling the call. Channel element 245 responds by sending an FS_REMOVE packet 351 to service circuit 612 which is handling the call, to advise it of the call disconnection.

Processor 602 responds to the FS_REMOVE packet by returning an FS_ACK packet 351 to channel element 245 as part of the protocol processing of the FS_REMOVE packet, and by updating the call state for the service circuit 612 which is handling the call to show that the call has been disconnected. Traffic for the call now ceases to flow between channel element 245 and service circuit 612, and channel element 245 causes as RELEASE_MSC message to be sent by its cell's controller 241 to ECP complex 134, to advise it of disconnection of this end of the call path.

ECP complex 134 responds by sending a CLEAR message to DCS controller 261 of speech coder module 220 that is handling the call, and by sending an MSC_RELEASE_ACK message to controller 241 of cell 202 that was handling the call, to advise it that channel element 245 which had been handling the call is now free and available to handle a new call. Controller 261 responds to the CLEAR message by causing controller 231 of module 220 to release trunk 106 that carries the call, and causing translation and maintenance processor 609 of the speech processing unit 264 that contains service circuit 612 which is handling the call to disconnect the DS0 channel which is carrying the call from the concentration highway 607 time slot that is assigned to that service circuit 612. Controller 261 then sends a CLEAR_ACK message to ECP complex 105 to notify it that this end of the call path has also been disconnected.

Figure 26:
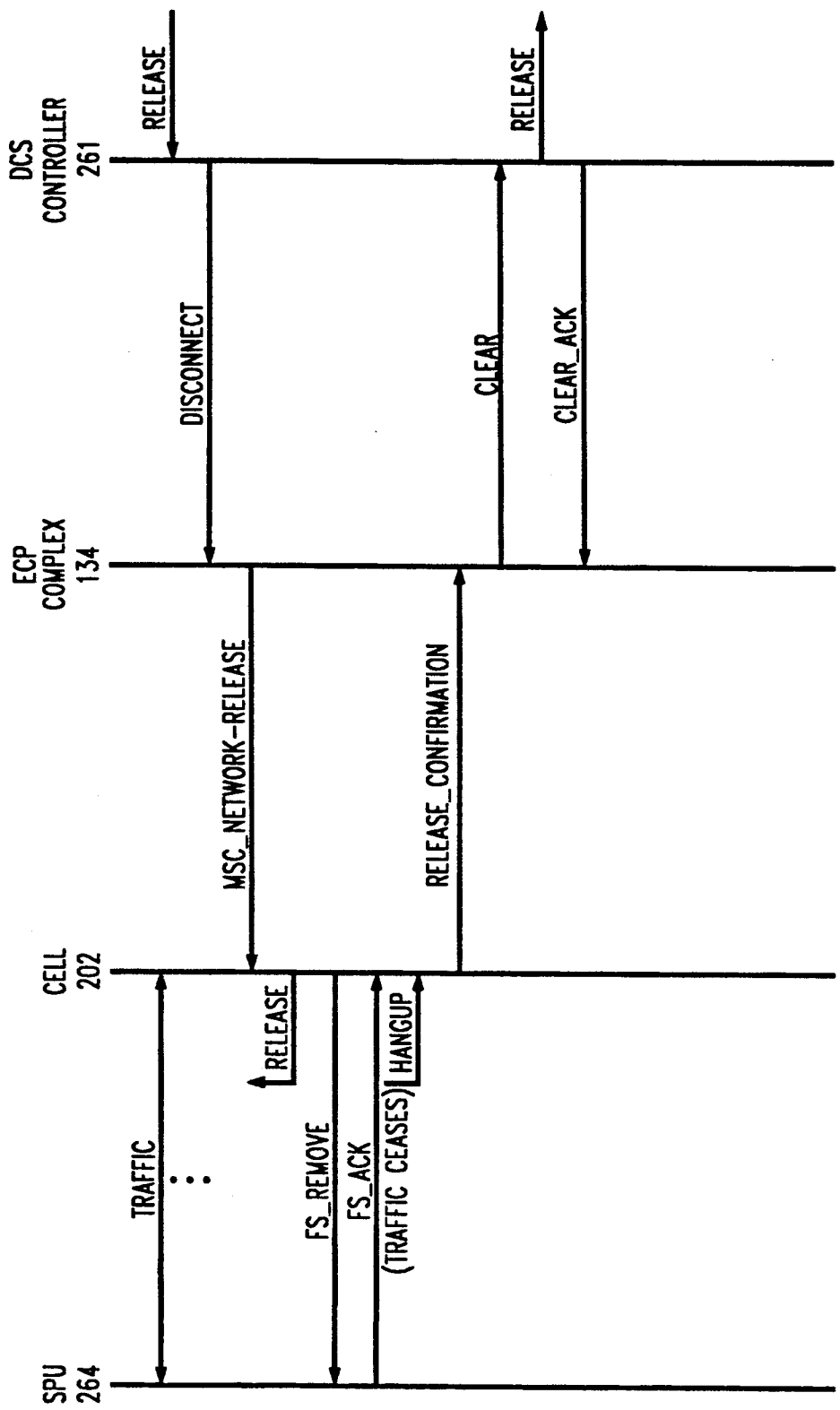
FIG. 26 is a signalling diagram of a network-originated disconnection of a call in the system of FIG. 2.

FIG. 26 shows control signalling for call disconnection initiated from public telephone network 100. Network 100 releases trunk 106 which carries the call. The release is detected by controller 231 of speech coder module 220 that is handling the call, which notifies DCS controller 261, and controller 261 in turn notifies ECP complex 134 by sending it a DISCONNECT message.

ECP complex 134 responds to receipt of the DISCONNECT message by sending an MSC_NETWORK_RELEASE message through cell controller 241 and cluster controller 244 to channel element 245 that is handling the call. Channel element 245 responds by transmitting a RELEASE signal to mobile telephone 203 that is involved in the call, and causing an FS_REMOVE packet 351 to be sent to service circuit 612 that is handling the call. The FS_REMOVE signal is the same as described for the mobile-initiated disconnection, and elicits the same response.

In response to receiving the RELEASE signal, mobile telephone 203 hangs up the call and transmits a HANGUP signal. This signal is received by channel element 245 that is handling the call, and it responds by causing a RELEASE_CONFIRMATION message to be sent by its cell's controller 241 to ECP complex 134, to inform it of disconnection of this end of the call.

ECP complex 134 responds by sending a CLEAR message to DCS controller 261 of speech coder module 220 that has been handling the call. The CLEAR message is the same as described for the mobile-initiated termination, and elicits the same response.

Figure 27:
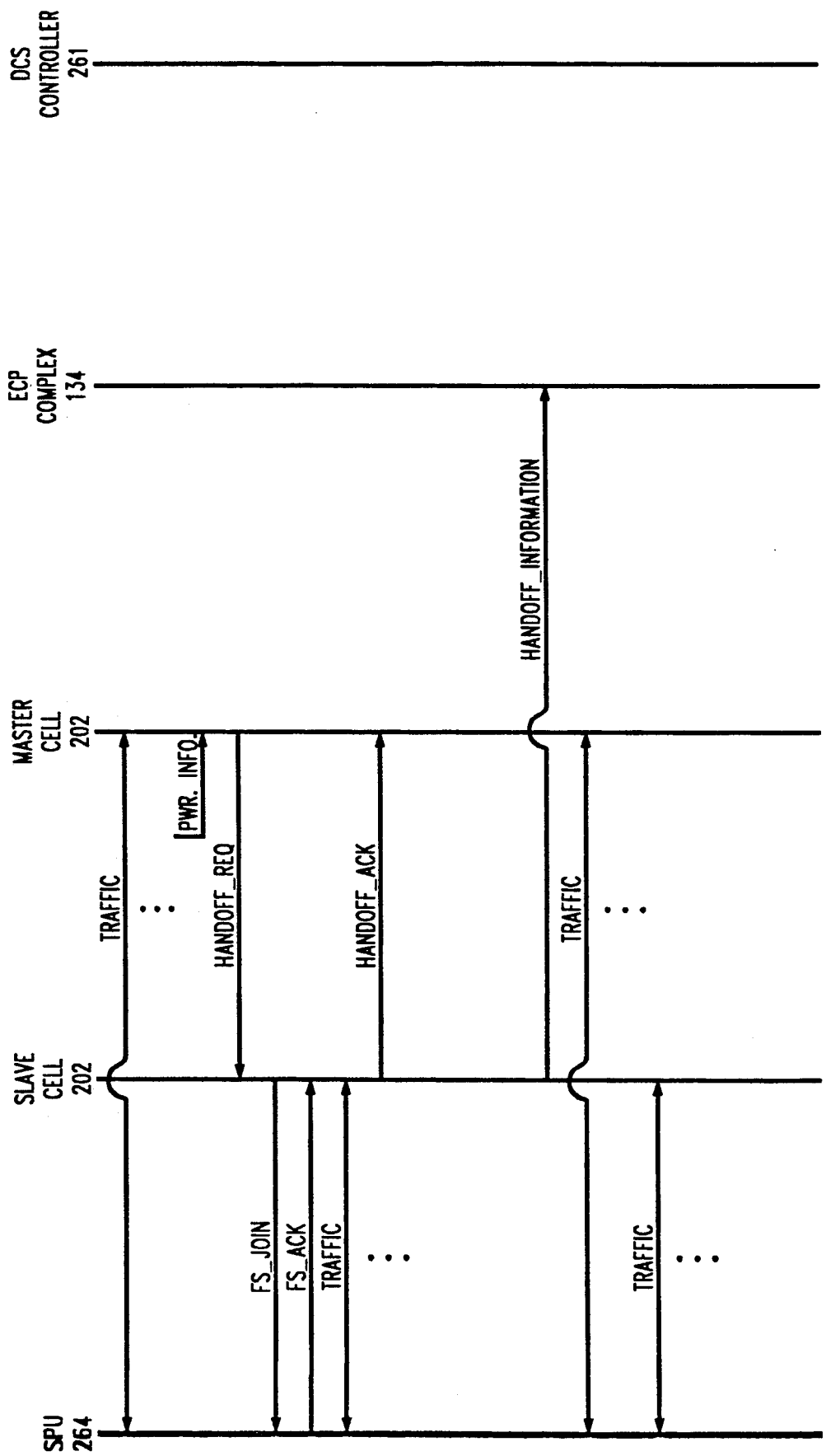
FIG. 27 is a signalling diagram of the beginning of a soft-handoff of a call in the system of FIG. 2.
Figure 28:
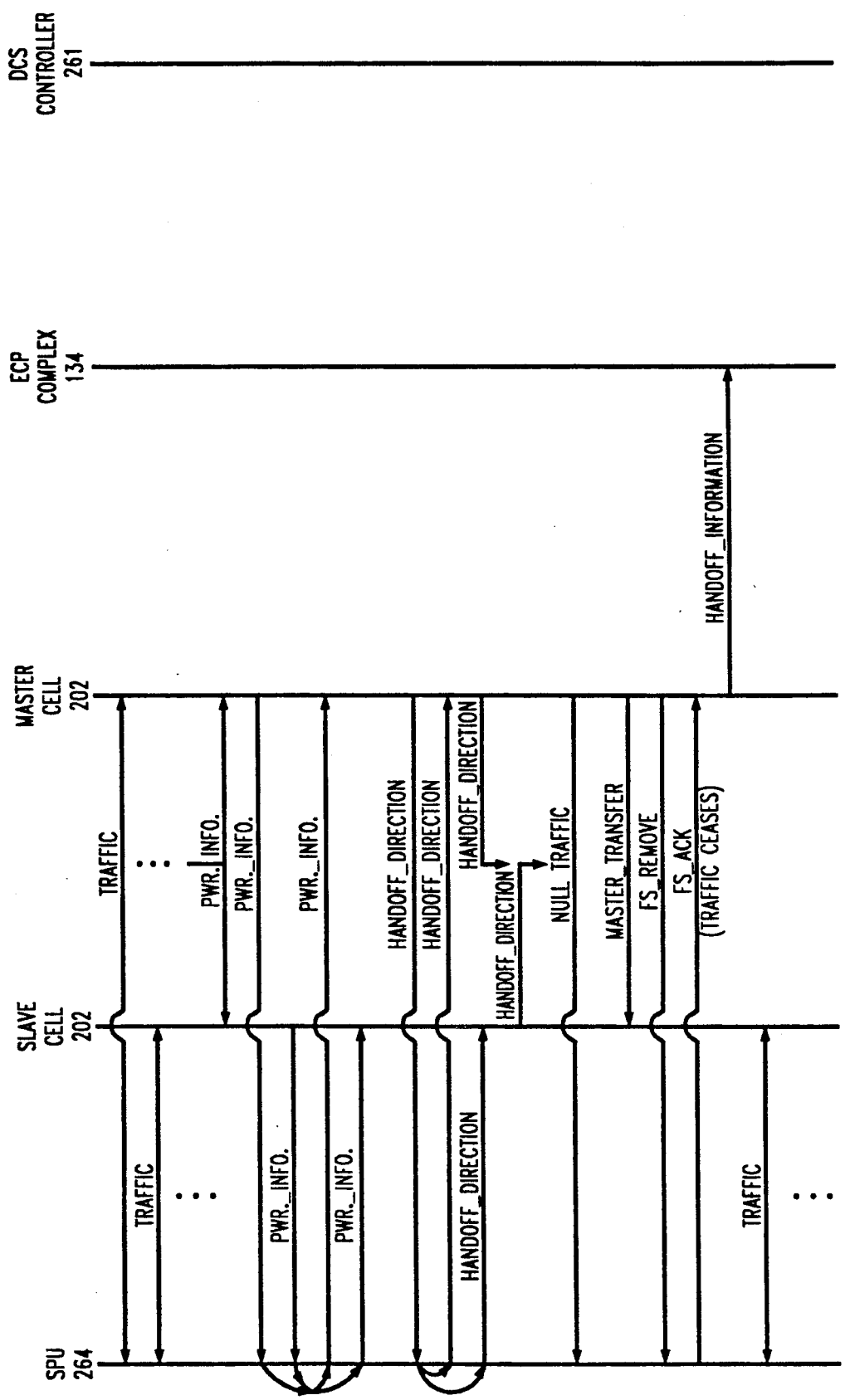
FIG. 28 is a signalling diagram of the end of a soft-handoff wherein a master cell drops off.
Figure 29:
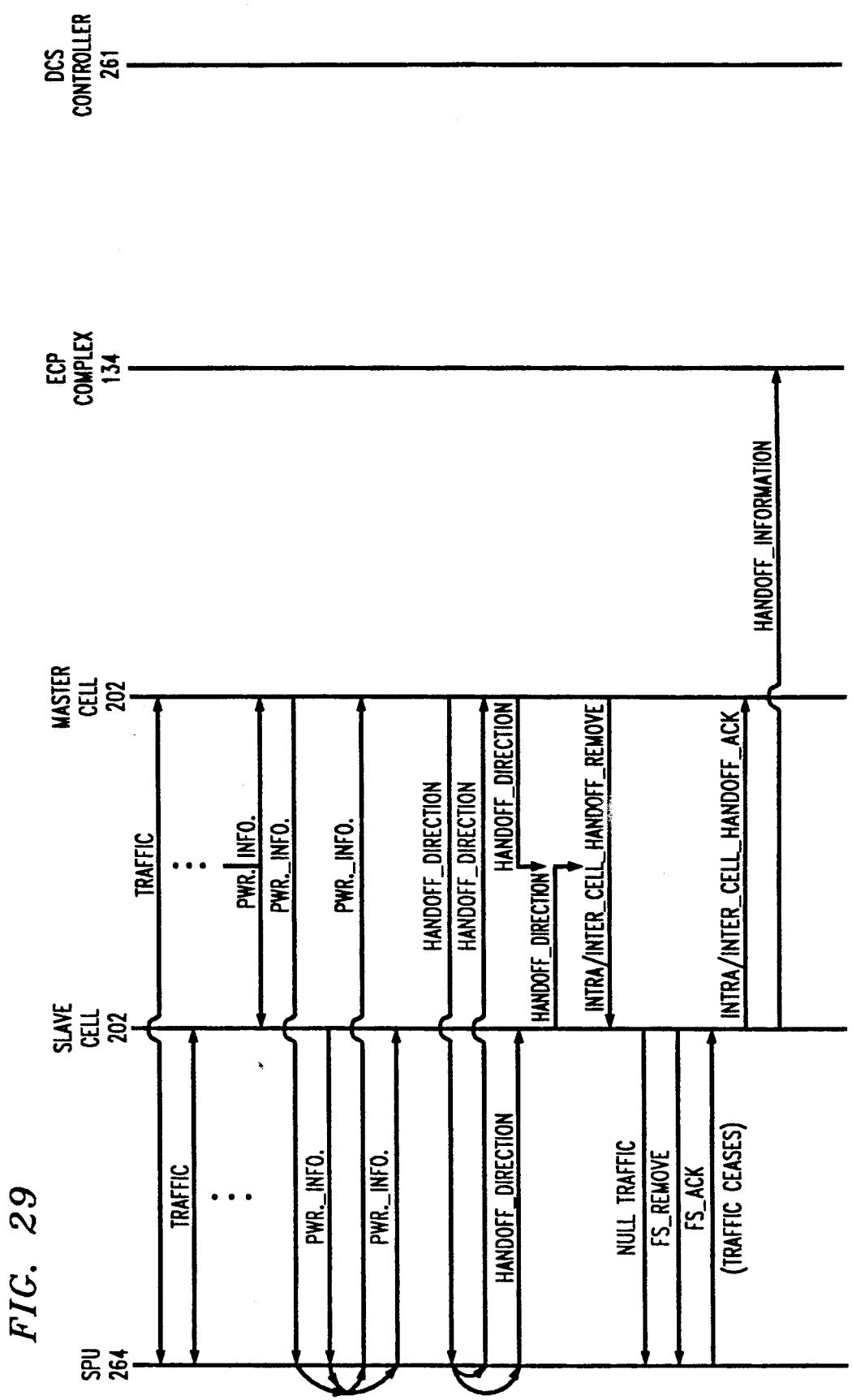
FIG. 29 is a signalling diagram of the end of a soft-handoff wherein a slave cell drops off.

FIGS. 27-29 show control signalling for soft handoff of the call from one cell 202 to another. FIG. 27 shows signalling for the beginning of soft handoff, when a second cell 202, referred to as a slave cell, commences to handle the call jointly with cell 202 that had been handling the call until then, referred to as a master cell. A mobile telephone 203 that is involved in a call monitors the strength of pilot channel signals that it receives from a plurality of cells 202 including master cell 202, and it periodically sends to master cell 202 a PWR.INFO. report on these received power levels. Channel element 245 that is handling the call passes this report on to controller 241 of master cell 202. On the basis of this information, and information exchanged between the cells 202 themselves, controller 241 of master cell 202 determines whether only master cell 202 should continue to handle the call, or whether another cell 202 should be added to the call. If controller 141 of master cell 202 determines that another cell 202 should be added to the call, and that this slave cell 202 can handle the call using CDMA and the same mobile channel as master cell 202, controller 241 of master cell 202 sends a HANDOFF_REQ message through control links 108 and IMS 104 to controller 241 of slave cell 202. HANDOFF_REQ message conveys the DLCIs of call-handling service circuit 612 which are not used by master cell 202 for this call, and the I.D. of the mobile channel on which the call is being conducted.

Controller 241 of slave cell 202 receives the HANDOFF_REQ message and selects a channel element 245 of slave cell 202 and one of the received DLCIs of call-handling circuit 612 to handle the call. (Alternatively, the HANDOFF_REQ message may convey the DLCI of call-handling service circuit 612 which is used by master cell 202 for this call, and controller 241 of slave cell 202 merely toggles the value of the least-significant bit of that DLCI which is contained in the message, to change the DLCI value to a second DLCI that corresponds with service circuit 612 that is handling the call.) Controller 241 then forwards the selected DLCI along with other contents of the received message through a cluster controller 244 to selected channel element 245. Selected channel element 245 sets itself up to handle the call on the specified mobile channel, and then causes an FS_JOIN packet 351 to be sent to service circuit 612 that is handling the call. This packet uses the DLCI of service circuit 612 which was received by selected channel element 245 from controller 241 as the packet address in field 302, and conveys the DLCI of selected channel element 245 in its data field 304.

When processor 602 serving service circuit 612 that is handling the call receives the FS_JOIN packet, it returns an FS_ACK packet 351 to selected channel element 245 in acknowledgment of receipt of the FS_JOIN packet, as part of LAPD processing at step 904 of FIG. 11. Processor 602 then stores the conveyed DLCI of selected channel element 245 as part of the call state that is associated with service circuit 612 that is handling the call, and marks the call state as being in soft handoff. A connection is now established between selected channel element 245 of slave cell 202 and service circuit 612 that is handling the call, and they begin to exchange call traffic packets.

Channel element 245 of slave cell 202 responds to receipt of the FS_ACK packet by causing a HANDOFF_ACK message to be sent by its cell's controller 241 via control links 108 and IMS 104 to controller 241 of master cell 202 to advise it of completion of the connection. Controller 241 of slave cell 202 also sends a HANDOFF_INFORMATION message to ECP complex 134 to notify it of the soft handoff, and ECP complex 134 updates its database. Call traffic packets now flow between the one service circuit 612 and channel elements 245 of both master and slave cells 202 that are handling the call.

FIGS. 28 and 29 show signalling for the end of soft handoff, when one of the two cells 202 that is handling the call ceases to do so. Typically, though not necessarily, this will be the master cell 202. This scenario is shown in FIG. 28. During soft handoff, master and slave cells 202 receive PWR.INFO. reports on pilot channel power levels measured by mobile telephone 203. Note that this PWR.INFO. is different from the power control trend information which is received during soft handoff from both cells 202 by processor 602 and is swapped between the two cells 202. Each cell 202 includes the received PWR.INFO. as reverse signalling in the next packet 350 that it sends to service circuit 612 that is handling the call.

Processor 602 serving service circuit 612 that is handling the call receives the PWR.INFO. as reverse signalling from both cells 202, selects and saves the PWR.INFO. from only one cell 202, at steps 968 of FIG. 13 or 998 of FIG. 14, and then sends the stored PWR.INFO. back to both cells 202, at steps 1216 and 1236 of FIG. 15. On account of the actions performed by processor 602, each cell 202 that is involved in the handoff receives PWR.INFO. sent by the cell 202 that received better quality signals from mobile 203. The received PWR.INFO. is forwarded to the receiving cells' controllers 241.

Controllers 241 use this information to determine when one of them should cease handling the call. When controller 241 of master cell 202 determines that is should cease handling the call, it sends a HANDOFF_DIRECTION signalling packet to processor 602 that serves the call-handling service circuit 612. The packet indicates that handling of the call is being turned over to slave cell 202. Processor 602 duplicates the signalling and returns it to both master and slave cells 202, as shown in FIG. 15.

Upon receiving the HANDOFF_DIRECTION signalling, channel elements 245 of both master and slave cells 202 transmit the HANDOFF_DIRECTION information to mobile telephone 203 to appraise it thereof. Controller 241 of master cell 202 then sends a MASTER_TRANSFER message via control links 108 and IMS 104 to controller 241 of the other cell 202 that is involved in the soft handoff, to notify it of completion of the handoff and that it is to become the new master cell 202, and also forwards a copy of that information to channel element 245 of its own cell 202 which is handling the call. Channel element 245 responds by ceasing to communicate call traffic to and from mobile telephone 203 and causing an FS_REMOVE packet to be sent to service circuit 612 that is handling the call to advise it of cessation of its involvement in the call.

Processor 602 responds to the FS_REMOVE packet by returning an FS_ACK packet to sending channel element 245 as part of the protocol processing of the FS_REMOVE packet, and by updating the call state for service circuit 612 to show that the call is no longer in soft handoff. Controller 241 of former master cell 202 receives the FS_ACK packet and responds by ceasing its cell's involvement in the call. Traffic for the call ceases to flow between channel element 245 of former master cell 202 and service circuit 612 that is handling the call, but continues to flow between service circuit 612 and channel element 245 of the former slave cell 202. Controller 241 of former master cell 202 now sends a HANDOFF_INFORMATION message to ECP complex 134 to notify it of completion of the handoff and the result thereof. ECP complex 134 updates its database accordingly.

It will be noted that DCS controller 261 of the serving DCS 201 remains wholly uninvolved in the procedures of FIGS. 27 and 28, and that ECP complex 134 is also uninvolved except for being notified of the completions of the procedures. Consequently, the call-handling capacity of DCS controller 261 and ECP complex 134 is not adversely impacted by the soft-handoff procedures.

FIG. 29 shows the scenario for soft-handoff completion wherein slave cell 202 ceases to serve the call 202 and master cell 202 continues to serve the call alone. Once again, the procedure begins with the master and slave cells 202 providing pilot channel PWR.INFO. reports to processor 602 that serves the call-handling service circuit 612, and return to both cells 202 of the PWR.INFO. that was provided by the cell 202 that is receiving better signals from mobile telephone 203. When controller 241 of master cell 202 determines on the basis of these and other reports that slave cell 202 should cease handling the call, it sends a HANDOFF_DIRECTION signalling packet to processor 602 which indicates that handling of the call is being regained by master cell 202. Processor 602 duplicates the signalling and returns it to both master and slave cells 202, again as shown in FIG. 15.

Upon receiving the HANDOFF_DIRECTION signalling, channel elements 245 of both master and slave cells 202 transmit the HANDOFF-DIRECTION information to mobile telephone 203 to appraise it thereof. Controller 241 of master cell 202 then sends an INTRA/INTER_CELL HANDOFF_REMOVE message via control links 108 and IMS 104 to controller 241 of slave cell 202 to notify it of completion of the handoff and that it is to drop out of handling of the call. Controller 241 of slave cell 202 notifies channel element 245 of slave cell 202 which is handling the call. Channel element 245 responds in the same manner as was described in conjunction with FIG. 28 for channel element 245 of master cell 202: by ceasing to communicate call traffic to and from mobile telephone 203 and initiating an FS_REMOVE, FS_ACK packet exchange with processor 602. Traffic flow ceases between channel element 245 of slave cell 202 and service circuit 612 that is handling the call, but continues between service circuit 612 and channel element 245 of master cell 202. Controller 241 of former slave cell 202 now sends a INTRA/INTER_CELL_HANDOFF_ACK message to master cell 202, and a HANDOFF_INFORMATION message to ECP complex 134, to notify them of completion of the handoff and the result thereof. ECP complex 134 updates its database accordingly.

As in FIG. 28, there is little or no involvement of DCS controller 261 and ECP complex 134 in this handoff-termination procedure.

Figure 30:
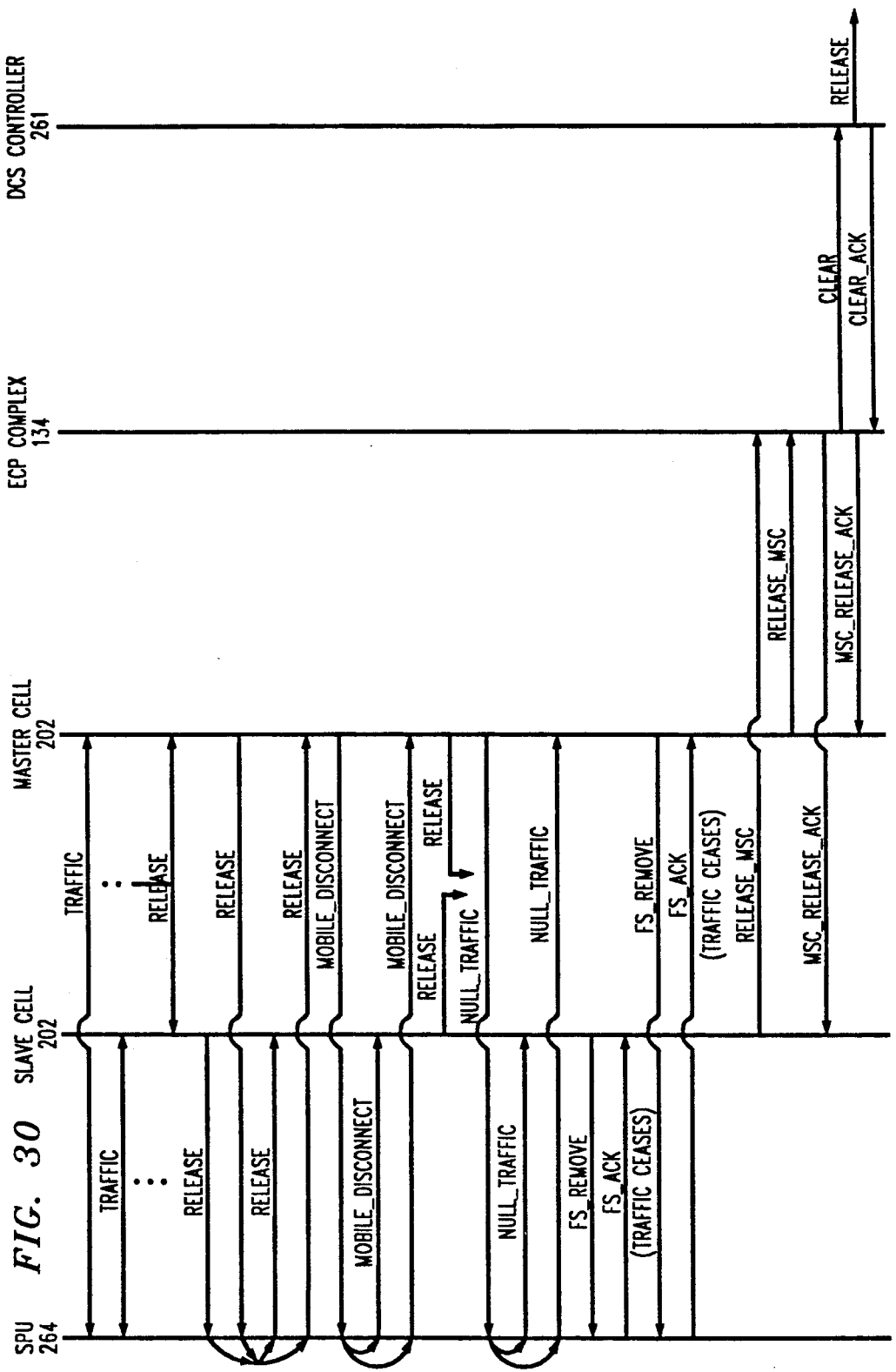
FIG. 30 is a signalling diagram of a mobile-originated disconnection of a call during soft-handoff in the system of FIG. 2.

FIG. 30 shows control signalling for call disconnection initiated by mobile telephone 203 while the call is in soft handoff. Mobile telephone 203 initiates disconnection of the call by transmitting a RELEASE signal. This signal is received by channel elements 245 which are handling the call in both master and slave cells 202. Each channel element 245 responds by sending cell-to-mobile reverse signalling conveying the RELEASE signal in the next packet 350 that it sends to service circuit 612 that is handling the call.

Processor 602 serving that service circuit 612 receives the signalling from both cells 202 but saves only one copy, at step 968 of FIG. 13 or 998 of FIG. 14, and returns the saved copy of the RELEASE signalling back to channel elements 245 of both master and slave cells 202 in the next traffic packet, at steps 1216 or 1222 and 1236 of FIG. 15. Controller 241 of master cell 202 responds to return of the RELEASE signalling by sending cell-to-mobile MOBILE_DISCONNECT forward signalling in the next packet 350 that is sent to service circuit 612 that is handling the call.

Processor 602 serving that service circuit 612 receives and stores the signalling, at step 956 of FIG. 13 or step 986 of FIG. 14, and then returns it to channel elements 245 of both master and slave cells 202 in the next traffic packet, at steps 1222 and 1236 of FIG. 15. Channel elements 245 of both master and slave cells 202 each respond to receipt of the MOBILE_DISCONNECT signalling by transmitting a RELEASE signal to mobile telephone 203. Controller 241 of master cell 202 then sends a cell-to-mobile signalling NULL_TRAFFIC command in the next packet to service circuit 612. This command is returned to both cells 202 by processor 602, in the manner just described for MOBILE_DISCONNECT signalling. Channel elements 245 of both master and slave cells 202 each respond to receipt of the NULL_TRAFFIC command by ceasing to transmit call traffic and instead commencing to transmit null traffic to mobile telephone 203. Both channel elements 245 also each cause an FS_REMOVE packet 351 to be sent to service circuit 612 that is handling the call. The packets are the same as has been described previously, and elicit the same responses from processor 602. Upon receipt of an FS_ACK packet from processor 602, each cell's channel element 245 stops communicating with mobile telephone 203, and causes a RELEASE_MSC message to be sent by its cell's controller 241 to ECP complex 134 to notify complex 134 that the corresponding cell 202 has ceased to handle the call. ECP complex 134 updates its database correspondingly, and sends MSC_RELEASE_ACK messages to controllers 241 of master and slave cells 202. Following receipt of the second RELEASE_MSC message, ECP complex 134 also sends a CLEAR message to DCS controller 261 of speech coder module 220 that is handling the call. The message is the same as described for FIG. 25 and elicits the same response from DCS controller 261.

Figure 31:
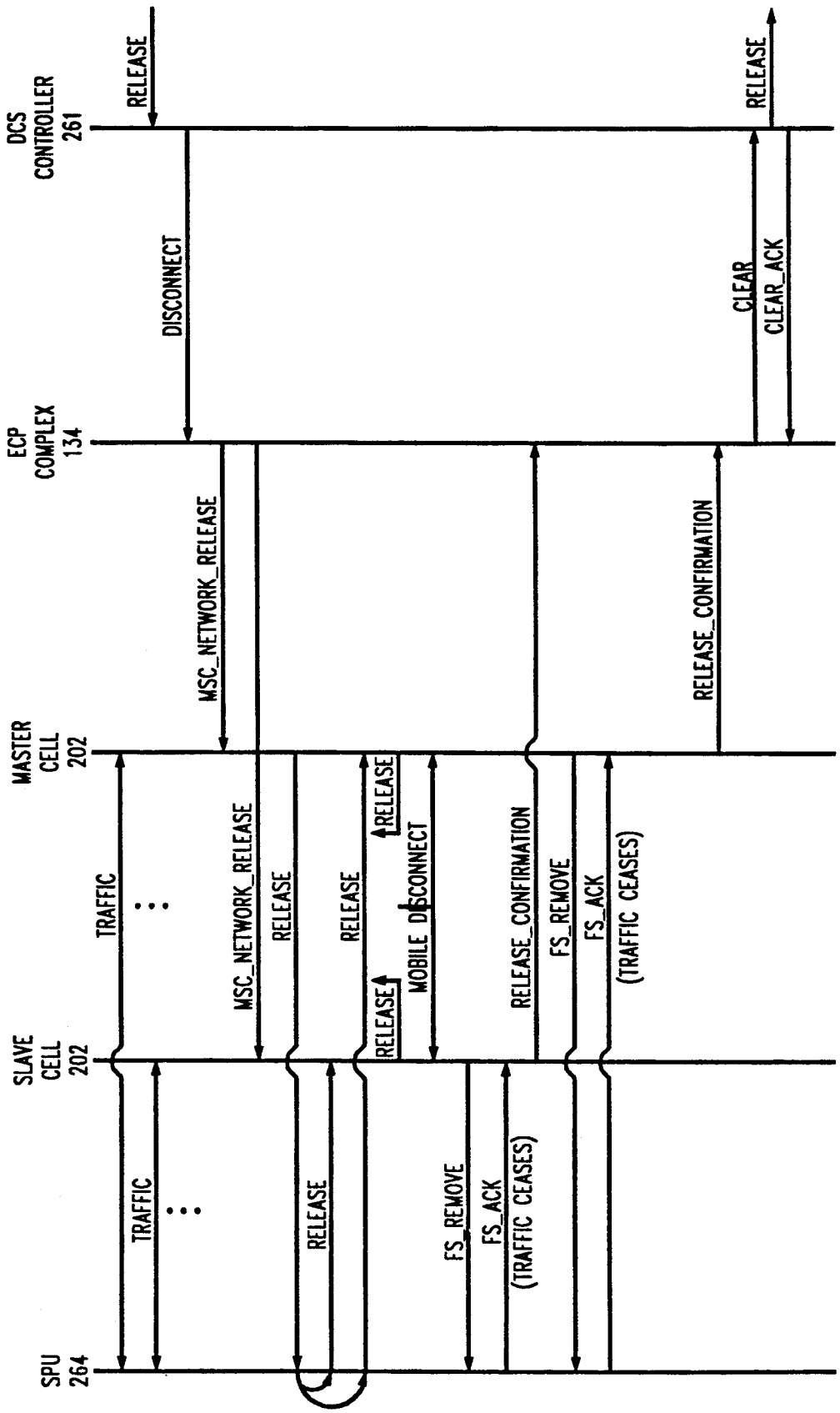
FIG. 31 is a signalling diagram of a network-originated disconnection of a call during soft-handoff in the system of FIG. 2.

FIG. 31 shows control signalling for call disconnection initiated from public telephone network 100 while the call is in soft handoff. Network 100 releases trunk 106 that carries the call. The release is detected by controller 231 of speech coder module 220 that is handling the call, and controller 231 notifies DCS controller 261, which in turn notifies ECP complex 134 by sending it a DISCONNECT message.

ECP complex 134 responds by sending an MSC_NETWORK_RELEASE message to cell controllers 241 of master and slave cells 202. Controller 241 of master cell 202 responds by sending cell-to-mobile forward signalling conveying a RELEASE signal in the next packet 350 that it sends to service circuit 612 that is handling the call.

Processor 602 serving that service circuit 612 receives the RELEASE signal and stores it, at step 956 of FIG. 13 or step 986 of FIG. 14, and then sends the stored RELEASE signal to channel elements 245 of both master and slave cells 202 in the next traffic packet, at steps 1222 and 1236 of FIG. 15. Channel elements 245 of both master and slave cells 202 each respond to the signalling information by transmitting a RELEASE signal to mobile telephone 203 that is involved in the call.

In response to receiving the RELEASE signals transmitted by channel elements 245, mobile telephone 203 hangs up the call and transmits a MOBILE DISCONNECT signal as confirmation. This signal is received by channel elements 245 of both master and slave cells 202. Each channel element 245 that is handling the call responds thereto by causing a FS_REMOVE packet 351 to be sent to service circuit 612 that is handling the call. The packets are the same as has been described previously, and elicit the same responses from processor 602. Upon receipt of the FS_ACK packet from processor 602, each channel element 245 responds by causing a RELEASE_CONFIRMATION message to be sent to ECP complex 134 to inform it of the call disconnection.

Following receipt of the second RELEASE_CONFIRMATION message, ECP complex 134 sends a CLEAR message to DCS controller 261 of speech coder module 220 that is handling the call. The message is the same as described for FIG. 25 and elicits the same response.

Figure 32:
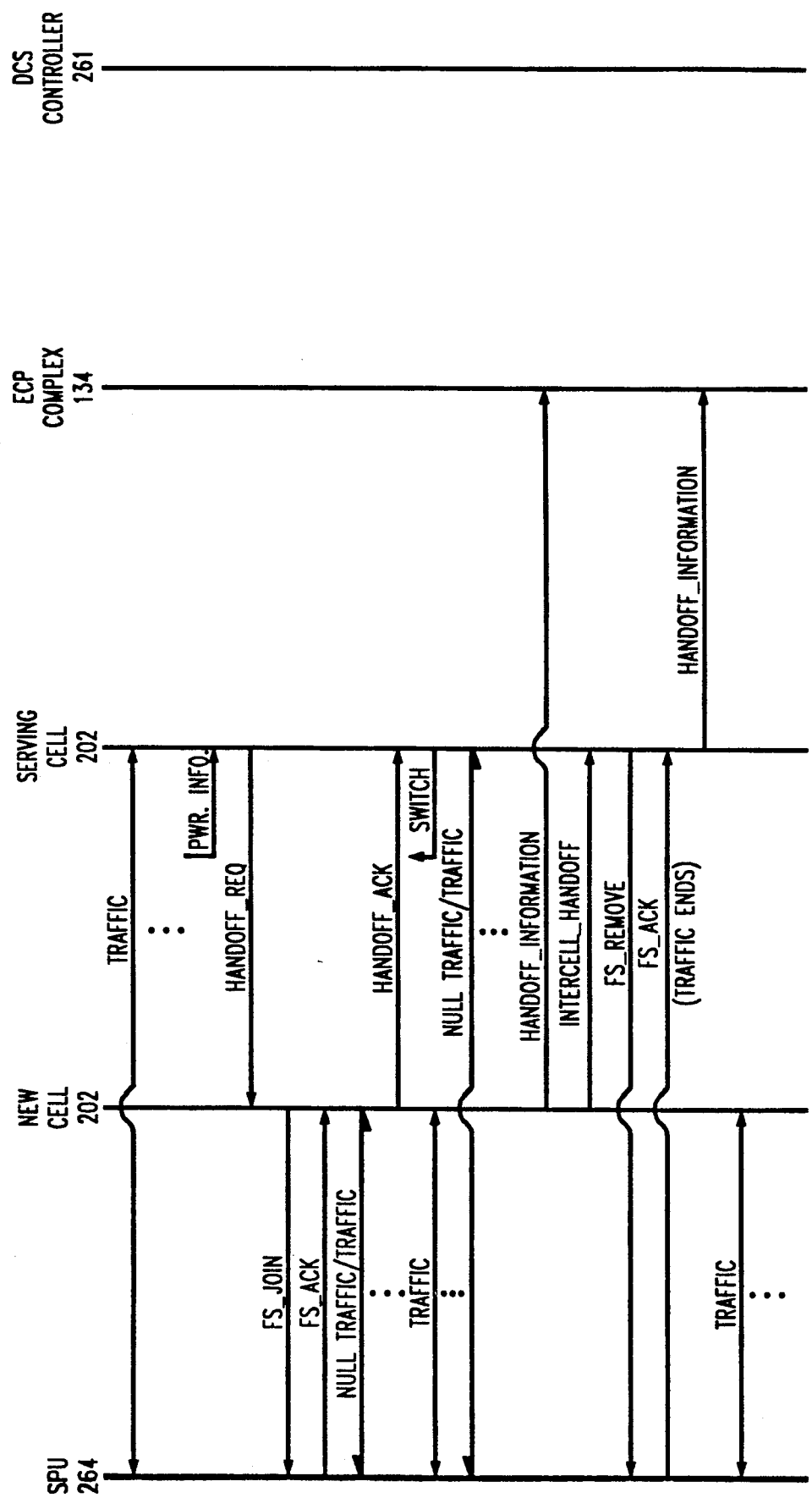
FIG. 32 is a signalling diagram of a semi-soft-handoff of a call in the system of FIG. 2.

FIG. 32 shows control signalling for a semi-soft handoff of the call from one channel element 245 to another. A semi-soft handoff occurs between channel elements 245 of either the same cell 202 or different cells 202 connected to the same DCS 201, and involves a change in the mobile channel that is carrying the call. As for soft handoff, controller 241 of cell 202 that is handling the call—the serving cell—monitors PWR.INFO. supplied by mobile telephone 203 to determine whether serving channel element 245 should continue to do so, or whether the call should be handed off to a new channel element 245 in either the same or a different—a new—cell 202. If controller 241 of serving cell 202 determines that it should hand off the call to a new channel element 245, and that new cell 202 can handle the call using CDMA, controller 241 of serving cell 202 sends a HANDOFF_REQ message through control links 108 and IMS 104 to controller 241 of new cell 202. (If serving cell 202 and new cell 202 are the same cell, this message is not sent outside of the cell.) The message is the same as described for soft handoff, and elicits the same response from new cell 202 as it does from a slave cell 202. However, because new channel element 245 does not operate on the same mobile channel as mobile telephone 203 and serving channel element 245, new channel element 245 is not in communication with mobile telephone 203 and only null traffic packets flow from new channel element 245 to service circuit 612 that is handling the call.

The HANDOFF_ACK message that is sent by new cell 202 back to serving cell 202 specifies the mobile channel on which new channel element 245 operates. Controller 241 of serving cell 202 receives the HANDOFF_ACK message and responds thereto by causing serving channel element 245 to transmit a signal to mobile telephone 203 telling it to switch its operations to the mobile channel on which new channel element 245 operates. When mobile telephone 203 does so, traffic begins to flow between mobile telephone 203, new channel element 245, and service circuit 612, but ceases to flow between mobile telephone 203 and serving channel element 245, and only null traffic packets commence to flow from serving channel element 245 to service circuit 612.

New channel element 245 responds to commencement of receipt of call traffic from mobile telephone 203 by causing a HANDOFF_INFORMATION message to be sent to ECP complex 134, and an INTERCELL_HANDOFF message to be sent to serving cell 202, to notify them of the handoff. ECP complex 134 updates its database, while controller 241 of serving cell 202 causes the cell to drop out of serving the call. Specifically, channel element 245 of serving cell 202 causes an FS_REMOVE packet to be sent to service circuit 612 that is serving the call. The packet is the same as discussed previously and elicits the same response. Traffic thus ceases to flow between serving channel element 245 and service circuit 612. Serving channel element 245 responds to receipt of the FS_ACK packet from service circuit 612 by causing a HANDOFF_INFORMATION message to be sent to ECP complex 134 to notify it of handoff completion, and ECP complex 134 updates its database.

Once again, it will be noted that DCS controller 261 of the serving DCS 201, remains wholly uninvolved in the procedure of FIG. 31, and that ECP complex 138 is also uninvolved except for being notified of the completion of the procedure. Consequently, the call-handling capacity of controller 261 and ECP complex 134 is not adversely impacted by the semi-soft handoff procedure.

Figure 33:
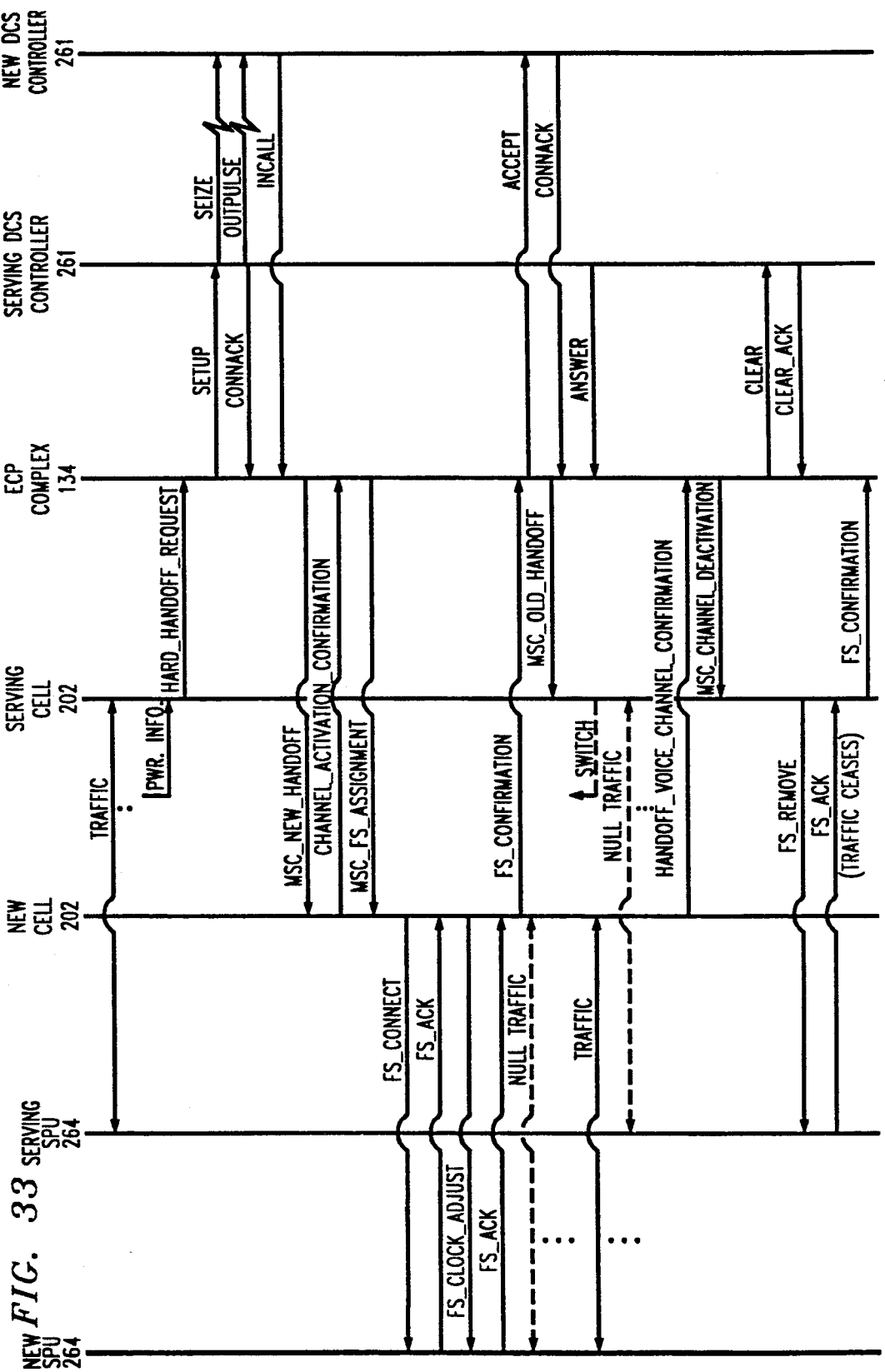
FIG. 33 is a signalling diagram of a CDMA-to-CDMA hard-handoff of a call in the system of FIG. 2.

FIG. 33 shows control signalling for a hard handoff from one CDMA cell 202 to another. In CDMA, hard handoff does not necessarily involve a change in the mobile channel, but it does involve a change in the digital cellular switch 201 (see FIG. 2) which is handling the call.

As for soft and semi-soft handoff, controller 241 of cell 202 that is handling the call—referred to as serving cell 202—monitors PWR.INFO. supplied by mobile telephone 203 and uses it along with other status information to determine whether serving cell 202 should continue to handle the call, or whether it should hand the call off to another cell 202—referred to as new cell 202—that is connected to a different mobile telephone switch 201 than serving cell 202. If controller 241 of serving cell 202 determines to hand off the call, it sends a HARD_HANDOFF_REQUEST message to ECP complex 134. The message identifies the call, the proposed new cell 202, and the mobile channel that is being used for the call by serving cell 202.

ECP complex 134 responds to the message by determining which DCS 201 is connected to new cell 202, and selecting a new speech coder module 220 within that DCS 201 and as service circuit 612 of the new module 220 to handle the call. ECP complex 134 then selects a trunk 206 connecting serving speech coder module 220 of serving DCS 201 with new speech coder module 220 of new DCS 201, and sends a SETUP message to controller 261 of serving DCS 201 identifying the selected new speech coder module 220, service circuit 612, and trunk 206, and also identifying the trunk 106 of serving speech coder module 220 which carries the call.

Controller 261 of serving DCS 201 receives the SETUP message and responds by causing controller 231 of serving module 220 to seize the identified trunk 206, to outpulse thereon identification of the selected module 220 and service circuit 612, and to connect call-carrying trunk 106 to trunk 206 in a conferencing arrangement. This results in seizure of trunk 206 at new module 220 and collection by new module's controller 231 of the outpulsed identification. Controller 261 of serving DCS 201 then sends a CONNACK message to ECP complex 134 to advise it of establishment of the connection between serving and new modules 220, while controller 231 of new module 220 sends the collected outpulsed information to controller 261 of new DCS 201, which sends an INCALL message conveying the collected outpulsed information to ECP complex 134 to advise it of the incoming call.

ECP complex 134 associates the received CONNACK and INCALL messages on the basis of their contents; the messages serve as confirmation to ECP complex 134 that TDM buses 130 of new and serving modules 220 are now interconnected through trunk 206. ECP complex 134 then sends a MSC_NEW_HANDOFF message to controller 241 of new cell 202. This message notifies new cell 202 that it has been selected to handle the call, and conveys to it the identification of the mobile channel that is presently carrying the call. New cell controller 241 responds by determining whether new cell 202 can handle the call, and if so, on which mobile channel. New cell controller 241 then sends a CHANNEL_ACTIVATION_CONFIRMATION message conveying this information back to ECP complex 134. Assuming that new cell 202 can handle the call, ECP complex 134 sends to new cell controller 241 an MSC_FS_ASSIGNMENT message conveying the DLCIs of the service circuit 612 of new module 220 which has been selected to handle the call. This message is the same as discussed previously in conjunction with FIG. 23, and elicits the same responses. New cell 202 returns an FS_CONFIRMATION message to ECP complex 134, and ECP complex 134 in turn sends an MSC_OLD_HANDOFF message to serving cell 202, advising them of completion of the connection between new channel element 245 and new service circuit 612, and the mobile channel on which new channel element 245 operates.

ECP complex 134 responds to the FS_CONFIRMATION message by sending an ACCEPT message to controller 261 of new DCS 201. Controller 261 of new DCS 201 responds by causing controller 231 of new module 220 to make connection between new service circuit 612 and trunk 206 connecting new module 220 to serving module 220, in the manner described previously for ACCEPT messages. This results in the output of both new and serving service circuits 612 being connected to the same time slot of TDM bus 130 of serving speech coder module 220, in a conference arrangement. If both new and serving channel elements 245 are operating on the same mobile channel, this results in superimposition of duplicate outputs on the same time slot, and thus has substantially no effect on the time-slot contents. If the two channel elements 245 are not operating on the same mobile channel, this results in superimposition of real traffic and null traffic samples—speech or data, and silence—on the same time slot, and thus again has substantially no effect on the time-slot contents. Controller 261 of new DCS 201 then returns a CONNACK message to ECP complex 134 to advise it of completion of the connection. Controller 231 of serving module 220 detects completion of the connection and notifies controller 261 of serving DCS 201, which returns an ANSWER message to ECP complex 134 to notify it thereof.

Serving cell controller 241 responds to MSC_OLD_HANDOFF message that it receives from ECP complex 134 by checking the message contents to determine if new channel element 245 is operating on the same mobile channel as serving channel element 245. If not, serving cell controller 241 causes serving channel element 245 to transmit a signal to mobile telephone 203 commanding it to switch operation from the mobile channel that it is now using to the mobile channel used by new channel element 245, as shown in dashed lines in FIG. 33. When mobile telephone 203 does so, traffic flow is switched from serving cell 202 to new cell 202, as shown in dashed lines.

Channel element 245 of new cell 207 responds to commencement of receipt of the call traffic by causing new cell controller 241 to send a HANDOFF_VOICE_CHANNEL_CONFIRMATION message to ECP complex 134. This message advises ECP complex 134 of success of the handoff. ECP complex 134 responds by sending an MSC_CHANNEL_DEACTIVATION message to serving cell 202 and a CLEAR message to controller 261 of serving DCS 201 to cause serving cell 202 and serving SPU 264 to drop out of handling of the call.

Controller 241 of serving cell 202 forwards the MSC_CHANNEL_DEACTIVATION message to serving channel element 245, which responds by causing an FS_REMOVE packet to be relayed to serving service circuit 612. The packet is the same as described previously, and elicits the same response. When serving cell 202 has ceased to handle the call, its controller 241 sends an FS_CONFIRMATION message to ECP complex 134 to advise it thereof.

Controller 261 of serving DCS 201 passes the received CLEAR message to controller 231 of serving module 220. Controller 231 responds by causing translation and maintenance processor 609 of speech processing unit 264 which contains serving service circuit 612 to disconnect the call (i.e., the time slot of TDM bus 130 which is carrying the call) from the concentration highway 607 time slot that is assigned to that service circuit 612. However, because new service circuit 612 of new module 220 is now connected to trunk 106 that carries the call to and from TDM bus 130 of serving module 220 via trunk 206, controller 231 of serving module 220 does not release that trunk 106 and TDM bus 130 time slot. Controller 261 of serving DCS 201 then sends a CLEAR_ACK message to ECP complex 134 to advise it that serving SPU 264 of serving module 220 has ceased to serve the call. Receipt of both the CLEAR_ACK and FS_CONFIRMATION messages indicates to ECP complex 134 that the handoff has been completed.

Figure 34:
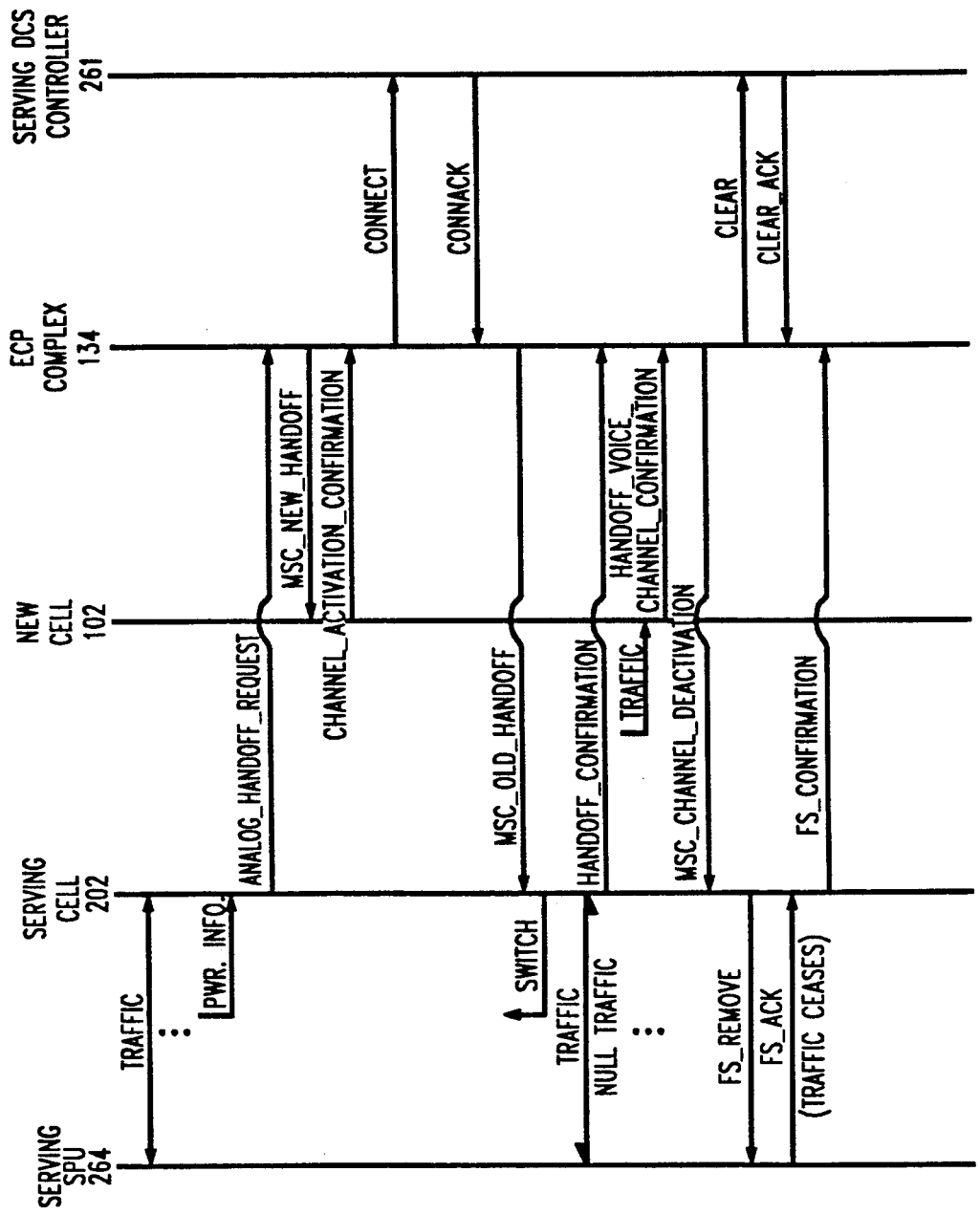
FIG. 34 is a signalling diagram of a CDMA-to-analog hard-handoff of a call between cells served by the same digital cellular switch in the system of FIG. 2.
Figure 35:
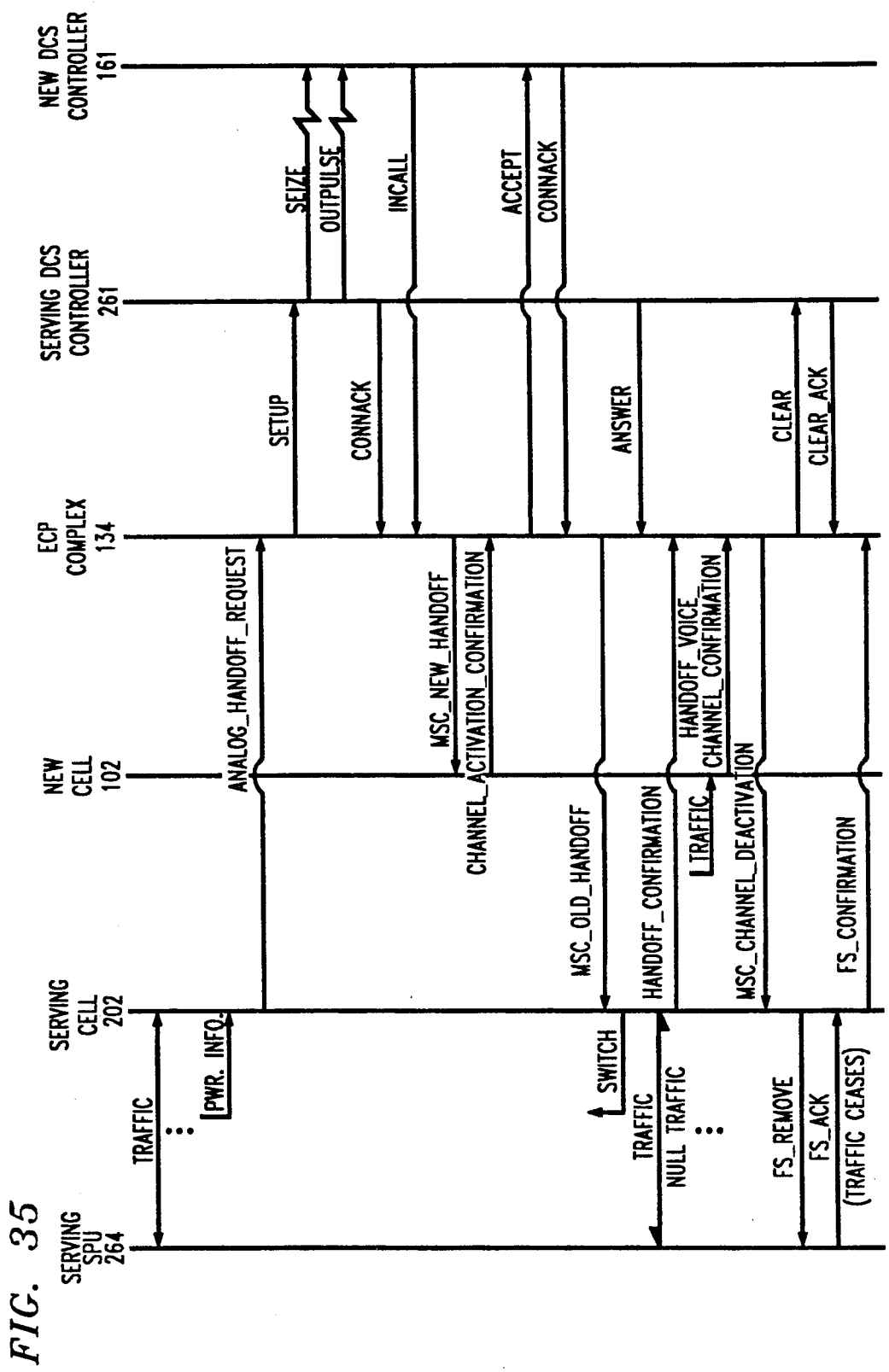
FIG. 35 is a signalling diagram of a CDMA-to-analog hard-handoff of a call between cells served by different digital cellular switches in the system of FIG. 2.

FIGS. 34-35 show control signalling for a hard handoff from a CDMA radio 243 of a serving cell 202 to a conventional analog radio 143 of a new cell 102 or 202. FIG. 34 shows control signalling for the handoff between two cells connected to the same DCS 201, while FIG. 35 shows the handoff between two cells connected to different DCSs 201.

Considering FIG. 34, a conventional mobile telephony cell 102 may be equipped with a CDMA pilot channel. If it is, control communications proceed with a new cell 102 as they would with a new cell 202, and are shown in FIG. 33; if new cell 102 is not equipped with a CDMA pilot channel, the control communications shown in FIG. 34 for new cell 102 instead also proceed with serving cell 202. In other words, if new cell 102 is not equipped with a CDMA pilot channel, conversion of the call to conventional mobile telephony occurs on serving cell 202, and only then is the call handed off from serving cell 202 to new cell 102, in the conventional hard-handoff manner.

As for handoff types discussed previously, controller 241 of serving cell 202 monitors PWR.INFO. supplied by mobile telephone 203 to determine whether or not to hand the call off to another cell. If controller 241 of serving cell 202 determines that it should handoff the call to a conventional radio 143 in a cell 202 or 102, and the new cell 202 or 102 is connected to the same mobile telephone switch 201 as serving cell 202, controller 241 sends an ANALOG_HANDOFF_REQUEST message to ECP complex 134. The message identifies the proposed new cell 102 or 202. ECP complex 134 responds by selecting a trunk 109 of a switching module 120 or 220 to which new cell 102 or 202 is connected, and sending an MSC_NEW_HANDOFF message to controller 141 or 241 of new cell 102 or 202. The message identifies the selected trunk 109 and queries if new cell 102 or 202 can handle the call. Controller 141 or 241 of new cell 102 or 202 replies with a CHANNEL_ACTIVATION_CONFIRMATION message to ECP complex 134 identifying the conventional mobile channel on which it will handle the call, and also connects that mobile channel to the selected trunk 109. ECP complex 134 responds by selecting a trunk 109 that is connected to serving module 220, and sends a CONNECT message to DCS controller 261 of serving DCS 201 identifying new module 120 or 220 to which new cell 102 or 202 is connected, the selected trunk 109 that is connected to new module 120 or 220, and the selected trunk 109 outgoing from serving speech coder module 220.

DCS controller 261 of serving DCS 201 receives the CONNECT message and responds by causing controller 231 of serving module 220 to connect the call (the TDM bus 130 time slot) to the identified outgoing trunk 109 in a conference arrangement, and causing TMS 121 to connect the two identified trunks 109 to each other. Controller 261 of serving DCS 201 then sends a CONNACK message to ECP complex 134 to advise it of completion of the connection between the serving and the new modules.

ECP complex 134 responds by sending an MSC_OLD_HANDOFF message to controller 241 of serving cell 202 conveying the mobile channel on which the new cell 102 or 202 will handle the call. In response, controller 241 causes serving channel element 245 to transmit a signal to mobile telephone 203 commanding it to switch to conventional mobile telephony operation and to use the mobile channel that was specified in the MSC_NEW_HANDOFF message.

When mobile telephone 203 does so and commences transmitting on the new mobile channel, new cell 102 or 202 receives the transmissions and notifies ECP complex 134 via a HANDOFF_VOICE_CHANNEL_CONFIRMATION message. ECP complex 134 responds with an MSC_CHANNEL_DEACTIVATION message to serving cell 202 and a CLEAR message to DCS controller 261 of serving DCS 201, to cause serving cell 202 and serving SPU 264 to drop out of handling the call. The messages are the same as discussed for CDMA-to-CDMA hard handoff, and elicit the same responses. As in that case, receipt of both the CLEAR_ACK and FS_CONFIRMATION messages indicates to ECP complex 134 that the handoff has been completed.

Referring now to FIG. 35, the handoff to a new cell 102 or 202 connected to a different switch 101 or 201 than serving cell 202 starts out the same way as shown in FIG. 34. But following a decision to hand off the call to a cell 102 served by a new DCS 101 or 201, controller 241 of serving cell 202 sends a ANALOG_HANDOFF_REQUEST message to ECP complex 134 to request the handoff. The message identifies the proposed new cell 102 or 202. ECP complex 134 responds to this message by determining which switch 101 or 201 is connected to new cell 102 or 202, and selecting a new switching module 120 or 220 of that switch 101 or 201 and a trunk 106 connected to that selected module 120 or 220 to handle the call. ECP complex 134 then selects an outgoing trunk 106 connected to serving module 220 and sends a SETUP message to DCS controller 261 of serving DCS 201 identifying the selected new module 120 or 220 and its connected trunk 106, the trunk 106 outgoing from serving speech coder module 220, and the trunk 106 of serving speech coder module 220 which carries the call.

The SETUP message is analogous to that described in conjunction with FIG. 33, and elicits like responses. Hence, the handoff proceeds as described for FIG. 33. However, no SPU 264 will be involved in handling the call at new DCS 101 or 201, so instead of sending an FS_ASSIGN message to new cell 102 or 202 as in FIG. 33, ECP complex 134 instead proceeds directly to send an ACCEPT message to DCS controller 161 or 261 of new DCS 101 or 201. DCS controller 161 or 261 responds by causing controller 131 of new module 120 or controller 251 of a cell interconnect module 209 to connect the selected trunk 106 of new module 120 or 220 to the call (i.e., to the call's corresponding time slot or either TDM bus 130 of module 120 or TDM bus 230 of CIM 209), thereby establishing a connection between that selected trunk 106 and new cell 102 or 202. Akin to FIG. 33, this results in the output of both new cell 102 or 202 and serving cell 202 being connected to the same time slot of TDM bus 130 of serving speech coder module 220. DCS controller 161 or 261 of new DCS 101 or 201 then returns a CONNACK message to ECP complex 134 to advise it of completion of the connection, while controller 231 of serving module 220 detects completion of the connection and notifies serving DCS controller 261, which responds by returning an ANSWER message to ECP complex 134.

ECP complex 134 responds to receipt of the CONNACK message by sending an MSC_OLD_HANDOFF message to controller 241 of serving cell 202. The message is the same as discussed in conjunction with FIG. 34, and henceforth the handoff proceeds the same as described for FIG. 34, until handoff completion.

Of course, it should be understood that various changes and modifications to the illustrative embodiment described above will be apparent to those skilled in the art. For example, different packet transmission techniques, such as Asynchronous Transfer Mode (ATM) can be used. Or, the partitioning of functionality between the control entities of the cells, ECP complex, and the digital cellular switches can be changed. Also, modules within a digital cellular switch (both CIMs 209 and SCMs 220) may be interconnected by a center-stage switch instead of just directly by trunks. Furthermore, the system described above can be applied to pseudo-synchronous wireless-access systems other than mobile telephony—for example, to personal communications networks (PCNs). Such changes and modifications can be made without departing from the spirit and the scope of the invention and without diminishing its attendant advantages. It is therefore intended that all such changes and modifications be covered by the following claims.

We claim:

1. A communications system comprising:
    a first unit for receiving incoming communication traffic at times dictated by first clock signals having a nominal frequency and a first phase;
    a second unit for transmitting incoming communication traffic at times dictated by clock signals having the nominal frequency;
    a third unit for interfacing communications between the first and the second units by transmitting to the first unit incoming communication traffic received from the second unit at times dictated by clock signals having the nominal frequency and having a second phase that is offset by an adjustably fixed amount from the first phase;
    a communications medium connecting the second unit with the third unit and conveying communication traffic transmitted by the second unit to the third unit for reception, the communications medium having a fluctuating transmission delay;
    first means for determining whether the third unit receives incoming communication traffic from the second unit within predetermined windows of time prior to the times of transmission by the third unit of the received incoming communication traffic; and second means responsive to a determination that receptions of the incoming communication traffic at the third unit fall outside of the windows for either increasing or decreasing the amount of the offset of the second phase from the first phase to move the receptions into the windows.

2. The system of claim 1 wherein:
the second means adjust the offset at commencing of a communication in one step by any amount required to move the receptions substantially into centers of the windows, and adjust the offset during the communication in a series of sequential steps.

3. The system of claim 1 further comprising:
third means cooperative with the second means for inserting additional traffic into the incoming communication traffic received by the third unit and transmitting the additional traffic to the first unit while the amount of the offset is being increased, and for deleting a portion of the incoming communication traffic received by the third unit from the incoming communication traffic transmitted to the first unit while the amount of the offset is being decreased.

4. A communications system comprising:
a first unit for transmitting outgoing communication traffic at times dictated by first clock signals having a nominal frequency and a first phase;
a second unit for transmitting outgoing communication traffic at times dictated by clock signals having the nominal frequency;
a third unit for interfacing communications between the first and the second units by transmitting to the second unit outgoing communication traffic received from the first unit at times dictated by clock signals having the nominal frequency and having a second phase that is offset by an adjustably fixed amount from the first phase;
a communications medium connecting the second unit with the third unit and conveying communications traffic transmitted by the third unit to the second unit for reception, the communications medium having a fluctuating transmission delay;
first means for determining whether the second unit receives outgoing communication traffic from the third unit within predetermined windows of time prior to the times of transmission by the second unit of the received outgoing communication traffic; and
second means responsive to a determination that receptions of the outgoing communication traffic at the second unit fall outside of the windows for either increasing or decreasing the amount of the offset of the second phase from the first phase to move the receptions into the windows.

5. The system of claim 4 wherein:
the second means adjust the offset at commencing of a communication in one step by any amount required to move the receptions substantially into centers of the windows, and adjust the offset during the communication in a series of sequential steps.

6. The system of claim 4 further comprising:
third means cooperative with the second means for inserting additional traffic into the outgoing communication traffic transmitted from the first unit and causing the third unit to receive the additional traffic while the amount of the offset is being increased, and for deleting a portion of the outgoing communication traffic transmitted by the first unit from the outgoing communication traffic received by the third unit while the amount of the offset is being decreased.

7. A communications system comprising:
a first unit for transmitting outgoing communication traffic and receiving incoming communication traffic at times dictated by first clock signals having a nominal frequency and a first phase;
a second unit for transmitting received incoming and outgoing communication traffic at times dictated by second clock signals having the nominal frequency;
a third unit for interfacing communications between the first and the second units by transmitting to the second unit outgoing communication traffic received from the first unit at times dictated by third clock signals having the nominal frequency and having a second phase that is offset by an adjustably fixed first amount from the first phase, and by transmitting to the first unit incoming communication traffic received from the second unit at times dictated by fourth clock signals having the nominal frequency and having a third phase that is offset by an adjustably fixed second amount from the first phase;
a communications medium connecting the second unit with the third unit and conveying communication traffic transmitted by, respectively, the second unit and the third unit to, respectively, the third unit and the second unit for reception, the communications medium having a fluctuating transmission delay;
first means for determining whether the second unit receives outgoing communication traffic from the third unit within first predetermined windows of time prior to the times of transmission by the second unit of the received outgoing communication traffic;
second means for determining whether the third unit receives incoming communication traffic from the second unit within second predetermined windows of time prior to the times of transmission by the third unit of the received incoming communication traffic; and
third means responsive to a determination that either receptions of the outgoing communication traffic at the second unit fall outside of the first windows or receptions of the incoming communication traffic at the third unit fall outside of the second windows for either increasing or decreasing the amount of the offset of either the second phase or the third phase from the first phase to move the receptions that fall outside of their corresponding windows into the corresponding windows.

8. The system of claim 7 wherein:
the third means are responsive to a determination by the first means that receptions of the outgoing communication traffic at the second unit lag the first windows, for decreasing the amount of the offset of the second phase from the first phase.

9. The system of claim 8 wherein:
the third means are further responsive to a determination by the first means that receptions of the outgoing communication traffic at the second unit lead the first windows, for increasing the amount of the offset of the second phase from the first phase.

10. The system of claim 7 wherein:

the third means are responsive to a determination by the second means that receptions of the incoming communication traffic at the third unit lag the second windows, for increasing the amount of the offset of the third phase from the first phase.

11. The system of claim 10 wherein:

the third means are further responsive to a determination by the second means that receptions of the incoming communication traffic at the third unit lead the second windows, for decreasing the amount of the offset of the third phase from the first phase.

12. The system of claim 7 wherein:

the third means adjust the first amount and the second amount of offset at commencing of a communication each in one step by any amount required to move the receptions that fall outside of their corresponding windows into the corresponding windows, and adjust the first amount and the second amount of offset during the communication in a series of sequential steps by an integral multiple of a same predetermined amount during each step.

13. The system of claim 7 further comprising:

fourth means cooperative with the third means for inserting additional traffic into the outgoing communication traffic transmitted from the first unit and causing the third unit to receive the additional traffic while the amount of the offset of the second phase is being increased and deleting a portion of the outgoing communication traffic transmitted by the first unit from the outgoing communication traffic received by the third unit while the amount of the offset of the second phase is being decreased, and for inserting additional traffic into the incoming communication traffic received by the third unit and transmitting the additional traffic to the first unit while the amount of the offset of the third phase is being increased and deleting a portion of the incoming communication traffic received by the third unit from the incoming communication traffic transmitted to the first unit while the amount of the offset of the third phase is being decreased.

14. The system of claim 7 wherein:

the first unit is for transmitting a stream of outgoing communication traffic and receiving a stream of incoming communication traffic;

the second unit is for transmitting packets of received incoming communication traffic, and receiving packets of outgoing communication traffic for transmission of the outgoing communication traffic;

the third unit includes fourth means responsive to receipt of the stream of outgoing communication traffic from the first unit for packetizing the received outgoing communication traffic and transmitting the packets of the received outgoing communication traffic to the second unit at times dictated by the third clock signals, and fifth means responsive to receipt of the packets of the incoming communication traffic from the second unit for depacketizing the received incoming communication traffic and transmitting the depacketized received incoming communication traffic toward the first unit at times dictated by the fourth clock signals;

the first means are for determining whether the second unit receives the packets of outgoing communication traffic from the third unit within the first predetermined windows; and the second means are for determining whether the third unit receives the packets of incoming communication traffic from the second unit within the second predetermined windows.

15. A call-traffic processing apparatus for a cellular radio-telephone system that includes the apparatus, a communications medium connected to the apparatus and having a fluctuating transmission delay, at least one cell connected to the communications medium and each for transmitting first packets containing first frames of coded incoming call traffic received from a radio telephone to the apparatus across the medium and for transmitting to the radio telephone outgoing call traffic received across the medium from the apparatus in second packets containing second frames of coded outgoing call traffic, and a mobile-telephone switching system for interconnecting cells with each other and with a telephone network by routing a first digital stream of incoming call traffic received from the apparatus to a destination and by routing a second digital stream of outgoing call traffic received from a source to the apparatus, and wherein the first and the second digital streams are synchronized with first clock signals having a nominal frequency and a first phase and derived from the telephone network, and the transmissions of the incoming and the outgoing call traffic by the cell are synchronized with second clock signals having the nominal frequency, the call-traffic processing apparatus comprising:

outgoing vocoder means for receiving the second digital stream of outgoing call traffic synchronously with the first clock signals, coding the received outgoing call traffic, and transmitting second frames of the coded outgoing call traffic synchronously with third clock signals having the nominal frequency and a second phase that is offset by an adjustably fixed first amount from the first phase, incoming vocoder means for receiving first frames of the coded incoming call traffic synchronously with fourth clock signals having the nominal frequency and a third phase that is offset by an adjustably fixed second amount from the first phase, decoding the received incoming call traffic, and transmitting the second digital stream of incoming call traffic synchronously with the first clock signals;

outgoing processing means for receiving the second frames of the coded outgoing call traffic from the outgoing vocoder means, packetizing the received second frames into the second packets, and transmitting the second packets to the cell synchronously with fifth clock signals having the nominal frequency and a fourth phase that is offset by an adjustably fixed third amount from the first phase;

incoming processing means for receiving the first packets from the cell, depacketizing the received first packets into the first frames, and transmitting the first frames to the incoming vocoder means synchronously with sixth clock signals having the nominal frequency and a fifth phase that is offset by an adjustably fixed fourth amount from the first phase;

clock signal generating means for deriving the third, the fourth, the fifth, and the sixth clock signals from the first clock signals;

first means for determining whether the incoming processing means receive the first packets within first predetermined windows of time prior to the times of transmission of the first frames by the incoming processing means to the incoming vocoder means;

second means for determining whether the cell receives the second packets within second predetermined windows of time prior to the times of transmission by the cell of the received outgoing call traffic to the mobile telephone; and third means responsive to a determination that either receptions of the first packets fall outside of the first windows or receptions of the second packets fall outside of the second windows for causing the clock signal generating means to either increase or decrease the amounts of the offsets of either both the second and the fourth phases or both the third and the fifth phases, with respect to the first phase, to move the packet receptions that fall outside of their corresponding windows into the corresponding windows.

16. The apparatus of claim 15 wherein:

the third means are responsive to a determination by the first means that receptions of the first packets at the incoming processing means lag the first windows, for causing the clock signal generating means to increase the amounts of the offsets of both the third and the fifth phases from the first phase by a same amount.

17. The apparatus of claim 16 wherein:

the third means are responsive to a determination by the first means that receptions of the first packets at the incoming processing means lead the first windows, for causing the clock signal generating means to decrease the amount of the offset of both the third and the fifth phases from the first phase by a same amount.

18. The apparatus of claim 15 wherein:

the third means are responsive to a determination by the second means that receptions of the second packets at the cell lag the second windows, for causing the clock signal generating means to decrease the amounts of the offsets of both the second and the fourth phases from the first phase by a same amount.

19. The apparatus of claim 18 wherein:

the third means are responsive to a determination by the second means that receptions of the second packets at the cell lead the second windows, for causing the clock signal generating means to increase the amounts of the offsets of both the second and the fourth phases from the first phase by a same amount.

20. The apparatus of claim 15 wherein:

the third means cause the clock signal generating means to adjust either the first and the third amounts of offset or the second and the fourth amounts of offset, in one step by any amount required to move any packet receptions that fall outside of their corresponding windows into the corresponding windows at a commencing of a communication, and cause the clock signal generating means to adjust either the first and the third amounts of offset or the second and the fourth amounts of offset by an integral multiple of a same predetermined amount in each step of a series of sequential steps to move packet receptions that fall outside of their corresponding windows into the corresponding windows during the communication.

21. The apparatus of claim 15 further including:

means cooperative with the third means for causing the outgoing vocoder means to insert traffic additional to the outgoing call traffic received by the outgoing vocoder means into the second frames transmitted by the outgoing vocoder means while the amounts of the offsets of the second and the fourth phases are being increased, causing the outgoing vocoder means to delete a portion of the outgoing call traffic received by the outgoing vocoder means from the second frames transmitted by the outgoing vocoder means while the amounts of the offsets of the second and the fourth phases are being decreased, causing the incoming vocoder means to insert traffic additional to the incoming call traffic received by the incoming vocoder means into the first digital stream transmitted by the incoming vocoder means while the amounts of the offsets of the third and the fifth phases are being increased, and causing the incoming vocoder means to delete a portion of the incoming call traffic received by the incoming vocoder means from the first digital stream transmitted by the incoming vocoder means while the amounts of the offsets of the third and the fifth phases are being decreased.

22. A method of operating a communications system comprising a first unit for transmitting incoming communications, a second unit for receiving incoming communications, a third unit for interfacing communications between the first and the second units, and a communications medium having a fluctuating transmission delay and connecting the first unit with the third unit, the method comprising the steps of:

transmitting incoming communication traffic from the first unit at times dictated by first clock signals having a nominal frequency;

conveying the communication traffic transmitted by the first unit via the communications medium to the third unit for reception;

receiving the transmitted incoming communication traffic at the third unit;

transmitting from the third unit to the second unit the incoming communication traffic received from the first unit at times dictated by clock signals having the nominal frequency and having a first phase that is offset by an adjustably fixed amount from a second phase;

receiving incoming communication traffic transmitted from the third unit at the second unit at times dictated by clock signals having the nominal frequency and the second phase;

determining whether the third unit receives incoming communication traffic from the first unit within predetermined windows of time prior to the times of transmission by the third unit of the received incoming communication traffic; and either increasing or decreasing the amount of the offset of the first phase from the second phase, in response to a determination that receptions of the incoming communication traffic at the third unit fall outside of the windows, to move the receptions into the windows.

23. The method of claim 22 wherein
the step of either increasing or decreasing the amount of the offset comprises the steps of:
adjusting the offset at commencing of a communication in one step by any amount required to move the receptions substantially into centers of the windows; and
adjusting the offset during the communication in a series of sequential steps.

24. The method of claim 22 further comprising the steps of:
inserting additional traffic into the incoming communication traffic received by the third unit and transmitting the additional traffic to the second unit while the amount of the offset is being increased; and
deleting a portion of the incoming communication traffic received by the third unit from the incoming communication traffic transmitted to the second unit while the amount of the offset is being decreased.

25. A method of operating a communications system comprising a first unit for transmitting communications, a second unit for receiving outgoing communications, a third unit for interfacing communications between the first and the second units, and a communications medium having a fluctuating transmission delay and connecting the third unit with the second unit, the method comprising the steps of:
transmitting outgoing communication traffic from the first unit at times dictated by clock signals having a nominal frequency and a first phase;
receiving at the third unit the outgoing communication traffic transmitted by the first unit;
transmitting from the third unit to the second unit outgoing communication traffic received from the first unit at times dictated by clock signals having the nominal frequency and having a second phase that is offset by an adjustably fixed amount from the first phase;
conveying the communication traffic transmitted by the third unit via the communications medium to the second unit for reception;
receiving at the second unit the outgoing communication traffic transmitted by the third unit;
transmitting outgoing communication traffic from the second unit at times dictated by clock signals having the nominal frequency;
determining whether the second unit receives outgoing communication traffic from the third unit within predetermined windows of time prior to the times of transmission by the second unit of the received outgoing communication traffic; and
either increasing or decreasing the amount of the offset of the second phase from the first phase, in response to a determination that receptions of the outgoing communication traffic at the second unit fall outside of the windows, to move the receptions into the windows.

26. The method of claim 25 wherein
the step of either increasing or decreasing the amount of the offset comprises the steps of:
adjusting the offset at commencing of a communication in one step by any amount required to move the receptions substantially into centers of the windows; and
adjusting the offset during the communication in a series of sequential steps.

27. The method of claim 25 further comprising the steps of:
inserting additional traffic into the outgoing communication traffic transmitted from the first unit and causing the third unit to receive the additional traffic while the amount of the offset is being increased; and
deleting a portion of the outgoing communication traffic transmitted by the first unit from the outgoing communication traffic received by the third unit while the amount of the offset is being decreased.

28. A method of operating a communications system comprising a first unit for transmitting outgoing communication traffic and receiving incoming communication traffic, a second unit for transmitting received incoming and outgoing communication traffic, a third unit for interfacing communications between the first and the second units, and a communications medium having a fluctuating transmission delay and connecting the second unit with the third unit, the method comprising the steps of:
transmitting outgoing communication traffic from the first unit and receiving incoming communication traffic at the first unit at times dictated by first clock signals having a nominal frequency and a first phase;
transmitting received incoming and outgoing communication traffic from the second unit at times dictated by second clock signals having the nominal frequency;
receiving at the third unit the outgoing communication traffic transmitted by the first unit;
transmitting from the third unit to the second unit outgoing communication traffic received from the first unit at times dictated by third clock signals having the nominal frequency and having a second phase that is offset by an adjustably fixed first amount from the first phase;
conveying the outgoing communication traffic transmitted by the third unit via the communications medium to the second unit for reception;
conveying the incoming communication traffic transmitted by the second unit via the communications medium to the third unit for reception;
receiving at the third unit the incoming communication traffic transmitted by the second unit;
transmitting from the third unit to the first unit incoming communication traffic received from the second unit at times dictated by fourth clock signals having the nominal frequency and having a third phase that is offset by an adjustably fixed second amount from the first phase;
determining whether the second unit receives outgoing communication traffic from the third unit within first predetermined windows of time prior to the times of transmission by the second unit of the received outgoing communication traffic;
determining whether the third unit receives incoming communication traffic from the second unit within second predetermined windows of time prior to the times of transmission by the third unit of the received incoming communication traffic; and
either increasing or decreasing the amount of the offset of either the second phase or the third phase from the first phase, in response to a determination that either receptions of the outgoing communication traffic at the second unit fall outside of the first windows or receptions of the incoming communication traffic at the third unit fall outside of the second windows, to move the receptions that fall outside of their corresponding windows into the corresponding windows.

29. The method of claim 28 wherein
the step of either increasing or decreasing the amount of the offset comprises the step of:
decreasing the amount of the offset of the second phase from the first phase, in response to a determination that receptions of the outgoing communication traffic at the second unit lag the first windows.

30. The method of claim 29 wherein
the step of either increasing or decreasing the amount of the offset further comprises the step of:
increasing the amount of the offset of the second phase from the first phase, in response to a determination that receptions of the outgoing communication traffic at the second unit lead the first windows.

31. The method of claim 28 wherein
the step of either increasing or decreasing the amount of the offset comprises the step of:
increasing the amount of the offset of the third phase from the first phase, in response to a determination that receptions of the incoming communication traffic at the third unit lag the second windows.

32. The method of claim 31 wherein
the step of either increasing or decreasing the amount of the offset further comprises the step of:
decreasing the amount of the offset of the third phase from the first phase, in response to a determination that receptions of the incoming communication traffic at the third unit lead the second windows.

33. The method of claim 28 wherein
the step of either increasing or decreasing the amount of the offset comprises the steps of:
adjusting the first amount and the second amount of offset at commencing of a communication each in one step by any amount required to move the receptions that fall outside of their corresponding windows into the corresponding windows; and
adjusting the first amount and the second amount of offset during the communication in a series of sequential steps by an integral multiple of a same predetermined amount during each step.

34. The method of claim 28 further comprising the steps of:
inserting additional traffic into the outgoing communication traffic transmitted from the first unit and causing the third unit to receive the additional traffic while the amount of the offset of the second phase is being increased;
deleting a portion of the outgoing communication traffic transmitted by the first unit from the outgoing communication traffic received by the third unit while the amount of the offset of the second phase is being decreased;
inserting additional traffic into the incoming communication traffic received by the third unit and transmitting the additional traffic to the first unit while the amount of the offset of the third phase is being increased; and
deleting a portion of the incoming communication traffic received by the third unit from the incoming communication traffic transmitted to the first unit while the amount of the offset of the third phase is being decreased.

35. The method of claim 28 in a communications system wherein the first unit is for transmitting a stream of outgoing communication traffic and receiving a stream of incoming communication traffic, and the second unit is for transmitting packets of received incoming communication traffic, and receiving packets of outgoing communication traffic for transmission of the outgoing communication traffic, wherein:
the step of receiving at the third unit the outgoing communication traffic transmitted by the first means comprises the steps of
receiving the stream of outgoing communication traffic from the first unit, and
packetizing the received outgoing communication traffic;
the step of transmitting from the third unit to the second unit outgoing communication traffic comprises the step of
transmitting the packets of the received outgoing communication traffic to the second unit at times dictated by the third clock signals;
the step of receiving at the third unit the incoming communication traffic transmitted by the second unit comprises the steps of
receiving the packets of the incoming communication traffic from the second unit, and
depacketizing the received incoming communication traffic;
the step of transmitting from the third unit to the first unit incoming communication traffic comprises the step of
transmitting the depacketized received incoming communication traffic toward the first unit at times dictated by the fourth clock signals;
the step of determining whether the second unit receives outgoing communication traffic comprises the step of
determining whether the second unit receives the packets of outgoing communication traffic from the third unit within the first predetermined windows; and
the step of determining whether the third unit receives incoming communication traffic comprises the step of
determining whether the third unit receives the packets of incoming communication traffic from the second unit within the second predetermined windows.

36. A method of processing call traffic in an interface arrangement of a cellular radio-telephone system that includes the arrangement, a communications medium connected to the apparatus and having a fluctuating transmission delay, at least one cell connected to the communications medium and each for transmitting first packets containing first frames of coded incoming call traffic received from a radio telephone to the arrangement across the medium and for transmitting to the radio telephone outgoing call traffic received across the medium from the arrangement in second packets containing second frames of coded outgoing call traffic, and a mobile-telephone switching system for interconnecting cells with each other and with a telephone network by routing a first digital stream of incoming call traffic received from the arrangement to a destination and by routing a second digital stream of outgoing call traffic received from a source to the arrangement and wherein the first and the second digital streams are synchronized with first clock signals having a nominal frequency and a first phase and derived from the telephone network, and the transmisions of the incoming and the outgoing call traffic by the cell are synchronized with second clock signals having the nominal frequency, the method comprising the steps of:

receiving the second digital stream of outgoing call traffic synchronously with the first clock signals;

coding the received outgoing call traffic;

transmitting second frames of the coded outgoing call traffic synchronously with third clock signals having the nominal frequency and a second phase that is offset by an adjustably fixed first amount from the first phase;

receiving the second frames of the coded outgoing call traffic;

packetizing the received second frames into the second packets;

transmitting the second packets to the cell via the communications medium synchronously with fifth clock signals having the nominal frequency and a fourth phase that is offset by an adjustably fixed third amount from the first phase;

receiving the first packets from the cell via the communications medium;

depacketizing the received first packets into the first frames;

transmitting the first frames synchronously with sixth clock signals having the nominal frequency and a fifth phase that is offset by an adjustably fixed fourth amount from the first phase;

receiving the first frames of the coded incoming call traffic synchronously with fourth clock signals having the nominal frequency and a third phase that is offset by an adjustably fixed second amount from the first phase;

decoding the received incoming call traffic;

transmitting the second digital stream of incoming call traffic synchronously with the first clock signals;

determining whether the interface arrangement receives the first packets within first predetermined windows of time prior to the times of transmission of the first frames by the interface arrangement;

determining whether the cell receives the second packets within second predetermined windows of time prior to the times of transmission by the cell of the received outgoing call traffic to the mobile telephone; and either increasing or decreasing the amounts of the offsets of either both the second and the fourth phases or both the third and the fifth phases, with respect to the first phase, in response to a determination that either receptions of the first packets fall outside of the first windows or receptions of the second packets fall outside of the second windows, to move the packet receptions that fall outside of their corresponding windows into the corresponding windows.

37. The method of claim 36 wherein the step of either increasing or decreasing the amounts of the offsets comprises the step of:

increasing the amounts of the offsets of both the third and the fifth phases from the first phase by a same amount, in response to a determination that receptions of the first packets at the interface arrangement lag the first windows.

38. The method of claim 37 wherein the step of either increasing or decreasing the amounts of the offsets further comprises the step of:

decreasing the amounts of the offsets of both the third and the fifth phases from the first phase by a same amount, in response to a determination that receptions of the first packets at the interface arrangement lead the first windows.

39. The method of claim 36 wherein the step of either increasing or decreasing the amounts of the offsets comprises the step of:

decreasing the amounts of the offsets of both the second and the fourth phases from the first phase by a same amount, in response to a determination that receptions of the second packets at the cell lag the second windows.

40. The method of claim 39 wherein the step of either increasing or decreasing the amounts of the offsets further comprises the step of:

increasing the amounts of the offsets of both the second and the fourth phases from the first phase by a same amount, in response to a determination that receptions of the second packets at the cell lead the second windows.

41. The method of claim 36 wherein the step of either increasing or decreasing the amounts of the offsets comprises the steps of:

adjusting either the first and the third amounts of offset or the second and the fourth amounts of offset, in one step by any amount required to move any packet receptions that fall outside of their corresponding windows into the corresponding windows at a commencing of a communication; and adjusting either the first and the third amounts of offset or the second and the fourth amounts of offset by an integral multiple of a same predetermined amount in each step of a series of sequential steps to move packet receptions that fall outside of their corresponding windows into the corresponding windows during the communication.

42. The method of claim 36 further comprising the steps of:

inserting traffic additional to the outgoing call traffic into the second frames while the amounts of the offsets of the second and the fourth phases are being increased;

deleting a portion of the outgoing call traffic from the second frames while the amounts of the offsets of the second and the fourth phases are being decreased;

inserting traffic additional to the incoming call traffic into the first digital stream while the amounts of the offsets of the third and the fifth phases are being increased; and deleting a portion of the incoming call traffic from the first digital stream while the amounts of the offsets of the third and the fifth phases are being decreased.

* * * * *